United States Patent
Mori et al.

[11] Patent Number: 5,858,490
[45] Date of Patent: Jan. 12, 1999

[54] FILM FORMED FROM POLYETHYLENE-2,6-NAPHTHALATE RESIN, PROCESS FOR PRODUCING SAID FILM AND PACKAGE USING SAID FILM

[75] Inventors: Shinichiro Mori; Katsuhiko Sasada; Kayo Hasegawa; Yasuhiro Harada; Chikao Kumaki; Masahisa Yamaguchi; Yasuki Suzuura; Rikiya Yamashita; Toshiyuki Suzuki; Isao Inoue, all of Tokyo-To, Japan

[73] Assignees: NKK Corporation; DAI Nippon Printing Co., Ltd., both of Japan

[21] Appl. No.: 379,655

[22] PCT Filed: Jun. 10, 1994

[86] PCT No.: PCT/JP94/00951

§ 371 Date: Apr. 7, 1995

§ 102(e) Date: Apr. 7, 1995

[87] PCT Pub. No.: WO94/29374

PCT Pub. Date: Dec. 22, 1994

[30] Foreign Application Priority Data

| Jun. 10, 1993 | [JP] | Japan | 5-165169 |
| Jul. 2, 1993 | [JP] | Japan | 5-188675 |
| Dec. 24, 1993 | [JP] | Japan | 5-328089 |

[51] Int. Cl.$^6$ .......................... B32B 27/06; B32B 27/08; B32B 27/36

[52] U.S. Cl. ........................ 428/36.7; 428/36.6; 428/195; 428/200; 428/337; 428/339; 428/343; 428/347; 428/480; 428/910; 206/524.6; 206/531; 206/532

[58] Field of Search ................ 428/35.7, 36.6, 428/36.7, 480, 910, 195, 200, 337, 339, 343, 347; 156/244.11, 247; 264/280, 288.4, 290.2; 206/524.6, 531, 532

[56] References Cited

U.S. PATENT DOCUMENTS

| 3,673,139 | 6/1972 | Hrach | 260/22 |
| 3,875,119 | 4/1975 | Aoki et al. | 260/75 T |
| 5,006,613 | 4/1991 | Shepherd et al. | 525/444 |
| 5,176,861 | 1/1993 | Ishikawa | 264/101 |
| 5,209,972 | 5/1993 | Super et al. | 428/349 |
| 5,387,449 | 2/1995 | Kunz et al. | 428/35.4 |

FOREIGN PATENT DOCUMENTS

| 0225631 | 6/1987 | European Pat. Off. . |
| 0 394 751 | 10/1990 | European Pat. Off. . |
| 0 556 050 | 8/1993 | European Pat. Off. . |
| 0583953 | 2/1994 | European Pat. Off. . |
| 60-150232 | 8/1985 | Japan . |
| 62-119265 | 5/1987 | Japan . |
| 2-152400 | 6/1990 | Japan . |
| 5-138731 | 6/1993 | Japan . |

OTHER PUBLICATIONS

Ito et al., "Two–Stage Drawing of Poly(Ethylene 2,6–Naphthalate)", Journal of Applied Polymer Science, vol. 46, No. 6, Oct. 25, 1992, pp. 1013–1023.

Journal of Applied Polymer Science, vol. 46, No. 6, Oct. 25 1992, pp. 1013–1023, Masayoshi Ito et al. "Two–Stage Drawing of Poly(Ethylene 2,5–Naphthalate)".

*Primary Examiner*—Vivian Chen
*Attorney, Agent, or Firm*—Parkhurst & Wendel, L.L.P.

[57] ABSTRACT

Packaging films for press-through packaging comprise a polyethylene-2,6-naphthalate film having an intrinsic viscosity $\eta$ of 0.31 to 0.6 wherein the film is: (1) stretched in mutually perpendicular directions each with draw ratios of 1 to 3 times; or (2) stretched in the longitudinal direction at draw ratios of 3 to 6 times and in the transverse direction at draw ratios of 1 to 1.8 times. The films have a thickness of 5–150 $\mu$m and may be incorporated into multi-layer cover films comprising the polyethylene-2,6-naphthalate film, a barrier layer, a reinforcing layer, and a sealing or adhesive layer.

10 Claims, 3 Drawing Sheets

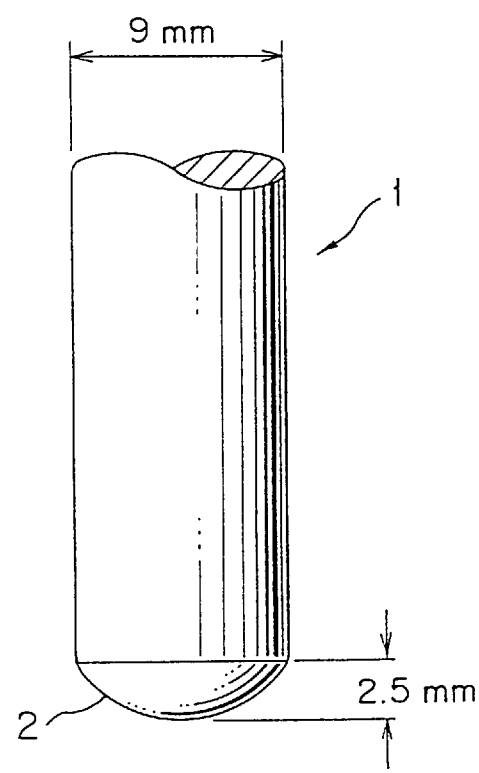
F I G. 3

FILM FORMED FROM POLYETHYLENE-2,6-NAPHTHALATE RESIN, PROCESS FOR PRODUCING SAID FILM AND PACKAGE USING SAID FILM

This application is a 371 of PCT/JP94/00951, filed Jun. 10, 1994.

TECHNICAL FIELD

The present invention relates to a polyethylene-2,6-naphthalate resin and a film comprising said resin. More particularly, the present invention relates to a packaging film which has a gas barrier property and, further, is easy to open and easy to tear and has a press-through property, and various packaging applications based on said film.

BACKGROUND ART

Aromatic polyesters exemplified by polyethylene terephthalate (hereinafter abbreviated to "PET") and polybutylene terephthalate (PBT) have excellent mechanical strength, heat resistance, chemical resistance and other properties and, hence, have been widely used in various industrial applications. Among them, polyethylene-2,6-naphthalate (hereinafter abbreviated to "PEN") is superior to PET in mechanical strength (Young's modulus and breaking strength), heat resistance (longterm heat stability and dimensional stability), chemical properties (chemical resistance and gas barrier property) and other properties by virtue of the rigidity and plainness of the molecular chain and, in recent years, have attracted considerable attention (Japanese Patent Publication Nos. 29541/1973 and 40917/1973). High-performance films of PEN, which have utilized the above properties, for example, base films for magnetic tapes and capacitor films, are currently on the market. Further, PEN is a promising candidate for use in other applications, that is, as a high-performance packaging material in the field of various packaging materials.

Paper, various plastics and the like are currently in use as packaging materials and applied to packaging materials having a gas barrier property, freshness retaining packaging materials, heat-resistant packaging materials, easy-open packaging materials and mischief preventive packaging materials.

Regarding easy-open packages, various easy-open packaging materials have been developed such as those using a stretched film, as disclosed in Japanese Patent Laid-Open Nos. 55059/1988 and 96066/1988 and Japanese Utility Model Publication No. 11258/1979; easy-tear packaging materials exemplified by pouches provided with a cut, a scratch, a perforation or an opening tape, as disclosed in Japanese Patent Laid-Open Nos. 52065/1987, 39465/1987, 82965/1988, and 67273/1988; peelable packaging materials wherein the contents are taken out by peeling off a heat-sealed cover, as disclosed in Japanese Patent Laid-Open Nos. 109768/1987, 27254/1988, 96067/1988, and 307073/1988; and easy-open caps.

For easy-tear packaging materials, air tightness and an increase in speed have been pursued in bag making/charge packing, and regarding opening, it is a common practice to use a method in which the end face of a bag is subjected to sealer tear cutting so that tearing can be carried out from the bottom, or a notch is provided so that tearing can be carried out from the notch (Japanese Patent Laid-Open No. 39465/1987). In the above methods, troubles frequently occur including that the bag cannot be torn straight, the contents are damaged, or the liquid is scattered. On the other hand, vacuum packaging or retort packaging is, in many cases, inconvenient because a cutting tool should be used or it is difficult to take out the contents from the package because the contents are adhered to the bag. In recent years, easy-tear packaging materials with various ideas being incorporated have been developed.

Overlap packages in confectionery and tobaccos are generally provided with an opening tape (Japanese Patent Laid-Open No. 67273/1988) to impart an easy-open property to the packages. In general, the overlap package is produced by a single packaging system, and an easy-open stretched polyethylene (Japanese Patent Laid-Open No. 55059/1988), polypropylene, or cellophane is used in a small thickness (20 to 30 $\mu$m) to impart an easy-open property to the film. On the other hand, for shrink packaging, the material, thickness, packaging machine, package form, and the like for the film used vary depending upon the applications and quality required. Therefore, various easy opening methods exist, and this, together with various technical problems, is one of the reasons why easy opening is not extensively adopted in shrink packages.

In general, the stretched film is, of course, easily torn in the stretching direction, and this tendency is particularly significant for a highly crystalline stretched film such as a high-density polyethylene (Japanese Patent Laid-Open No. 55059/1988).

Japanese Utility Model Publication No. 11258/1979 discloses, as a synthetic resin film having an easy-open property, polyethylene, polyvinyl chloride, polypropylene, polystyrol and nylon films which have been uniaxially stretched by 3 to 10 times.

Such a highly crystalline film, however, has problems including that the cut cannot be smoothly propagated and hang-up occurs in places, the film is locally stretched to render the opening very difficult and feather-like residues occur to deteriorate the image of goods. Although this film can be broken in a uniaxial direction, it is difficult to break the film in a direction perpendicular thereto, so that the contents cannot be easily taken out from PTP (press-through pack) using the film. Polyolefins, such as polyethylene, have a poor gas barrier property and, hence, have a problem that the contents of the package is deteriorated by oxidation.

The above plastic packaging materials generally have problems including that 1) they cannot be torn by hand or stretched and torn, i.e., do not have an easy-open property, 2) the gas barrier property is low, that is, the gas permeability is high, and 3) since various materials are used in combination, it is difficult to recycle the materials.

On the other hand, PTP's using aluminum as a cover do not suffer from the above problems. Since, however, the blister sheet and the cover are strongly bonded to each other with an adhesive, the separation of the blister sheet from the cover is so difficult that it is impossible to separate the resin and aluminum from each other for recycle. Further, even though the used packs are incinerated, aluminum remains unburned.

Further, since aluminum used as a cover in blister packs and PTP's is opaque, any optical test of the contents cannot be carried out from the side of the cover with the blister sheet and the cover being integrally formed.

Furthermore, also from the viewpoint of preventing the contents from being kept out of mischief, these packages are preferably easy to open and transparent so that whether or not the contents have been once taken out can visually learn.

An object of the present invention is to solve the above problems of the prior art and to provide a packaging film which can satisfy requirements for gas barrier properties, easy-open properties (including easy-tear and press-through properties) and can be recycled.

DISCLOSURE OF THE INVENTION

The present inventors have found that the molding of a polyethylene-2,6-naphthalate (hereinafter referred to as "PEN") having property values falling within particular ranges into a PEN film having property values and degree of working falling within particular ranges provides such a property as to easily break in a plurality of directions including the stretching direction upon the application of force, that is, easy-open properties (including easy-tear and press-through properties) and that the PEN film having such a property is useful as flexible packaging bags, for example, a packaging materials, for example, pouches and small bags, and best suited as cover materials particularly for blister packs and PTP's, which has led to the completion of the present invention.

Specifically, the above easy-open properties can be realized by a weakly stretched PEN film, which has been stretched by 1 to 3 times and 1 to 3 times respectively in the longitudinal and transverse directions, and a strongly stretched PEN film, which has been stretched by 3 to 6 times and 1 to 1.8 times respectively in the longitudinal and transverse directions (these PEN films being described in the following first invention), a PEN resin comprising a blend of two PEN resins and a film comprising the PEN resin (second invention), and a modified PEN resin and a film comprising the modified PEN resin (third invention). In the present invention, the (weakly) stretched films include also a film having a stretch ratio of 1 time in each of the longitudinal and transverse directions, that is, an unstretched film.

The present invention discloses, in addition to the following first to third inventions, a further PEN film capable of satisfying easy-open property requirements, which PEN film is specified in a particular property test. More specifically, such a PEN film satisfies simultaneously a press-through strength in the range of from 0.9 to 4.5 kgf and a press-through elongation of not more than 10 mm, the press-through strength and the press-through elongation being defined respectively as a strength and an elongation caused when a stainless steel rod 1 (in a cylindrical form having a diameter of 9 mm with the end 2 being curved) having a mirror-finished end 2 as shown in FIG. 3 was descended perpendicularly to the film at a rate of 50 mm/min with the film being horizontally held and could be pressed through the film. When the press-through strength is less than 0.9 kgf, the film is so fragile that it is substantially impossible for a packaging machine to handle such a film. On the other hand, when the press-through strength exceeds 4.5 kgf, it is very difficult to break the film by hand. When the press-through elongation exceeds 10 mm, the film is excessively elongated upon pressing by the hand, which renders such a film unsuitable for practical use.

First Invention

The first invention of the present application (hereinafter referred to as "first invention") provides a weakly stretched PEN film comprising a resin composed mainly of PEN having an intrinsic viscosity η in the range of from 0.31 to 0.6, said film having stretch ratios of 1 to 3 times and 1 to 3 times respectively in substantially mutually perpendicular directions and a thickness in the range of from 5 to 150 μm, a process for producing said film, and applications of said film.

Further, the first invention provides a strongly stretched PEN film comprising a resin composed mainly of PEN having an intrinsic viscosity η in the range of from 0.31 to 0.6, said film having stretch ratios of 3 to 6 times and 1 to 1.8 times respectively in substantially mutually perpendicular directions and a thickness in the range of from 5 to 150 μm, a process for producing said film, and applications of said film.

The PEN films according to the first invention, when used particularly as a cover for blister packs, can exhibit press-through properties unattainable by the conventional plastic covers used in the art. Thus, they can solve all the above problems of the prior art.

Furthermore, the first invention provides a process for producing a PEN film, comprising the steps of: providing a resin composed mainly of PEN having an intrinsic viscosity η in the range of from 0.31 to 0.6, stretching the resin at 120° to 270° C. in substantially mutually perpendicular directions respectively by 1 to 3 times and 1 to 3 times, heat-setting the stretched resin at 170° to 270° C. for 1 sec to 30 min and molding the heat-set resin into a film having a final thickness in the range of from 5 to 150 μm.

Furthermore, the first invention provides a process for producing a PEN film, comprising the steps of: providing a resin composed mainly of PEN having an intrinsic viscosity η in the range of from 0.31 to 0.6, stretching the resin at 120° to 170° C. in substantially mutually perpendicular directions respectively by 3 to 6 times and 1 to 1.8 times, heat-setting the stretched resin at 170° to 270° C. for 1 sec to 30 min and molding the heat-set resin into a film having a final thickness in the range of from 5 to 150 μm.

The PEN film according to the first invention can be prepared by molding the above PEN resin alone. Alternatively, it is also possible to produce the PEN film by a production process which comprises co-extruding the PEN resin and a synthetic resin, stretching the co-extrudate under the above conditions and removing the synthetic resin. Furthermore, for some packages, when the contents are hygroscopic or likely to be oxidized, it is possible, if necessary, to laminate a water vapor barrier layer, an oxygen barrier layer or both the above layers. When the contents are heavy, it is also possible to laminate a reinforcing layer comprising a synthetic resin.

The blister pack or PTP according to the first invention comprises a cover of the above PEN film and a holding portion (a blister) bonded to the cover with an adhesive or a heat-sealing agent.

The PEN film provided by the first invention can be used as various bags for packages.

The process for producing the PEN resin according to the first invention will now be described in more detail.

The resin contemplated in the first invention is a polyester comprising repeating units of PEN. Specifically, the polyester comprises 2,6-naphthalenedicarboxylic acid as an acid moiety and ethylene glycol as a hydroxy moiety. Basically, a packaging material consisting of this resin alone is preferred from the viewpoint of recycling. However, the present invention can be practiced also when other polymers are blended with the above resin. In this case, the content of the PEN resin as a main component should be not less than 60% by weight, preferably not less than 80% by weight, still preferably not less than 90% by weight, based on the other polymers.

The PEN resin used in the first invention may be produced by a conventional production process described in, for example, Japanese Patent Publication Nos. 22100/1972, 35260/1973, 40918/1973, 37599/1974, or 945/1979 or a combination of the above methods. Briefly stating, a high-molecular weight polyester comprising ethylene-2,6-naphthalate as main repeating units is prepared using as main starting compounds 2,6-naphthalenedicarboxylic acid or a lower alkyl ester thereof and ethylene glycol. In this case, the process usually comprises two steps, i.e., the first step of providing bis-β-hydroxyethyl-2,6-naphthalate or an oligomer thereof and the second step of polycondensating the compound provided in the first step.

The first step is carried out by an esterification of the dicarboxylic acid with the glycol or by a transesterification of a lower alkyl ester of the dicarboxylic acid with the glycol. Any of these methods may be used in the first invention.

The transesterification may be carried out by heating 2,6-dimethyl naphthalate and ethylene glycol in at least an equimolar amount, preferably ethylene glycol in an amount of 1.5 to 3 times by mole in the presence of a suitable catalyst, for example, at least one carboxylic acid alcoholate or hydride of a metal selected from the group consisting of Li, Na, K, Mg, Ca, Sr, Ba, Zn, Cd, Al, Ge, Sn, Pb, Ti, Cr, Mn, Fe, Ni, Sb and Co, at a temperature in the range of from 150° to 250° C.

The esterification may be carried out by reacting 2,6-naphthalenedicarboxylic acid with ethylene glycol in an amount of not less than about 0.8 time by mole, preferably 1.0 to 5 times by mole.

After bis-β-hydroxyethyl-2,6-naphthalate or an oligomer thereof is prepared in the first step, the product in the first step is subjected to polycondensation by heating under reduced pressure in the second step. In the first invention, a polycondensation catalyst, for example, at least one carboxylic acid alcoholate or oxide of a metal selected from the group consisting of Mn, Ge, Sn, Ti and Sb, is added before or after the initiation of the second step, specifically after the first step is substantially completed and before the intrinsic viscosity does not exceed 0.2, and a polycondensation is allowed to proceed. In this case, if necessary, various additives, for example, sliding agents, light stabilizers, weathering agents, antistatic agents, heat stabilizers, light screens and pigments, may be added. They may be added alone or in combination of some of them. In this connection, it is noted that some of the additives may be added in the middle stage or latter stage in the first step and/or second step or immediately before the molding of a film. The amount of the additive used may be 0.001 to 10% by weight, preferably 0.005 to 1% by weight, based on the resin.

The sliding agents include organic compounds or inorganic compounds having an average particle diameter in the range of from 0.1 to 10 μm, preferably in the range of from 0.2 to 3 μm. Examples of the organic additive include high-melting polyethylene terephthalate, polyorganosiloxanes and crosslinked polymer compounds described in Japanese Patent Laid-Open Nos. 117550/1974 and 99948/1980 and the like. Examples of the inorganic additive include LiF, LiPO$_4$, MgSO$_4$, CaCO$_3$, SiO$_2$, TiO$_2$, kaolin, talc, celite, and the like described in Japanese Patent Publication Nos. 24099/1967, 23888/1968 and 8600/1971 and the like. CaCO$_3$, SiO$_2$, and kaolin are particularly suitable. The amount of the sliding agent added may be in the range of from 0.001 to 10% by weight, preferably in the range of from 0.005 to 1% by weight, based on the resin. After various additives including the sliding agent and the polycondensation catalyst are added, the second step is initiated wherein PEN having a high degree of polymerization is prepared by a reaction for removing ethylene glycol.

For the polymerization reaction in the step 2, with the advance of the reaction, the system is heated to gradually increase the reaction temperature. Specifically, the temperature of the system at the time of initiation of the reaction, i.e., 200° to 250° C., preferably 220° to 240° C., is increased to a temperature of about 270° to 310° C. in the final stage. Further, it is preferred to gradually evacuate the reaction system in such a manner that the pressure at the time of initiation of the reaction, i.e., normal pressure, is gradually reduced to not more than 10 mmHg, preferably not more than 1 mmHg, in the final stage. Although the reaction time for polymerization by the melt process varies depending upon the intrinsic viscosity of the resultant PEN, it is 0.5 to 5 hr, preferably 1 to 4 hr because an excessively long reaction time is cost-uneffective and, at the same time, causes a thermal decomposition reaction.

Upon the completion of the polymerization by the melt process, the polymer is usually withdrawn from the system by pressurization with an inert gas, for example, nitrogen gas, cooled, cut and brought to an even desired shape.

Further, in order to enhance the intrinsic viscosity of the PEN resin, it is also possible to prepare the PEN resin by a polymerization reaction at a temperature in the range of from the glass transition temperature to the melting point, that is, by the solid-phase polymerization. Specifically, a PEN resin having a relatively high intrinsic viscosity can be prepared by heating a PEN chip having an intrinsic viscosity in the range of from about 0.2 to 0.4 obtained by the melt process at a temperature below the melting point of PEN, i.e., 200° to 260° C., preferably 220° to 250° C., in an inert gas stream or under reduced pressure.

The intrinsic viscosity of the PEN resin suitable for the easy-open packaging film is in the range of from about 0.31 to 0.6, preferably in the range of from 0.38 to 0.47, still preferably in the range of from 0.4 to 0.45. When the intrinsic viscosity is less than 0.31, the PEN resin is so fragile that it is difficult to mold the PEN resin into a film, while when it is 0.6 or more, the easy-open property is unsatisfactory, making it difficult to take out the contents form packages.

Upon the completion of the polymerization, the polymer is usually withdrawn from the system by pressurization with an inert gas, for example, nitrogen gas, cooled, cut and brought to an even desired shape.

Thereafter, the PEN resin as a raw material thus obtained is transferred to the step of drying. If the resin is melt-extruded in the presence of water, it is hydrolyzed, resulting in remarkably lowered molecular weight. The purpose of drying is to prevent such an unfavorable phenomenon. In the step of drying, at least the water content of the PEN resin as a raw material should be reduced to not more than 100 ppm, preferably not more than 50 ppm in terms of the water content after drying. The step of drying may be carried out in air or an inert gas stream or under reduced pressure. Drying conditions, such as drying temperature and drying time, drying technique, drying equipment and the like may be those used in the art for drying thermoplastic polymers, particularly polyesters. For example, the drying technique may be selected from a technique where predrying is carried out at 120° to 180° C., a technique where the resin is crystallized to prevent fusing and main drying is then carried out, a technique where drying in air is carried out at 200° C. or below because the resin is subjected to remarkable thermal deterioration at a temperature above 200° C. and other techniques. Examples of the drying equipment include a vacuum drier, a rotary drier, a fluidized-bed drier, a channel drier and a stationary drier. They may be used alone or in combination of two or more.

The dried PEN resin is introduced into an extruder, melt-extruded in the temperature range of from 270° to 310° C. and cooled and solidified on a cooling drum to form an unstretched sheet. Two-stage cooling or cooling in water or a cooling medium may also be utilized for cooling (Japanese Patent Publication Nos. 39929/1972 and 10394/1972). Alternatively, the unstretched sheet may be produced by solution casting or calendering. If necessary, the unstretched sheet thus obtained may be stretched. It is also possible to use a method wherein the thickness of the sheet is regulated at the time of extruding and the sheet thus obtained, as such, is transferred to the step of heat treatment.

Further, as will be described later, a method wherein a PEN resin extruded at a temperature in the range of from 270° to 310° C. is laminated onto a synthetic resin film (extrusion coating (EC) method or heat lamination). In this case, the sheet thus obtained, as such, is transferred to the step of heat treatment without stretching.

High-density PE (HDPE), medium-density PE (MDPE), low-density PE (LDPE), straight-chain low-density PE (LLDPE), cyclic polyolefin (COC), PC, PP, PET, Ny, PVA, PBT, and other synthetic resin films may be used as the above synthetic resin film, and, if necessary, an adhesive may be used.

The adhesive used may be a commercially available anchor coat (AC) agent and properly selected according to the synthetic resin film.

The sheet, which is transferred to the step of stretching, is stretched by 1 to 3 times and 1 to 3 times respectively in mutually perpendicular directions at a temperature of 120° to 270° C. (weak stretching) or by 3 to 6 times and 1 to 1.8 times respectively in mutually perpendicular directions at a temperature of 120° to 170° C. (strong stretching).

For weak stretching, when the stretching temperature is below 120° C., the material is not softened to such an extent as being stretched, resulting in a failure of stretching. on the other hand, when the stretching temperature is above 270° C., the polymer is melted, rendering stretching impossible.

For strong stretching, when the stretching temperature is below 120° C., the material is not softened sufficiently to be stretched, resulting in a failure of stretching. On the other hand, when the stretching temperature exceeds 170° C., the orientation and crystallization effects attained by stretching are so unsatisfactory that no easy-open property is obtained and, even though the film is used in PTP or the like, it is difficult to take out the contents from the pack.

Regarding the direction of stretch, in the case of weak stretching wherein the stretch ratio is not more than 3 times, both uniaxial stretching and biaxial stretching can realize the easy-open properties because the molecular orientation is not very even.

On the other hand, in the case of strong stretching wherein the stretch ratio exceeds 3 times, the molecular chains are oriented in the direction of the plane, so that biaxial stretching provides excessively high film strength, resulting in lowered easy-open properties. In this case, it is necessary to strongly stretch the film in either longitudinal or transverse direction, and a PEN film having excellent easy-open properties can be prepared by stretching in two mutually perpendicular directions respectively by 3 to 6 times and 1 to 1.8 times.

Regarding the direction of stretch, any of uniaxial stretching (Japanese Patent Laid-Open No. 159319/1984) and biaxial stretching may be used. When biaxial stretching is carried out, sequential biaxial stretching, simultaneous biaxial stretching or a combination thereof may be used. In the case of sequential biaxial stretching, the film may be stretched first in the longitudinal direction and then in the transverse direction, or alternatively may be stretched first in the transverse direction and then in the longitudinal direction (Japanese Patent Publication Nos. 8338/1959, 1588/1962, and 12496/1964 and the like).

Stretching methods may be roughly classified into tentering and tubing.

In the tentering method, a molten polymer extruded through a T-die slit of an extruder is set by cooling on a casting drum and stretched in the longitudinal direction by 1 to 3 times or 3 to 6 times by means of a heating roll between a delay (front) drive roll and a quick (rear) drive roll to form a stretched film. The stretched film then enters a tenter, where it is heated with both ends of the film being held, causing the film to be stretched in the transverse direction by 1 to 3 times or 1 to 1.8 times, thereby to form a further stretched film. Thereafter, the stretched film is heat-treated in a back chamber of the tenter with both ends of the film being held, causing crystallization and the fixation of molecular orientation.

The tubing method can be regarded as a modified form of the inflation method. Specifically, a molten polymer is extruded in a tubular form through a ring die of the same extrusion as the inflation and rapidly cooled in a cooling bath. Subsequently, the tube is heated by infrared radiation, and air is introduced into the tube to apply an internal pressure, or alternatively the outside atmosphere of the tube is evacuated, thereby stretching the tube in the transverse direction. At the same time, tension is applied in the longitudinal direction, thus conducting biaxial simultaneous stretching. After stretching, the tube is folded by means of a nip roll and then taken up. Alternatively, compressed air may be again introduced while infrared heating, thereby again expanding and stretching the film, and the tube is again folded by means of a nip roll and heat-treated by infrared radiation to cause recrystallization, thereby stabilizing the molecular orientation. Finally, the tube is folded flat, or alternatively may be cut into two stretched films.

Which method of the tentering method and the tubing method is selected may be determined by taking the object films and applications and other factors into consideration. It is said that the tentering method is more advantageous in terms of properties of the film, i.e., more even stretching and less susceptibility to wrinkling, while the tubing method is more advantageous in terms of more even molecular orientation. Further, with respect to yield, the tubing method is more advantageous when scrapping of edge of the end portion of the film necessary in the tentering method is taken into consideration.

The stretched film is then fed into a heat setting zone for crystallization and fixation of the molecular orientation, where it is heat-treated and heat-set at 170° to 270° C. for 1 sec to 30 min. The heat setting temperature is 170° to 270° C., preferably 190° to 250° C., still preferably 200° to 240° C.

When the heat setting temperature is below 170° C., the fixation of the molecular orientation and the progress of the crystallization are insufficient, making it difficult to taken out the contents from PTP's. On the other hand, it is above 270° C., no film can be formed because the material is melted.

The thermosetting time is suitably 1 sec to 30 min, preferably 2 sec to 10 min, still preferably 2 sec to 1 min.

When the heat setting time is less than 1 sec, the fixation of the molecular orientation and the progress of the crystallization are insufficient, making it difficult to take out the contents from PTP's. On the other hand, when it exceeds 30 min, the crystallization proceeds excessively, rendering the film too fragile to provide a packaging material having good easy-open properties.

The device for heat treatment is a tenter, and the heat treatment is mainly carried out with the film being clipped. However, it may also be carried out by other methods (see, for example, Japanese Patent Publication No. 3040/1968 and 7159/1969). The heat-set film is taken up by a master roll, slit to a desired size, and then applied to the next step.

Thus, a stretched and heat-set PEN film is produced. If necessary, it is further subjected to various surface treatments. Examples of the surface treatment include corona discharge treatment (Japanese Patent Publication No. 12383/1965), UV treatment (Japanese Patent Laid-Open No. 136364/1975), IR treatment (Japanese Patent Publication No. 16317/1968), low-temperature plasma treatment (Japanese Patent Laid-Open No. 80373/1979), graft polymerization (Japanese Patent Laid-Open No. 152913/1984), electron beam irradiation treatment (Japanese Patent Laid-Open No. 113579/1975), radiation irradiation treatment (Japanese Patent Laid-Open No. 132160/1974), alkali treatment, various solvent treatments and various coating treatments. These may be carried out alone or in combination, depending upon applications and purposes.

Further, in order to impart several functions to the film, an organic or inorganic material layer having a single or multilayer structure may be laminated onto the surface of the film.

The above method can provide a PEN film having easy-open properties.

The thickness of a stretched PEN film suitable for easy-open packaging, such as PTP, varies depending upon factors such as the size and hardness of the contents, it is suitably in the range of from 5 to 150 $\mu$m. When the film thickness is less than 5 $\mu$m, the film is too thin to hold the contents, i.e., broken in transit. Further, a problem arises associated with ensuring gas barrier properties. On the other hand, when the film thickness exceeds 150 $\mu$m, the strength of the film per se is so high that the contents cannot be taken out from PTP's, rendering such a film unsuitable for easy-open packaging.

For example, when the contents are small objects, such as sanitary articles, medical supplies, office requirements, gardening goods, and carpenter's tools, the film thickness is suitably in the range of from 20 to 150 $\mu$m. The larger the contents and the harder the contents, the larger the suitable thickness.

When the contents are tableted confectionery, such as candies and chocolates, and pharmaceutical preparations, such as tablets and capsules, the film thickness is preferably in the range of from 10 to 30 $\mu$m, still preferably 10 to 25 $\mu$m.

Further, when the contents are button cells, the film thickness is, in general, suitably in the range of from about 20 to 150 $\mu$m. It also varies depending upon the thickness of the button cells. Specifically, it is suitably in the range of from 30 to 50 $\mu$m for cells having a diameter of about 10 mm and suitably in the range of from 70 to 120 $\mu$m for cells having a diameter of about 20 mm.

As described above, the present stretched PEN film can be prepared by molding of the PEN resin alone. It is also possible to produce the stretched PEN film by a production process which comprises co-extruding the PEN resin and a synthetic resin, stretching the co-extrudate under the above conditions and removing the synthetic resin.

More specifically, a PEN resin and an olefin resin, such as polypropylene or polyethylene, or a PET, Ny, PVA, or PBT resin are co-extruded in the temperature range of from 270° to 310° C. to form an unstretched sheet comprising two layers of a PEN resin and a synthetic resin. The two-layer sheet is stretched and heat-treated under the above conditions, and the synthetic resin film is then peeled off. Thus, a stretched PEN film suitable for easy-open packaging can be produced.

When the contents are particularly hygroscopic or likely to be oxidized, it is possible, if necessary, to laminate a water-vapor barrier layer, an oxygen barrier layer or both the above layers onto the stretched PEN film.

The water-vapor barrier layer may comprise any of organic and inorganic compounds. Examples of the organic compound include olefin resins, olefin-modified resins, ethylene/vinyl alcohol copolymer, vinylidene chloride, and ethylene/vinyl acetate copolymer (EVA), while $SiO_x$, $Al_2O_3$, and other inorganic compounds are usable as the inorganic compound.

The oxygen barrier layer too may comprise any of organic and inorganic compounds. Examples of the organic compound include ethylene/vinyl alcohol copolymer, vinylidene chloride, and EVA, while $SiO_x$, $Al_2O_3$, and other inorganic compounds are usable as the inorganic compound.

When an organic barrier layer is provided, the lamination may be carried out by co-extrusion and stretching at the time of the preparation of the PEN film. Alternatively, after the preparation of a stretched PEN film, an anchor coat (AC) agent may be coated followed by extrusion coating (EC). Furthermore, dry lamination may be used, and it is also possible to adopt coating. The thickness of the organic barrier layer is suitably in the range of from about 0.1 to 10 $\mu$m. The organic barrier layer, however, may have a larger thickness when it serves as a reinforcing layer which will be described later. When the inorganic barrier layer is provided, film formation may be carried out after the preparation of a stretched PEN film. Deposition, sputtering, CVD, and the like may be used for the film formation.

If the thickness of the PEN film is very thin for the size and weight of the contents and, hence, unsatisfactory in strength to cause a fear of the film being broken in transit, a reinforcing layer of a synthetic resin can be further laminated onto at least one side of the PEN film. The material for constituting the reinforcing layer may be any synthetic resin so far as it can be broken together with the PEN film upon the application of such pushing force or tearing force as to break the PEN film, and examples thereof include olefin resins, such as HDPE, MDPE, LDPE, LLDPE, ionomers, PP, and cyclic polyolefins, polyester resins, such as PET, PC, and PBT, Ny, and PVA. Further, it is also possible to use PEN resins having a high IV value and/or strength imparted by stretching. The reinforcing layer may be laminated by co-extrusion at the time of the preparation of the PEN film or extrusion lamination of the PEN resin onto a reinforcing layer, and dry lamination may be carried out. When the resin to be co-extruded is an olefin resin, a polyester resin other than PEN, Ny, PVA, or the like, it is necessary to extrude an adhesive resin into between the resin co-extruded and the PEN. The adhesive resin may be a polyolefin polymer, a polyester polymer, a urethane polymer, or other polymers. When the PEN resin is extrusion-laminated or dry-laminated onto the above resin, it is necessary to use an AC agent. Usable AC agents include polyolefin, modified polyolefin, urethane, polyester, urethane-modified polyester, partially urethane-modified polyester, polyether, and modified ether polyester AC agents. Ozone treatment at the time of the extrusion lamination can enhance the adhesion between the PEN layer and the reinforcing layer. Although the thickness of the reinforcing layer is not particularly limited so far as the easy-open properties of the PEN film are not deteriorated, it is suitably in the range of from about 1 to 50 μm. When the thickness is less than 1 μm, the strength of the layer is so low that the layer cannot serve as a reinforcing layer. On the other hand, when the thickness exceeds 50 μm, it becomes difficult to maintain the press-through property of the PEN film.

PVC, PP, PET, PEN, and other materials are suitable as blister sheet materials from the viewpoint of transparency and moldability. Among them, PEN which constitutes also the cover material is most desired when recycling of the whole packaging material is taken into consideration. The blister sheet is required to have a capability of protecting the contents against external force and, further, moisture barrier properties enough to prevent ambient moisture from permeating into a pack, lightproofness enough to prevent the deterioration of the contents by light and, when the contents are foods, oxygen barrier properties. In particular, when moisture barrier properties are required, a sheet with PVDC being laminated thereto is suitable. The thickness of the blister sheet is, in many cases, about 100 to 500 μm in a non-molded portion.

The blister sheet, in which the contents are placed, is generally prepared by pressure forming or vacuum forming. If the blister is large, it may be prepared by plug-assist forming besides the above methods. Specifically, a plastic sheet is taken out from a spool, heated by means of a hot plate or an infrared heater and formed into a desired shape using a mold according to the shape of the contents.

The easy-open package of the first invention can be completed by bonding the stretched PEN film and the resin molding (blister, holding section) obtained above together by means of an adhesive or a heat seal. Roll sealing and flat sheet sealing may be mentioned as sealing methods. The roll sealing can realize stable filling and provide good appearance. Heat seal (HS) or contact bonding can be utilized for sealing between the blister and the cover (PEN film). Heat sealing agents include general heat sealing agents used for polyesters, which may be any of thermoplastic and thermosetting resins, such as nitrile rubber, urethane, chloroprene, epoxy, cyanoacrylate, and polyester resins. Although HS temperature may vary depending upon HS agents and the like, it is generally about 130° to 180° C. The HS agent may be of any of solvent, aqueous and hot-melt types, and isocyanate or other types of curing agents may, if necessary, be added thereto. The concentration of the isocyanate curing agent is suitably in the range of from 0.5 to 10 parts by weight based on 100 parts by weight, although it varies depending upon HS agents. When the concentration is less than 0.5 part by weight, the bonding strength cannot be enhanced. On the other hand, it exceeds 10 parts by weight, the HS layer becomes so hard that heat sealing becomes difficult.

The HS agent may be laminated onto the stretched PEN film by coating or melt extrusion commonly used in the art. In the case of coating, gravure coating, three-roll coating, Komma coating, and other suitable coating methods are selected depending upon the HS agent. In the case of contact bonding, the pressure for this purpose is generally in the range of from about 1 to 10 kgf/cm². The adhesive used in the contact bonding may be laminated onto the stretched PEN film by the same method as described above.

As described above, the easy-open package of the first invention can be obtained by bonding the stretched PEN film and the resin molding (blister) obtained above together by means of an adhesive or a heat seal. Further, it is convenient to conduct blanking using a mold for the purpose of taking out necessary portions only or to provide perforations or slits so that the packs can be separated one by one.

Furthermore, the provision of a printed layer by lamination followed by printing of inscriptions, such as name of contents, date of production, and expiration date for each pack enables the information to be confirmed, when the pack is separated and the contents thereof is taken, and, at the same time, can prevent erroneous taking of contents different from contemplated ones.

Second Invention

The second invention of the present application (hereinafter referred to as the "second invention") provides a polyethylene-2,6-naphthalate resin comprising a blend composed mainly of two components of: a polyethylene-2,6-naphthalate resin having an intrinsic viscosity in the range of from 0.3 to 0.5 dl/g and prepared by an esterification reaction of a dicarboxylic acid having a 2,6-naphthalenedicarboxylic acid content of not less than 90% by mole with a glycol having an ethylene glycol content of not less than 90% by mole or a transesterification and a polyethylene-2,6-naphthalate resin having an intrinsic viscosity in the range of from 0.5 to 0.7 dl/g and prepared by an esterification reaction of a dicarboxylic acid having a 2,6-naphthalenedicarboxylic acid content of not less than 90% by mole with a glycol having an ethylene glycol content of not less than 90% by mole or a transesterification, the resin blend having an intrinsic viscosity in the range of from 0.31 to 0.68 dl/g, and, further, provides a film comprising the above resin.

Furthermore, the second invention provides a PEN film wherein the resin blend comprises the above resins in a blending weight ratio of in the range of from 5:95 to 95:5 and a degree of dispersion of in the range of from 2.8 to 5.

The polyester contemplated in the second invention is a polyester comprising main repeating units of ethylene-2,6-naphthalate (PEN), that is, a polyester comprising 2,6-naphthalenedicarboxylic acid as a main acid moiety and ethylene glycol as a main hydroxy moiety.

The PEN resin of the second invention is prepared by blending a resin as a lower molecular weight component with a resin as a higher molecular weight component. The resin as the lower molecular weight component has an intrinsic viscosity in the range of from 0.3 to 0.5 dl/g, preferably in the range of from 0.3 to 0.45 dl/g, still preferably from 0.3 to 0.4 dl/g. On the other hand, the resin as the higher molecular weight component has an intrinsic viscosity in the range of from 0.5 to 0.7 dl/g, preferably in the range of from 0.55 to 0.7 dl/g, still preferably in the range of from 0.6 to 0.7 dl/g. When the intrinsic viscosity of the resin as the lower molecular weight component is less than 0.3 dl/g, the resin blend is too fragile to be molded into a film. On the other hand, when it exceeds 0.5 dl/g, the easy-open properties are deteriorated. When the intrinsic viscosity of the resin as the higher molecular weight component is less than 0.5 dl/g, the strength of the molded film is insufficient, rendering the film unsuitable as a packaging material. On the other hand, when it exceeds 0.7 dl/g, the easy-open properties are deteriorated.

The intrinsic viscosity of the resin blend is in the range of from 0.31 to 0.68 dl/g, preferably in the range of from 0.4 to 0.6 dl/g, still preferably in the range of from 0.4 to 0.55 dl/g. When the intrinsic viscosity is less than 0.31 dl/g, the resin blend is too fragile to be molded into a film. On the other hand, when it exceeds 0.68 dl/g, the easy-open properties are deteriorated.

Further, the blending weight ratio of the resin as the lower molecular weight component to the resin as the higher molecular weight component is in the range of from 5:95 to 95:5, preferably in the range of from 1:9 to 9:1, still preferably in the range of from 2:8 to 8:2. When the weight ratio of the resin as the lower molecular weight component to the resin as the higher molecular weight component is outside the above range, the formation of a heterogeneous structure (islands-sea structure) in the resin blend is insufficient, so that no easy-open property can be developed.

The degree of dispersion of the resin blend is in the range of from 2.8 to 5, preferably in the range of from 3 to 4.8, still preferably in the range of from 3 to 4.5. If the degree of dispersion is less than 2.8 or exceeds 5, no satisfactory heterogeneous structure (islands-sea structure) can be formed in the resin blend, rendering the development of the easy-open property difficult.

The process for producing a PEN resin according to the second invention will now be described in more detail.

As described above, one PEN resin having an intrinsic viscosity in the range of from 0.31 to 0.6 is used in the first invention. On the other hand, a blend of a PEN resin having a lower molecular weight with a PEN resin having a higher molecular weight is used in the second invention.

The acid moiety, which is one of the moieties constituting the PEN resin, will now be described. It comprises not less than 90% by mole of 2,6-naphthalenedicarboxylic acid which may occupy the whole acid moiety unless there is a particular purpose. Acid moiety other than 2,6-naphthalenedicarboxylic acid include aromatic dicarboxylic acids, such as terephthalic acid, isophthalic acid, 2,7-naphthalenedicarboxylic acid, 1,8-naphthalenedicarboxylic acid, and diphenyl-4,4'-dicarboxylic acid. They may be used alone or in the form of a mixture of two or more. The hydroxy moiety as the other moiety constituting the PEN comprises not less than 90% by mole of ethylene glycol and not more than 10% by mole of a glycol moiety other than ethylene glycol. Examples of the glycol moiety other than ethylene glycol include trimethylene glycol, tetramethylene glycol, diethylene glycol, hexamethylene glycol, neopentyl glycol, and 1,4-cyclohexanedimethanol. They may be used alone or in the form of a mixture of two or more.

Two PEN resins before blending may be produced by substantially the same process as described above in connection with the PEN resin of the first invention. Specifically, 2,6-naphthalenedicarboxylic acid and/or a lower alkyl ester thereof and ethylene glycol are used as main starting materials to prepare a higher molecular weight polyester comprising ethylene-2,6-naphthalate as main repeating units, and the process comprises the first step of preparing bis-β-hydroxyethyl-2,6-naphthalate and/or an oligomer thereof and the second step of subjecting the product obtained in the step 1 to further polycondensation. More detailed description thereon will be omitted.

The molecular weight of the PEN resin can be regulated by the polymerization reaction time in the melt process or the solid phase polymerization method, thus enabling two PEN resins having different intrinsic viscosities used in the second invention to be prepared.

The two PEN resins after drying are charged into an extruder through a hopper and extruded through a die to form a sheet which is then applied to the subsequent film production process. In the second invention, blending of two PEN resins, that is, blending of a lower molecular weight PEN resin with a higher molecular weight PEN resin is carried out in the this extrusion process. Specifically, the lower molecular weight PEN resin and the higher molecular weight PEN resin are blend together respectively in predetermined proportions, and the blend is charged into a hopper. The charged polymer material is melted, kneaded and blended by means of a screw at a temperature of 270° to 310° C., extruded, fed at a constant rate by means of a gear pump, filtered to remove coarse solid matter, and delivered through a die.

The two PEN resins are blended in the extruder. In this case, in order to satisfactorily form a heterogeneous structure (islands-sea structure) contemplated in the present invention, it is desired to conduct kneading as mildly as possible, and in the extruder, the use of a single screw having a small L/D value is effective.

The filtration can be carried out by using conventional filters used in the production of polyesters, preferably a leaf filter which can remove particles having a size of 3 to 50 μm or more and permits a large filtration area.

Thus, the molten polymer is delivered through a nozzle of a die, thereby forming an unstretched sheet.

The cooled and set unstretched sheet is applied to the subsequent stretching step and heat treatment/heat setting step. The stretching step and heat treatment/heat setting step are quite the same as those in the first invention, and, therefore, the description thereon will be omitted.

The heat-set film is taken up by a master roll, slit to a desired size and applied to the next step. It is a matter of course that known devices can be applied to the step of taking up and slitting the film.

The stretched and heat-set PEN resin film can be produced by the above process. If necessary, various treatments may be carried out. These treatments are the same as those in the first invention, and the description thereon will be omitted.

Basically, the easy-open PEN resin and the film comprising the same according to the second invention are produced by the above technique, and the formation of a heterogeneous structure (islands-sea structure) comprising a lower molecular weight resin and a higher molecular weight resin leads to the development of easy-open properties in the lower molecular weight portion with the higher molecular weight portion imparting strength suitable for a packaging material to the material. When the amount of the PEN component having a lower molecular weight (component A) incorporated or the PEN component having a higher molecular weight (component B) incorporated is less than 5% by weight or exceeds 95% by weight, the formation of a heterogeneous structure (islands-sea structure) is unsatisfactory, so that no easy-open property can be developed.

Regarding the film thickness, a film having a thickness of not more than 30 μm, of course, has good easy-open properties. Further, even a film having a relatively large thickness of 30 to 50 μm has good easy-open properties, and, by virtue of the effect of the film thickness, this film has good gas barrier properties as well.

Furthermore, the film consists of a single component, i.e., PEN resin, and, hence, can be recycled, and incineration thereof evolves no harmful gas with the occurrence of low calorie.

Third Invention

The third invention of the present application (hereinafter referred to as the "third invention") provides a modified polyethylene-2,6-naphthalate resin comprising an acid moiety with not less than 90% by mole thereof being a 2,6-naphthalenedicarboxylic acid and a hydroxy moiety with 90 to 99.5% by mole thereof being ethylene glycol and 0.5 to 5% by mole thereof being a hydroxy compound having three or more ester forming functional groups, and further provides a packaging film comprising this resin material.

The acid moiety, which is one of the moieties constituting the modified PEN resin according to the third invention, comprises not less than 90% by mole of 2,6-naphthalenedicarboxylic acid which may occupy the whole acid moiety unless there is a particular purpose. Acid moiety other than 2,6-naphthalenedicarboxylic acid include aromatic dicarboxylic acids, such as terephthalic acid, isophthalic acid, 2,7-naphthalenedicarboxylic acid, 1,8-naphthalenedicarboxylic acid, and diphenyl-4,4'-dicarboxylic acid.

The hydroxy compound moiety as the other moiety constituting the modified PEN according to the third invention comprises a hydroxy compound, having two ester forming functional groups, composed mainly of ethylene glycol and a hydroxy compound having three or more ester forming functional groups. Hydroxy compounds, having two ester forming functional groups, other than ethylene glycol are not particularly limited and include 1,2-propylene glycol, 1,4-butanediol, 1,5-pentanediol, 1,6-hexanediol, neopentyl glycol, 1,4-cyclohexanedimethanol, and other compounds having two functional groups which substantially give rise to a chemical reaction with a carboxyl group of the acid moiety to form an ester bond. The hydroxy compound having three or more ester forming functional groups are not particularly limited so far as it has three or more functional groups which substantially give rise to a chemical reaction with a carboxyl group of the acid moiety to form an ester bond, and examples thereof include glycerin, pentaerythritol, trimethylolpropane, 1,2,4-butanetriol, 1,2,6-hexanetriol, and 2-hydroxymethyl-2-methyl-1,3-propanediol with glycerin, pentaerythritol, and trimethylolpropane being preferred. The proportions of the hydroxy compound, having two ester forming functional groups, composed mainly of ethylene glycol and the hydroxy compound having three or more ester forming functional groups are such that the proportion of the hydroxy compound, having two ester forming functional groups, composed mainly of ethylene glycol is 90 to 99.5% by mole, preferably 93 to 99% by mole, still preferably 96 to 98% by mole, while the proportion of the hydroxy compound having three or more ester forming functional groups is 0.5 to 10% by mole, preferably 1 to 8% by mole, still preferably 1 to 5% by mole. When the amount of the hydroxy compound having three or more ester forming functional groups is less than 0.5% by mole, easy-to-open properties (easy-open properties) are unsatisfactory. On the other hand, if it exceeds 10% by mole, the material is very fragile and, hence, unsuitable as a packaging film.

The intrinsic viscosity of the modified PEN resin according to the third invention is in the range of from 0.38 to 0.70 dl/g, preferably in the range of from 0.4 to 0.62 dl/g. When the intrinsic viscosity is less than 0.38 dl/g, the resin is too fragile to be molded into a film, while when it exceeds 0.70 dl/g, the easy-open properties are deteriorated.

In a system where no hydroxy compound having three or more ester forming functional groups, such as glycerin, is added, that is, in the first invention, no easy-open property is developed if the intrinsic viscosity is not less than 0.6 dl/g. On the other hand, in a system according to the third invention, where a hydroxy compound having three or more ester forming functional groups is added, the easy-open properties can be developed when the intrinsic viscosity is up to 0.70 dl/g.

The modified polyethylene-2,6-naphthalate (PEN) according to the third invention may be produced in substantially the same manner as described above in connection with the first invention and the second invention, except that the resin material is different from that of the first and second inventions. Roughly speaking, 2,6-naphthalenedicarboxylic acid and/or a lower alkyl ester thereof and a hydroxy compound are used as main starting compounds to prepare a modified PEN resin. In this case, the process usually comprises two divided steps, that is, the first step of preparing a transesterification intermediate and/or an oligomer thereof and the second step of subjecting the product obtained in the first step to further polycondensation.

In the first step, a dicarboxylic acid is esterified with a hydroxy compound, or alternatively a lower alkyl ester of a dicarboxylic acid may be transesterified with a hydroxy compound. In the third invention, any of these methods may be adopted.

The first step is quite the same as that in the first and second inventions, and, therefore, the description thereon will be omitted.

The product obtained in the first step is then applied to the second step of subjecting the product obtained in the step 1 to a reaction for removing ethylene glycol, thereby preparing a PEN resin having a high degree of polymerization.

In the polymerization reaction in the second step, the temperature, pressure, and reaction time are quite the same as those in the first invention.

In this case, it is possible to use any of a method wherein a transesterification intermediate prepared from 2,6-naphthalenedicarboxylic acid and ethylene glycol and a transesterification intermediate prepared from 2,6-naphthalenedicarboxylic acid and a hydroxy compound having three or more ester forming functional groups, such as glycerin, pentaerythritol or trimethylolpropane, are mixed together and a polycondensation reaction is then allowed to proceed, and a method wherein in the stage of the transesterification reaction, ethylene glycol as the glycol component is used in combination with a hydroxy compound having three or more ester forming functional groups, such as tetraglycerin, pentaerythritol or trimethylolpropane, to prepare a transesterification intermediate which is then subjected to a polycondensation reaction. Further, solid-phase polymerization is carried out in quite the same manner as described above in connection with the first and second inventions.

After the completion of melt polymerization, the resultant resin is pressurized by an inert gas, for example, nitrogen gas, and delivered, cooled, and cut into chips having a desired shape.

The modified PEN resin material is then dried because it, when melt-extruded in the presence of water, undergoes hydrolysis resulting in remarkably lowered molecular weight. Conditions and the like for drying are also the quite the same as those in the first and second inventions.

The process for producing a film will now be described in detail.

The dried modified PEN resin is charged into an extruder through a hopper, melt-extruded, and set by cooling on a cooling drum to prepare an unstretched film.

In the first and second inventions, the unstretched film goes through the step of stretching to prepare a PEN film having easy-open properties. In the case of the modified PEN resin, the unstretched film, as such, has easy-open properties. Therefore, after stretching, the film has easy-open properties independently of stretching conditions such as stretching temperature and stretch ratio.

In general, when a resin film is prepared, a stretching process is often used to provide a thin film. In the third invention as well, a stretching process, which can be roughly divided into a tentering method and a tubing method, as described above in connection with the first and second inventions may be used. Since the step of stretching is the same as that in the first and second inventions, the description thereon will be omitted. Further, subsequent various treatments may be carried out in the same manner as described above in connection with the first and second inventions.

The modified PEN resin of the third invention and the easy-open film comprising the same are basically produced by the above process and contains a hydroxy compound with another hydroxy compound having three or more ester forming functional groups, such as glycerin, pentaerythritol or trimethylolpropane, being introduced into a part of the hydroxy compound component to partially form a three-dimensional structure in the polymer skeleton. The three-dimensional structure suggests that a very hard and fragile segment, i.e., a hard segment, is formed. Easy-open properties are developed by virtue of the hard segment structure.

The modified PEN resin film of the third invention can exhibit good easy-open properties in a relatively large thickness (50–100 $\mu$m), not to mention in a thickness of not more than 50 $\mu$m. Increased film thickness results in the development of sufficiently high gas barrier properties inherent in the resin. Then, the film has a combination of good easy-open properties with good gas barrier properties.

Further, the film consists of a single resin component, i.e., PEN resin, and, hence, can be recycled, and incineration thereof evolves no harmful gas with the occurrence of low calorie.

BRIEF DESCRIPTION OF THE DRAWINGS

FIG. 3 is a diagram showing a part of a stainless steel rod used in a press-through property test for a PEN resin film of the present invention.

BEST MODE FOR CARRYING OUT THE INVENTION

Figure 1:
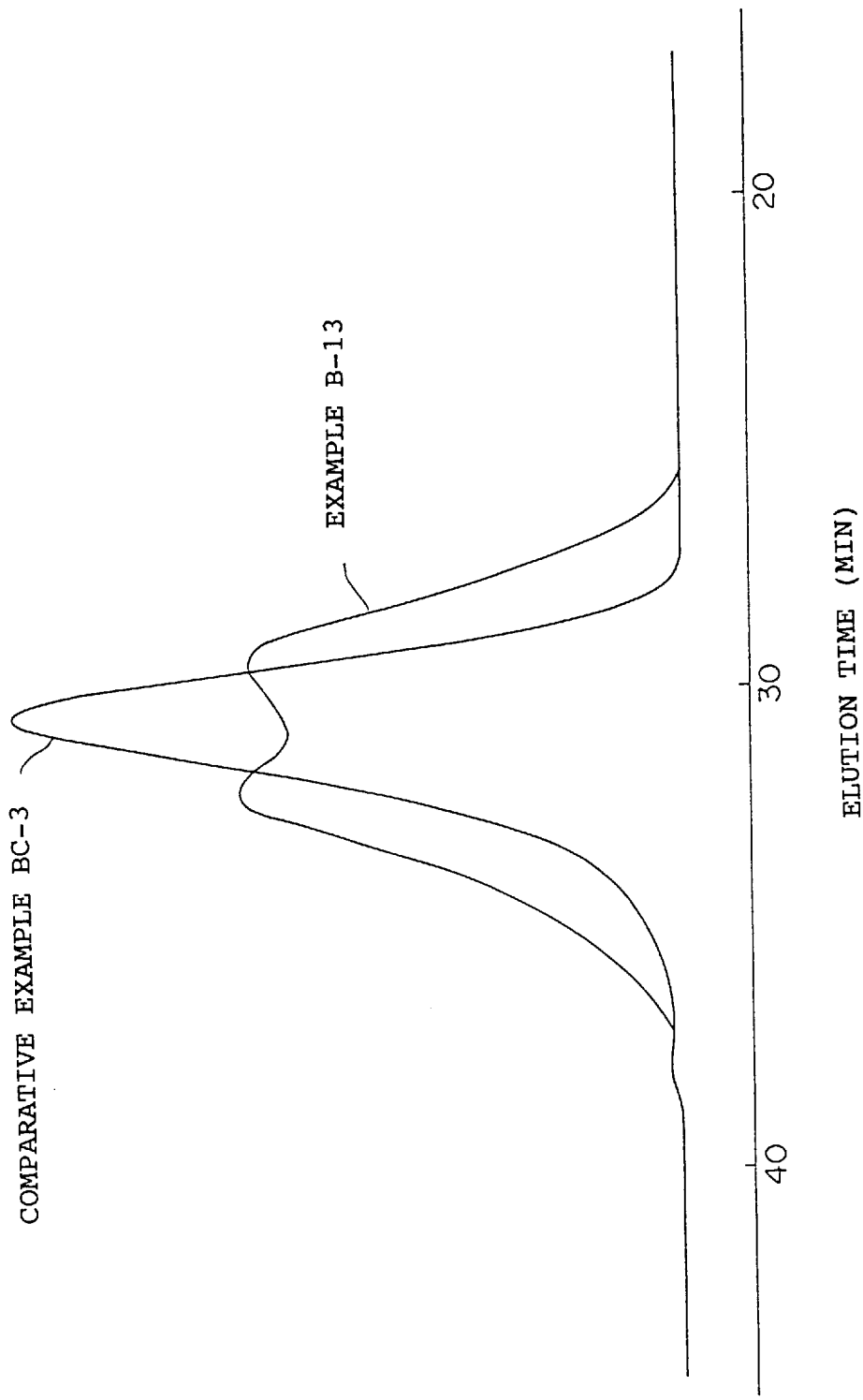
FIG. 1 is a diagram showing molecular weight distributions (dispersion) of films prepared in Example B-13 and Comparative Example BC-3.

The first, second, and third inventions will now be described respectively with reference to Examples A, B and C.

EXAMPLE A

The process for producing a PEN film and the PTP (press-through pack) according to the first invention will now be described in more detail with reference to the following examples. In the following examples, properties were measured by the following methods.
Intrinsic viscosity:
The intrinsic viscosity was determined by dissolving PEN resin in a solvent mixture of phenol and 1,1,2-tetrachloroethane (weight ratio=6:4) at 100° C. for 1 hr to a concentration in the range of from 0.2 to 1.0 g/dl, measuring the viscosity of the solution at 35° C. with a Ubbelohde capillary viscometer and extrapolating the measured viscosity of the solution to 0 g/dl.
Press-through property:
A capsule (ø6×15 mm) was packed into an article, produced by forming, in its holding portion and sealed with an adhesive. 24 hr after sealing, the capsule was pressed with a finger to observe whether or not the capsule can successfully break the cover material and come out therethrough, thereby evaluating the press-through property.
Press-through strength and elongation:
A stainless steel rod 1 (in a cylindrical form having a diameter of 9 mm with the end 2 being curved) having a mirror-finished end 2 as shown in FIG. 3 was descended perpendicularly to the film at a rate of 50 mm/min with the film being horizontally held to determine a strength and an elongation caused when the stainless steel rod is pressed through the film. These strength and elongation were regarded respectively as the press-through strength and press-through elongation.
Combustibility:
A cover material was heated from room temperature to 550° C. at a temperature rise rate of 10° C./min in an air stream of 200 ml/min by means of TG/DTA 200 based on a thermal analysis system SSC 5000 manufactured by Seiko Instruments Inc. (thermogravimetry/differential thermal analyzer), and the residue was weighed to evaluate the combustibility.
Gas permeability:
The gas permeability was measured by means of a model GPM-250 gas permeability tester manufactured by G.L. Science Co., Ltd. at 23° C. under atmospheric pressure by gas chromatography, using pure oxygen as a measuring gas.
Transparency:
The transparency of the cover material film was evaluated by visual inspection.
Water vapor permeability:
The water vapor permeability was measured by means of PERMATRAN-W6 type water-vapor measuring device manufactured by MOCON at 23° C. under atmospheric pressure using dry $N_2$ as a carrier gas.

Example A-1

A polyethylene-2,6-naphthalate polymer having an intrinsic viscosity of 0.41 with 0.1% by weight of kaolin having an average particle diameter of 0.3 $\mu$m being added thereto was prepared by polymerization. The polymer was dried at 150° C. for 10 hr and melt-extruded at 290° C. by means of a T-die extruder having a barrel diameter of 30ø to prepare an unstretched film (width: 220 $\mu$m, thickness: 15 $\mu$m). The unstretched film was heat-treated at 210° C. for 4 sec.

A polyester thermoplastic adhesive was gravure-coated on a polyethylene-2,6-naphthalate film at a coverage of 8 g/m². The coated film was used to heat-seal, at 160° C. for 1 sec, a vacuum-formed product (a blister) of vinyl chloride into which a capsule has been packed, thereby preparing a PTP. The conditions for the preparation of the packaging material for a press-through pack are specified in Table A1, and the results of evaluation of the packaging material for a press-through pack are given in Table A2. The packaging material for a press-through pack had excellent press-through property, combustibility, and transparency.

Examples A-2 to A-5 and Reference Example AR-1

The procedure of Example A-1 was repeated, except that the polymerization time was varied to vary the intrinsic viscosity of polyethylene-2,6-naphthalate polymer. The conditions for the preparation of the packaging materials for a press-through pack are specified in Table A1, and the results of evaluation of the packaging materials for a press-through pack are given in Table A2.

Examples A-6 to A-9 and Reference Example AR-2

The procedure of Example A-1 was repeated, except that the thickness of the polyethylene-2,6-naphthalate film was varied. The conditions for the preparation of the packaging materials for a press-through pack are specified in Table A1, and the results of evaluation of the packaging materials for a press-through pack are given in Table A2.

Examples A-10 to A-13

The procedure of Example A-1 was repeated, except that the thickness of the unstretched film was 30 μm and, after extrusion, the unstretched film was stretched at 140° to 270° C. in longitudinal and transverse directions and then heat-treated at 210° C. for 4 sec to prepare a 15 μm-thick film. The conditions for the preparation of the packaging material for a press-through pack are specified in Table A1, and the results of evaluation of the packaging material for a press-through pack are given in Table A2.

Examples A-14 to A-18 and Reference Example AR-3

The procedure of Example A-1 was repeated, except that the thickness of the unstretched film was varied and, after extrusion, the unstretched film was stretched at 135° C. in longitudinal and transverse directions and then heat-treated at 210° C. for 4 sec to prepare a 15 μm-thick film. The conditions for the preparation of the packaging materials for a press-through pack are specified in Table A1, and the results of evaluation of the packaging materials for a press-through pack are given in Table A2.

Examples A-19 to A-23 and Reference Example AR-4 and AR-5

The procedure of Example A-1 was repeated, except that the heat setting conditions (temperature or time) were varied. The conditions for the preparation of the packaging materials for a press-through pack are specified in Table A1, and the results of evaluation of the packaging materials for a press-through pack are given in Table A2.

Examples A-24 to A-27

The procedure of Example A-1 was repeated, except that the material for a vacuum-formed product of the resin in the packaging material for a press-through pack was varied. The conditions for the preparation of the packaging materials for a press-through pack are specified in Table A1, and the results of evaluation of the packaging materials for a press-through pack are given in Table A2.

Examples A-28

The procedure of Example A-1 was repeated, except that an inflation extruder having a width of ø50 mm was used as the extruder with the die temperature being 290° C. The conditions for the preparation of the packaging materials for a press-through pack are specified in Table A1, and the results of evaluation of the packaging materials for a press-through pack are given in Table A2.

Examples A-29 to A-30

The procedure of Example A-28 was repeated, except that the blow ratio and the stretch ratio in the take-up direction were 1.5 to 2.5 times. The conditions for the preparation of the packaging materials for a press-through pack are specified in Table A1, and the results of evaluation of the packaging materials for a press-through pack are given in Table A2.

Comparative Examples AC-1 to AC-4

The procedure of Example A-1 was repeated, except that the cover material for a press-through pack was varied. The stretching conditions for PP and PET were those suitable for the respective materials. The conditions for the preparation of the packaging materials for a press-through pack are specified in Table A1, and the results of evaluation of the packaging materials for a press-through pack are given in Table A2.

TABLE A1

| | Conditions for preparation of packaging material for press-through pack | | | | | | | |
|---|---|---|---|---|---|---|---|---|
| | Intrinsic viscosity of PEN | Thickness [μm] | Stretching temp. [°C.] | Stretch ratio | | Heat setting | | Vacuum forming |
| | | | | Longitudinal | Transverse | Temp. [°C.] | Time [s] | |
| A-1 | 0.41 | 15 | — | — | — | 210 | 4 | Vinyl chloride |
| A-2 | 0.31 | 15 | — | — | — | 210 | 4 | Vinyl chloride |
| A-3 | 0.36 | 15 | — | — | — | 210 | 4 | Vinyl chloride |
| A-4 | 0.47 | 15 | — | — | — | 210 | 4 | Vinyl chloride |
| A-5 | 0.59 | 15 | — | — | — | 210 | 20 | Vinyl chloride |
| A-6 | 0.41 | 10 | — | — | — | 210 | 4 | Vinyl chloride |
| A-7 | 0.41 | 30 | — | — | — | 210 | 4 | Vinyl chloride |
| A-8 | 0.41 | 45 | — | — | — | 210 | 4 | Vinyl chloride |
| A-9 | 0.36 | 150 | — | — | — | 210 | 10 min | Vinyl chloride |
| A-10 | 0.41 | 15 | 140 | 1.5 | 1.5 | 210 | 4 | Vinyl chloride |
| A-11 | 0.41 | 15 | 160 | 1.5 | 1.5 | 210 | 4 | Vinyl chloride |
| A-12 | 0.41 | 15 | 220 | 1.5 | 1.5 | 210 | 4 | Vinyl chloride |
| A-13 | 0.41 | 15 | 270 | 1.5 | 1.5 | 210 | 4 | Vinyl chloride |

TABLE A1-continued

Conditions for preparation of packaging material for press-through pack

| | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|---|
| A-14 | 0.41 | 15 | 135 | 1.0 | 1.5 | 210 | 4 | Vinyl chloride |
| A-15 | 0.41 | 15 | 135 | 1.0 | 2.7 | 210 | 4 | Vinyl chloride |
| A-16 | 0.41 | 15 | 135 | 1.5 | 1.5 | 210 | 4 | Vinyl chloride |
| A-17 | 0.41 | 15 | 135 | 1.5 | 2.7 | 210 | 4 | Vinyl chloride |
| A-18 | 0.41 | 15 | 135 | 2.7 | 2.7 | 210 | 4 | Vinyl chloride |
| A-19 | 0.41 | 15 | — | — | — | 180 | 30 min | Vinyl chloride |
| A-20 | 0.41 | 15 | — | — | — | 210 | 1 | Vinyl chloride |
| A-21 | 0.41 | 15 | — | — | — | 210 | 4 | Vinyl chloride |
| A-22 | 0.41 | 15 | — | — | — | 210 | 30 | Vinyl chloride |
| A-23 | 0.41 | 15 | — | — | — | 250 | 60 | Vinyl chloride |
| A-24 | 0.41 | 15 | — | — | — | 210 | 4 | PEN |
| A-25 | 0.41 | 15 | — | — | — | 210 | 4 | PP |
| A-26 | 0.41 | 15 | — | — | — | 210 | 4 | PET |
| A-27 | 0.41 | 15 | — | — | — | 210 | 4 | COC |
| A-28 | 0.41 | 15 | — | — | — | 210 | 4 | Vinyl chloride |
| A-29 | 0.41 | 15 | 260 | 1.5 | 1.5 | 210 | 4 | Vinyl chloride |
| A-30 | 0.41 | 15 | 260 | 2.5 | 2.5 | 210 | 4 | Vinyl chloride |
| AR-1 | 0.62 | 15 | — | — | — | 210 | 30 | Vinyl chloride |
| AR-2 | 0.41 | 200 | — | — | — | 210 | 30 | Vinyl chloride |
| AR-3 | 0.41 | 15 | 135 | 3.5 | 3.5 | 210 | 4 | Vinyl chloride |
| AR-4 | 0.41 | 15 | — | — | — | — | — | Vinyl chloride |
| AR-5 | 0.41 | 15 | — | — | — | 160 | 30 | Vinyl chloride |
| AC-1 | Glassine paper | 15 | — | — | — | — | — | Vinyl chloride |
| AC-2 | Aluminum foil | 20 | — | — | — | — | — | Vinyl chloride |
| AC-3 | PET | 15 | — | — | — | 190 | 10 | Vinyl chloride |
| AC-4 | PP | 15 | — | — | — | 170 | 10 | Vinyl chloride |

TABLE A2

Results of evaluation of packaging material for press-through pack

| | Press-through property | Combustibility | Transparency | Press-through of film Strength [kgf] | Press-through of film Elongation [mm] |
|---|---|---|---|---|---|
| A-1 | ○ | ○ | ○ | 1.3 | 2 |
| A-2 | ○ | ○ | ○ | 1.2 | 2 |
| A-3 | ○ | ○ | ○ | 1.2 | 2 |
| A-4 | ○ | ○ | ○ | 1.3 | 2 |
| A-5 | ○ | ○ | ○ | 1.6 | 2 |
| A-6 | ○ | ○ | ○ | 1.1 | 2 |
| A-7 | ○ | ○ | ○ | 1.5 | 2 |
| A-8 | ○ | ○ | ○ | 1.7 | 3 |
| A-9 | ○ | ○ | ○ | 4.2 | 6 |
| A-10 | ○ | ○ | ○ | 1.6 | 3 |
| A-11 | ○ | ○ | ○ | 1.5 | 2 |
| A-12 | ○ | ○ | ○ | 1.5 | 2 |
| A-13 | ○ | ○ | ○ | 1.4 | 2 |
| A-14 | ○ | ○ | ○ | 1.6 | 2 |
| A-15 | ○ | ○ | ○ | 2.1 | 3 |
| A-16 | ○ | ○ | ○ | 2.0 | 3 |
| A-17 | ○ | ○ | ○ | 2.1 | 4 |
| A-18 | ○ | ○ | ○ | 2.2 | 4 |
| A-19 | ○ | ○ | ○ | 1.3 | 2 |
| A-20 | ○ | ○ | ○ | 1.3 | 2 |
| A-21 | ○ | ○ | ○ | 1.3 | 2 |
| A-22 | ○ | ○ | ○ | 1.2 | 2 |
| A-23 | ○ | ○ | ○ | 1.2 | 2 |
| A-24 | ○ | ○ | ○ | 1.3 | 2 |
| A-25 | ○ | ○ | ○ | 1.3 | 2 |
| A-26 | ○ | ○ | ○ | 1.3 | 2 |
| A-27 | ○ | ○ | ○ | 1.3 | 2 |
| A-28 | ○ | ○ | ○ | 1.3 | 2 |
| A-29 | ○ | ○ | ○ | 1.4 | 2 |
| A-30 | ○ | ○ | ○ | 1.6 | 3 |
| AR-1 | X | ○ | ○ | 2.2 | 17 |
| AR-2 | X | ○ | ○ | 7.9 | 27 |
| AR-3 | X | ○ | ○ | 3.0 | 33 |
| AR-4 | X | ○ | ○ | 1.4 | 40 |
| AR-5 | X | ○ | ○ | 1.4 | 23 |
| AC-1 | ○ | ○ | X | 1.9 | 2 |
| AC-2 | ○ | X | X | 1.5 | 2 |
| AC-3 | X | ○ | ○ | 4.2 | 21 |
| AC-4 | X | ○ | ○ | 3.7 | 20 |

1) Press-through property
○: easy to take out tablet, X: difficult to take out tablet
2) Combustibility
○: no residue, X: entirely remained unburnt
3) Transparency
○: transparent, X: opaque Examples A-31 to A-37

Unstretched films were prepared by molding in the same manner as in Example A-1, except that polypropylene (PP)

or polyethylene (PE) or nylon (Ny) was co-extruded. Packaging materials for PTP were prepared in the same manner as in Example A-1, except that the above unstretched films were used. Thereafter, the PP or PE or Ny layer was removed, and the packaging materials were then evaluated in the same manner as in Example A-1.

The constructions of the packaging materials before the removal of the PP or PE or Ny layer are shown in Table A3, the conditions for the preparation of the packaging materials for PTP are specified in Table A4, and the results of evaluation of the packaging materials for PTP after the removal of the PP or PE or Ny layer are given in Table A5.

The packaging materials for a press-through pack had excellent press-through property, combustibility, and transparency.

Examples A-38 to A-40

Unstretched films were prepared by molding in the same manner as in Example A-28, except that polypropylene (PP) or polyethylene (PE) or nylon (Ny) was co-extruded. Packaging materials for PTP were prepared in the same manner as in Example A-28, except that the above unstretched films were used. Thereafter, the PP or PE or Ny layer was removed, and the packaging materials were then evaluated in the same manner as in Example A-28.

The constructions of the packaging materials before the removal of the PP or PE or Ny layer are shown in Table A3, the conditions for the preparation of the packaging materials for PTP are specified in Table A4, and the results of evaluation of the packaging materials for PTP after the removal of the PP or PE or Ny layer are given in Table A5.

The packaging materials for a press-through pack had excellent press-through property, combustibility, and transparency.

TABLE A3

| | Construction before removing olefin layer and film forming method | |
|---|---|---|
| | Construction | Film forming method |
| A-31 | PEN(15)/PP(10) | T-die co-extrusion |
| A-32 | PEN(15)/PP(20) | T-die co-extrusion |
| A-33 | PEN(15)/PE(10) | T-die co-extrusion |
| A-34 | PEN(15)/PE(20) | T-die co-extrusion |
| A-35 | PEN(15)/Ny(10) | T-die co-extrusion |
| A-36 | PEN(15)/Ny(20) | T-die co-extrusion |
| A-37 | PEN(20)/PP(20) | T-die co-extrusion |
| A-38 | PEN(15)/PP(20) | Inflation co-extrusion |
| A-39 | PEN(15)/PE(20) | Inflation co-extrusion |
| A-40 | PEN(15)/Ny(20) | Inflation co-extrusion |

TABLE A4

| | Conditions for preparation of packaging material for PTP | | | | | | |
|---|---|---|---|---|---|---|---|
| | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
| A-31 | 0.41 | 15 | The same as A-1 | | | 210 | 4 | Vinyl chloride |
| A-32 | 0.41 | 15 | The same as A-1 | | | 210 | 4 | Vinyl chloride |
| A-33 | 0.41 | 15 | The same as A-1 | | | 210 | 4 | Vinyl chloride |
| A-34 | 0.41 | 15 | The same as A-1 | | | 210 | 4 | Vinyl chloride |
| A-35 | 0.41 | 15 | The same as A-1 | | | 210 | 4 | Vinyl chloride |
| A-36 | 0.41 | 15 | The same as A-1 | | | 210 | 4 | Vinyl chloride |
| A-37 | 0.41 | 15 | The same as A-1 | | | 210 | 4 | Vinyl chloride |
| A-38 | 0.41 | 15 | The same as A-28 | | | 210 | 4 | Vinyl chloride |
| A-39 | 0.41 | 15 | The same as A-28 | | | 210 | 4 | Vinyl chloride |
| A-40 | 0.41 | 15 | The same as A-28 | | | 210 | 4 | Vinyl chloride |

TABLE A5

| | Results of evaluation of packaging material for press-through pack | | | | |
|---|---|---|---|---|---|
| | Press-through property | Combustibility | Transparency | Press-through of film Strength [kgf] | Press-through of film Elongation [mm] |
| A-31 | ○ | ○ | ○ | 1.3 | 2 |
| A-32 | ○ | ○ | ○ | 1.3 | 2 |
| A-33 | ○ | ○ | ○ | 1.3 | 2 |
| A-34 | ○ | ○ | ○ | 1.3 | 2 |
| A-35 | ○ | ○ | ○ | 1.3 | 2 |
| A-36 | ○ | ○ | ○ | 1.3 | 2 |
| A-37 | ○ | ○ | ○ | 1.3 | 2 |
| A-38 | ○ | ○ | ○ | 1.3 | 2 |
| A-39 | ○ | ○ | ○ | 1.3 | 2 |
| A-40 | ○ | ○ | ○ | 1.3 | 2 |

Examples A-41 to A-52

In Examples A-41 to A-52, the procedure of Example A-1 or Example A-28 was repeated, except that a water-vapor barrier resin was laminated to the polyethylene-2,6-naphthalate film and vinyl chloride (PVC) to be vacuum-formed was coated with vinylidene chloride (PVDC). The lamination was carried out by extrusion coating (EC, heat lamination) for Examples A-41 to A-43, T-die co-extrusion for Examples A-44 to A-46, inflation co-extrusion for Examples A-47 to A-49, coating for Example A-50, and vapor deposition for Examples A-51 and A-52. The adhesive used was a polyester AC agent for EC and a modified polyester adhesive resin for the T-die co-extrusion and the inflation co-extrusion. The constructions and the water vapor permeability of the PEN films with water vapor barrier resins being laminated thereto are given in Table A6. The conditions for the preparation of the packaging materials for PTP are specified in Table A7, and the results of evaluation of the packaging materials for PTP are given in Table A8. The PTP's using the packaging materials prepared in Examples A-41 to A-52 and the PTP using the packaging material prepared in Example A-1 were allowed to stand in an atmosphere kept at 25° C. and 90%RH for 30 days. As a result, no moisture absorption was observed for the contents of the PTP's using the packaging materials prepared in Examples A-41 to A-52, whereas moisture absorption was observed for contents of the PTP using the packaging material prepared in Example A-1.

TABLE A6

Construction and water vapor permeability of PEN film with water vapor barrier resin being laminated thereto

| | Construction | Water vapor permeability [g/m² · 24 hr] | Laminating method |
|---|---|---|---|
| A-41 | PEN(15)/AD(2)/PE(13) | 30 | EC |
| A-42 | PEN(15)/AD(2)/PP(13) | 20 | EC |
| A-43 | PEN(15)/AD(2)/COC(13) | 12 | EC |
| A-44 | PEN(15)/AD(2)/PE(13) | 30 | T-die co-extrusion |
| A-45 | PEN(15)/AD(2)/PP(13) | 20 | T-die co-extrusion |
| A-46 | PEN(15)/AD(2)/COC(13) | 12 | T-die co-extrusion |
| A-47 | PEN(15)/AD(2)/PE(13) | 30 | Inflation co-extrusion |
| A-48 | PEN(15)/AD(2)/PP(13) | 20 | Inflation co-extrusion |
| A-49 | PEN(15)/AD(2)/COC(13) | 12 | Inflation co-extrusion |
| A-50 | PEN(15)/PVCD(5) | 5 | Coating |
| A-51 | PEN(15)/SiO$_x$(200A) | Not more than 0.5 | Vapor deposition |
| A-52 | PEN(15)/Al$_2$O$_3$(1500A) | 3 | Vapor deposition |

Note: Value within ( ): thickness [μm]
A: angstrom
AD: adhesive layer

TABLE A7

Conditions for preparation of packaging material for PTP

| | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|---|
| A-41 | 0.41 | 30 | — | — | | 210 | 4 | Vinyl chloride |
| A-42 | 0.41 | 30 | — | — | | 210 | 4 | Vinyl chloride |
| A-43 | 0.41 | 30 | — | — | | 210 | 4 | Vinyl chloride |
| A-44 | 0.41 | 30 | | The same as A-1 | | 210 | 4 | Vinyl chloride |
| A-45 | 0.41 | 30 | | The same as A-1 | | 210 | 4 | Vinyl chloride |
| A-46 | 0.41 | 30 | | The same as A-1 | | 210 | 4 | Vinyl chloride |
| A-47 | 0.41 | 30 | | The same as A-28 | | 210 | 4 | Vinyl chloride |
| A-48 | 0.41 | 30 | | The same as A-28 | | 210 | 4 | Vinyl chloride |
| A-49 | 0.41 | 30 | | The same as A-28 | | 210 | 4 | Vinyl chloride |
| A-50 | 0.41 | 20 | — | — | | 210 | 4 | Vinyl chloride |
| A-51 | 0.41 | 15 | — | — | | 210 | 4 | Vinyl chloride |
| A-52 | 0.41 | 15 | — | — | | 210 | 4 | Vinyl chloride |

TABLE A8

Results of evaluation of packaging material for press-through pack

| | Press-through property | Combustibility | Transparency | Press-through of film Strength [kgf] | Press-through of film Elongation [mm] |
|---|---|---|---|---|---|
| A-41 | ○ | ○ | ○ | 1.4 | 3 |
| A-42 | ○ | ○ | ○ | 1.4 | 3 |
| A-43 | ○ | ○ | ○ | 1.4 | 3 |
| A-44 | ○ | ○ | ○ | 1.4 | 3 |
| A-45 | ○ | ○ | ○ | 1.4 | 3 |
| A-46 | ○ | ○ | ○ | 1.4 | 3 |
| A-47 | ○ | ○ | ○ | 1.4 | 3 |
| A-48 | ○ | ○ | ○ | 1.4 | 3 |
| A-49 | ○ | ○ | ○ | 1.4 | 3 |

TABLE A8-continued

Results of evaluation of packaging material for press-through pack

| | Press-through property | Combustibility | Transparency | Press-through of film Strength [kgf] | Elongation [mm] |
|---|---|---|---|---|---|
| A-50 | ○ | ○ | ○ | 1.3 | 3 |
| A-51 | ○ | ○ | ○ | 1.3 | 3 |
| A-52 | ○ | ○ | ○ | 1.3 | 3 |

Examples A-53 to A-59

In Example A-53 to A-59, the procedure of Example A-1 or Example A-28 was repeated, except that an oxygen barrier resin was laminated to the polyethylene-2,6-naphthalate film, vinyl chloride (PVC) to be vacuum-formed was coated with vinylidene chloride (PVDC), and the contents of the pack were solid fats and oils. The lamination was carried out by T-die co-extrusion for Examples A-53 to A-54, inflation co-extrusion for Examples A-55 and A-56, coating for Example A-57, and vapor deposition for Examples A-58 and A-59. The adhesive layer comprised a modified polyester adhesive resin for Examples A-53 to A-56. The constructions and the oxygen permeability of the PEN films with oxygen barrier resins being laminated thereto are given in Table A9. The conditions for the preparation of the packaging materials for PTP are specified in Table A10, and the results of evaluation of the packaging materials for PTP are given in Table A11. The PTP's using the packaging materials prepared in Examples A-53 to A-59, and the PTP using the packaging material prepared in Example A-1 were allowed to stand in an atmosphere kept at 25° C. and 90%RH for 30 days. As a result, it was found that the contents of the PTP's using the packaging materials prepared in Examples A-53 to A-59 were not oxidized, whereas the contents of the packaging material prepared in Example A-1 were oxidized.

TABLE A9

Construction and oxygen permeability of PEN film with oxygen barrier resin being lamianted thereto

| | Construction | Oxygen permeability | Laminating method [g/m² · 24 hr] |
|---|---|---|---|
| A-53 | PEN(15)/AD(2)/PVA(13) | 4 | T-die co-extrusion |
| A-54 | PEN(10)/AD(2)/EVOH(5)/AD(2)/PEN(10) | 10 | T-die co-extrusion |
| A-55 | PEN(15)/AD(2)/PVA(13) | 4 | Inflation co-extrusion |
| A-56 | PEN(10)/AD(2)/EVOH(5)/ | 10 | Inflation co-extrusion |
| A-57 | PEN(15)/PVDC(5) | 5 | Coating |
| A-58 | PEN(15)/SiO$_x$(200A) | Not more than 0.5 | Vapor deposition |
| A-59 | PEN(15)/Al$_2$O$_3$(1500A) | 3 | Vapor deposition |

TABLE A10

Conditions for preparation of packaging material for PTP

| | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|---|
| A-53 | 0.41 | 30 | The same as A-1 | | | 210 | 4 | Vinyl chloride |
| A-54 | 0.41 | 29 | The same as A-1 | | | 210 | 4 | Vinyl chloride |
| A-55 | 0.41 | 30 | The same as A-28 | | | 210 | 4 | Vinyl chloride |
| A-56 | 0.41 | 29 | The same as A-28 | | | 210 | 4 | Vinyl chloride |
| A-57 | 0.41 | 20 | — | — | — | 210 | 4 | Vinyl chloride |
| A-58 | 0.41 | 15 | — | — | — | 210 | 4 | Vinyl chloride |
| A-59 | 0.41 | 15 | — | — | — | 210 | 4 | Vinyl chloride |

TABLE A11

Results of evaluation of packaging material for press-through pack

| | Press-through property | Combustibility | Transparency | Press-through of film Strength [kgf] | Elongation [mm] |
|---|---|---|---|---|---|
| A-53 | ○ | ○ | ○ | 1.4 | 3 |
| A-54 | ○ | ○ | ○ | 1.5 | 3 |
| A-55 | ○ | ○ | ○ | 1.4 | 3 |
| A-56 | ○ | ○ | ○ | 1.5 | 3 |
| A-57 | ○ | ○ | ○ | 1.3 | 3 |
| A-58 | ○ | ○ | ○ | 1.3 | 2 |
| A-59 | ○ | ○ | ○ | 1.3 | 2 |

Examples A-60 to A-65

In Examples A-60 to A-65, the procedure of Example A-1 or Example A-28 was repeated, except that a water-vapor barrier resin and an oxygen barrier resin were laminated to the polyethylene-2,6-naphthalate film and vinyl chloride (PVC) to be vacuum-formed was coated with vinylidene chloride (PVDC). The lamination was carried out by T-die co-extrusion for Examples A-60 to A-62 and inflation co-extrusion for Examples A-63 and A-65. The adhesive layer comprised a modified polyester adhesive resin. The constructions, the water vapor permeability, and the oxygen permeability of the PEN films with water-vapor barrier resins and oxygen barrier resins being laminated thereto are given in Table A12. The conditions for the preparation of the packaging materials for PTP are specified in Table A13, and the results of evaluation of the packaging materials for PTP are given in Table A14. The PTP's using the packaging materials prepared in Examples A-60 to A-65, and the PTP using the packaging material prepared in Example A-1 were allowed to stand in an atmosphere kept at 25° C. and 90%RH for 30 days. As a result, no moisture absorption was observed for the contents of the PTP's using the packaging materials prepared in Examples A-60 to A-65, whereas moisture absorption was observed for the contents of the PTP using the packaging material prepared in Example A-1.

TABLE A12

Construction, water vapor permeability and oxygen permeability of PEN film with water vapor barrier layer and oxygen barrier resin being laminated thereto

| | Construction | Water vapor permeability [g/m² · 24 hr] | Oxygen permeability [g/m² · 24 hr] | Laminating method |
|---|---|---|---|---|
| A-60 | PEN(10)/AD(2)/ EVOH(5)/AD(2)/ PE(10) | 35 | 10 | T-die-co-extrusion |
| A-61 | PEN(10)/AD(2)/ EVOH(5)/AD(2)/ COC(5) | 7 | 10 | T-die co-extrusion |
| A-62 | PEN(10)/AD(2)/ EVOH(5)/AD(2)/ PP(10) | 15 | 5 | T-die co-extrusion |
| A-63 | PEN(10)/AD(2)/ EVOH(5)/AD(2)/ PE(10) | 35 | 10 | Inflation co-extrusion |
| A-64 | PEN(10)/AD(2)/ EVOH(5)/AD(2)/ COC(5) | 7 | 10 | Inflation co-extrusion |
| A-65 | PEN(10)/AD(2)/ PVA(10)/AD(2)/ | 15 | 5 | Inflation co-extrusion |

TABLE A13

Conditions for preparation of packaging material for PTP

| | Intrinsic viscosity of PEN | Thickness [μm] | Stretching temp. [°C.] | Stretch ratio Longitudinal | Stretch ratio Transverse | Heat setting Temp. [°C.] | Time [s] | Laminating method Vacuum forming |
|---|---|---|---|---|---|---|---|---|
| A-60 | 0.41 | 31 | The same as A-1 | | | 210 | 4 | Vinyl chloride |
| A-61 | 0.41 | 24 | The same as A-1 | | | 210 | 4 | Vinyl chloride |
| A-62 | 0.41 | 34 | The same as A-1 | | | 210 | 4 | Vinyl chloride |
| A-63 | 0.41 | 31 | The same as A-28 | | | 210 | 4 | Vinyl chloride |
| A-64 | 0.41 | 24 | The same as A-28 | | | 210 | 4 | Vinyl chloride |
| A-65 | 0.41 | 34 | The same as A-28 | | | 210 | 4 | Vinyl chloride |

TABLE A14

Results of evaluation of packaging material for press-through pack

| | Press-through property | Combustibility | Transparency | Press-through of film Strength [kgf] | Press-through of film Elongation [mm] |
|---|---|---|---|---|---|
| A-60 | ○ | ○ | ○ | 1.4 | 4 |
| A-61 | ○ | ○ | ○ | 1.4 | 2 |
| A-62 | ○ | ○ | ○ | 1.5 | 3 |
| A-63 | ○ | ○ | ○ | 1.4 | 4 |
| A-64 | ○ | ○ | ○ | 1.4 | 2 |
| A-65 | ○ | ○ | ○ | 1.5 | 3 |

Examples A-66 to A-83

The procedure of Example A-1 or Example A-28 was repeated, except that a reinforcing layer of a synthetic resin was laminated to the polyethylene-2,6-naphthalate film prepared in Example A-1 or Example A-28. The lamination was carried out by EC for Examples A-66 to A-71, T-die co-extrusion for Examples A-72 to A-77, and inflation co-extrusion for Examples A-78 to A-83. The adhesive layer comprised a modified polyester AC agent for EC and a modified polyester adhesive resin for the T-die co-extrusion and the inflation co-extrusion. The constructions of the PEN films with reinforcing layers being laminated thereto are given in Table A15. The conditions for the preparation of the packaging materials for PTP are specified in Table A16, and the results of evaluation of the packaging materials for PTP are given in Table A17.

TABLE A15

Construction of PEN film with reinforcing layer laminated thereto

| | Construction | Laminating method |
|---|---|---|
| A-66 | PEN(8)/AD(2)/PE(10) | EC |
| A-67 | PEN(15)/AD(2)/PE(20) | EC |

TABLE A15-continued

Construction of PEN film with reinforcing layer laminated thereto

| | Construction | Laminating method |
|---|---|---|
| A-68 | PEN(8)/AD(2)/PP(10) | EC |
| A-69 | PEN(15)/AD(2)/PP(20) | EC |
| A-70 | PEN(8)/AD(2)/COC(10) | EC |
| A-71 | PEN(15)/AD(2)/COC(20) | EC |
| A-72 | PEN(8)/AD(2)/PE(10) | T-die co-extrusion |
| A-73 | PEN(15)/AD(2)/PE(20) | T-die co-extrusion |
| A-74 | PEN(8)/AD(2)/PP(10) | T-die co-extrusion |
| A-75 | PEN(15)/AD(2)/PP(20) | T-die co-extrusion |
| A-76 | PEN(8)/AD(2)/COC(10) | T-die co-extrusion |
| A-77 | PEN(15)/AD(2)/COC(20) | T-die co-extrusion |
| A-78 | PEN(8)/AD(2)/PE(10) | Inflation co-extrusion |
| A-79 | PEN(15)/AD(2)/PE(20) | Inflation co-extrusion |
| A-80 | PEN(8)/AD(2)/PP(10) | Inflation co-extrusion |
| A-81 | PEN(15)/AD(2)/PP(20) | Inflation co-extrusion |
| A-82 | PEN(8)/AD(2)/COC(10) | Inflation co-extrusion |
| A-83 | PEN(15)/AD(2)/COC(20) | Inflation co-extrusion |

| | Press-through property | Combustibility | Transparency | Strength [kgf] | Elongation [mm] |
|---|---|---|---|---|---|
| A-66 | ○ | ○ | ○ | 1.2 | 3 |
| A-67 | ○ | ○ | ○ | 1.4 | 3 |
| A-68 | ○ | ○ | ○ | 1.3 | 3 |
| A-69 | ○ | ○ | ○ | 1.4 | 3 |
| A-70 | ○ | ○ | ○ | 1.3 | 2 |
| A-71 | ○ | ○ | ○ | 1.4 | 2 |
| A-72 | ○ | ○ | ○ | 1.2 | 3 |
| A-73 | ○ | ○ | ○ | 1.4 | 3 |
| A-74 | ○ | ○ | ○ | 1.3 | 3 |
| A-75 | ○ | ○ | ○ | 1.4 | 3 |
| A-76 | ○ | ○ | ○ | 1.3 | 2 |
| A-77 | ○ | ○ | ○ | 1.4 | 2 |
| A-78 | ○ | ○ | ○ | 1.2 | 3 |
| A-79 | ○ | ○ | ○ | 1.4 | 3 |
| A-80 | ○ | ○ | ○ | 1.3 | 3 |
| A-81 | ○ | ○ | ○ | 1.4 | 3 |
| A-82 | ○ | ○ | ○ | 1.3 | 2 |
| A-83 | ○ | ○ | ○ | 1.4 | 2 |

TABLE A16

Conditions for preparation of packaging material for PTP

| | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|---|
| A-66 | 0.41 | 20 | — | — | — | 210 | 4 | Vinyl chloride |
| A-67 | 0.41 | 37 | — | — | — | 210 | 4 | Vinyl chloride |
| A-68 | 0.41 | 20 | — | — | — | 210 | 4 | Vinyl chloride |
| A-69 | 0.41 | 37 | — | — | — | 210 | 4 | Vinyl chloride |
| A-70 | 0.41 | 20 | — | — | — | 210 | 4 | Vinyl chloride |
| A-71 | 0.41 | 37 | — | — | — | 210 | 4 | Vinyl chloride |
| A-72 | 0.41 | 20 | The same as A-1 | | | 210 | 4 | Vinyl chloride |
| A-73 | 0.41 | 37 | The same as A-1 | | | 210 | 4 | Vinyl chloride |
| A-74 | 0.41 | 20 | The same as A-1 | | | 210 | 4 | Vinyl chloride |
| A-75 | 0.41 | 37 | The same as A-1 | | | 210 | 4 | Vinyl chloride |
| A-76 | 0.41 | 20 | The same as A-1 | | | 210 | 4 | Vinyl chloride |
| A-77 | 0.41 | 37 | The same as A-1 | | | 210 | 4 | Vinyl chloride |
| A-78 | 0.41 | 20 | The same as A-28 | | | 210 | 4 | Vinyl chloride |
| A-79 | 0.41 | 37 | The same as A-28 | | | 210 | 4 | Vinyl chloride |
| A-80 | 0.41 | 20 | The same as A-28 | | | 210 | 4 | Vinyl chloride |
| A-81 | 0.41 | 37 | The same as A-28 | | | 210 | 4 | Vinyl chloride |
| A-82 | 0.41 | 20 | The same as A-28 | | | 210 | 4 | Vinyl chloride |
| A-83 | 0.41 | 37 | The same as A-28 | | | 210 | 4 | Vinyl chloride |

TABLE A17

Results of evaluation of packaging material for press-through pack

Press-through

Examples A-84 to A-91

In Examples A-84 to A-91, the procedure of Example A-1 or Example A-28 was repeated, except that a water-vapor barrier resin and/or an oxygen barrier resin were laminated to the polyethylene-2,6-naphthalate film, a reinforcing layer was laminated thereto, vinyl chloride (PVC) to be vacuum-formed was coated with vinylidene chloride (PVDC) and the contents were a hygroscopic chemical. The lamination was carried out by T-die co-extrusion for Examples A-84 to A-87 and inflation co-extrusion for Examples A-88 and A-91. The adhesive layer comprised a modified polyester adhesive resin. The constructions, the water vapor permeability, and the oxygen permeability of PEN films with a water vapor barrier resin and/or an oxygen barrier resin and a reinforcing layer being laminated thereto are given in Table A18. The conditions for the preparation of the packaging materials for PTP are specified in Table A19, and the results of evaluation of the packaging materials for PTP are given in Table A20. The PTP's using the packaging materials prepared in Examples A-84 to A-91, and the PTP using the packaging material prepared in Example A-1 were allowed to stand in an atmosphere kept at 25° C. and 90%RH for 30 days. As a result, no moisture absorption was observed for the contents of the PTP's using the packaging materials prepared in Examples A-84 to A-91, whereas moisture absorption was observed for the contents of the PTP using the packaging material prepared in Example A-1.

TABLE A18

Construction of PEN film with water vapor barrier layer or oxygen barrier layer or both vapor barrier layer and reinforcing layer laminated thereto

| | Construction | Water vapor permeability [g/m² · 24 hr] | Oxygen permeability [g/m² · 24 hr] | Laminating method |
|---|---|---|---|---|
| A-84 | PEN(10)/AD(2)/ EVOH(5)/AD(2)/ PE(15) | 22 | 10 | T-die co-extrusion |
| A-85 | PEN(10)/AD(2)/ EVOH(5)/AD(2)/ PP(15) | 15 | 10 | T-die co-extrusion |
| A-86 | PEN(10)/AD(2)/ PVA(10)/AD(2)/ COC(0)/AD(2)/ PP(10) | 10 | 5 | T-die co-extrusion |
| A-87 | PEN(10)/AD(2)/ PVA(10)/AD(2)/ COC(10)/AD(2)/ Ny(10) | 10 | 5 | T-die co-extrusion |
| A-88 | PEN(10)/AD(2)/ EVOH(5)/AD(2)/ PE(15) | 22 | 10 | Inflation co-extrusion |
| A-89 | PEN(10)/AD(2)/ EVOH(5)/AD(2)/ PP(15) | 15 | 10 | Inflation co-extrusion |
| A-90 | PEN(10)/AD(2)/ PVA(10)/AD(2)/ COC(10)/AD(2)/ PP(10) | 10 | 5 | Inflation co-extrusion |
| A-91 | PEN(10)/AD(2)/ PVA(10)/AD(2)/ COC(10)/AD(2)/ PP(10) | 10 | 5 | Inflation co-extrusion |

TABLE A19

Conditions for preparation of packaging material for PTP

| | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|---|
| A-84 | 0.41 | 34 | The same as A-1 | | | 210 | 4 | Vinyl chloride |
| A-85 | 0.41 | 34 | The same as A-1 | | | 210 | 4 | Vinyl chloride |
| A-86 | 0.41 | 46 | The same as A-1 | | | 210 | 4 | Vinyl chloride |
| A-87 | 0.41 | 46 | The same as A-1 | | | 210 | 4 | Vinyl chloride |
| A-88 | 0.41 | 34 | The same as A-28 | | | 210 | 4 | Vinyl chloride |
| A-89 | 0.41 | 34 | The same as A-28 | | | 210 | 4 | Vinyl chloride |
| A-90 | 0.41 | 46 | The same as A-28 | | | 210 | 4 | Vinyl chloride |
| A-91 | 0.41 | 46 | The same as A-28 | | | 210 | 4 | Vinyl chloride |

TABLE A20

Results of evaluation of packaging material for press-through pack

| | Press-through property | Combustibility | Transparency | Press-through of film Strength [kgf] | Press-through of film Elongation [mm] |
|---|---|---|---|---|---|
| A-84 | ○ | ○ | ○ | 1.4 | 4 |
| A-85 | ○ | ○ | ○ | 1.5 | 3 |
| A-86 | ○ | ○ | ○ | 1.5 | 4 |
| A-87 | ○ | ○ | ○ | 1.6 | 4 |
| A-88 | ○ | ○ | ○ | 1.4 | 4 |
| A-89 | ○ | ○ | ○ | 1.5 | 3 |
| A-90 | ○ | ○ | ○ | 1.5 | 4 |
| A-91 | ○ | ○ | ○ | 1.6 | 4 |

Examples A-92 to A-97

In Examples A-92 and A-97 and Reference Example AR-6, the procedure of Examples A-1, A-79, A-81 and A-83 and Reference Example AR-2 was repeated, except that the film thickness was varied, the contents were a working cutter (length: 150 mm) and a vacuum-formed product for a working cutter was used. The conditions for the preparation of the packaging materials for PTP are specified in Table A21, and the results of evaluation of the packaging materials for PTP are given in Table A22. For the packaging material of PTP in Reference Example AR-6, it was difficult to take out the contents from PTP.

formed product was one for a toothbrush for interdentium.

TABLE A21

| | Conditions for preparation of packaging material for PTP | | | | | | | |
|---|---|---|---|---|---|---|---|---|
| | Intrinsic viscosity of PEN | Thickness [μm] | Stretching temp. [°C.] | Stretch ratio Longitudinal | Transverse | Heat setting Temp. [°C.] | Time [s] | Vacuum forming |
| A-92 | 0.41 | 20 | The same as A-1 | | | 210 | 4 | Vinyl chloride |
| A-93 | 0.41 | 45 | The same as A-1 | | | 210 | 4 | Vinyl chloride |
| A-94 | 0.41 | 150 | The same as A-1 | | | 210 | 4 | Vinyl chloride |
| A-95 | 0.41 | 37 | The same as A-79 | | | 210 | 4 | Vinyl chloride |
| A-96 | 0.41 | 37 | The same as A-81 | | | 210 | 4 | Vinyl chloride |
| A-97 | 0.41 | 37 | The same as A-83 | | | 210 | 4 | Vinyl chloride |
| AR-6 | 0.41 | 200 | The same as AR-2 | | | 210 | 30 | Vinyl chloride |

TABLE A22

| Results of evaluation of packaging material for press-through pack | | | |
|---|---|---|---|
| | Press-through property | Combustibility | Transparency |
| A-92 | ○ | ○ | ○ |
| A-93 | ○ | ○ | ○ |
| A-94 | ○ | ○ | ○ |
| A-95 | ○ | ○ | ○ |
| A-96 | ○ | ○ | ○ |
| A-97 | ○ | ○ | ○ |
| AR-6 | X | ○ | ○ |

Examples A-98 to A-103

In Examples A-98 to A-103 and Reference Example AR-7, the procedure of Examples A-1, A-28, A-29, A-79, A-81 and A-83 and Reference Example AR-2 was repeated, except that the contents were a toothbrush for interdentium (approximate dimension: ø8×45 mm) and the vacuum-formed product was one for a toothbrush for interdentium.

The conditions for the preparation of the packaging materials for PTP are specified in Table A23, and the results of evaluation of the packaging materials for PTP are given in Table A24. The packaging material for PTP in Reference Example AR-7, it was difficult to take out the contents from PTP.

TABLE A23

| | Conditions for preparation of packaging material for PTP | | | | | | | |
|---|---|---|---|---|---|---|---|---|
| | Intrinsic viscosity of PEN | Thickness [μm] | Stretching temp. [°C.] | Stretch ratio Longitudinal | Transverse | Heat setting Temp. [°C.] | Time [s] | Vacuum forming |
| A-98 | 0.41 | 15 | The same as A-1 | | | 210 | 4 | Vinyl chloride |
| A-99 | 0.41 | 15 | The same as A-28 | | | 210 | 4 | Vinyl chloride |
| A-100 | 0.41 | 15 | The same as A-29 | | | 210 | 4 | Vinyl chloride |
| A-101 | 0.41 | 37 | The same as A-79 | | | 210 | 4 | Vinyl chloride |
| A-102 | 0.41 | 37 | The same as A-81 | | | 210 | 4 | Vinyl chloride |
| A-103 | 0.41 | 37 | The same as A-83 | | | 210 | 4 | Vinyl chloride |
| AR-7 | 0.41 | 200 | The same as AR-2 | | | 210 | 30 | Vinyl chloride |

TABLE A24

Results of evaluation of packaging material for press-through pack

|       | Press-through property | Combustibility | Transparency |
|-------|------------------------|----------------|--------------|
| A-98  | ○ | ○ | ○ |
| A-99  | ○ | ○ | ○ |
| A-100 | ○ | ○ | ○ |
| A-101 | ○ | ○ | ○ |
| A-102 | ○ | ○ | ○ |
| A-103 | ○ | ○ | ○ |
| AR-7  | X | ○ | ○ |

Examples A-104 to A-109

In Examples A-104 to A-109, the PEN films prepared in Examples A-1, A-28, A-29, A-48, A-49 and A-50 were subjected to sealing to form bags having a size of 30×30 mm, and a powdered drug (100 mg) was used as the contents. The conditions for the preparation of the packaging materials are specified in Table A25, and the results of evaluation are given in Table A26. The packaging materials had excellent easy tear property, combustibility, and transparency. The PTP's using the packaging materials prepared in Examples A-107, A-108, and A-109 were allowed to stand in an atmosphere kept at 25° C. and 90%RH for 30 days. As a result, the contents did not absorb any moisture.

Results of evaluation of packaging material

|       | Easy tearing | Combustibility | Transparency |
|-------|--------------|----------------|--------------|
| A-104 | ○ | ○ | ○ |
| A-105 | ○ | ○ | ○ |
| A-106 | ○ | ○ | ○ |
| A-107 | ○ | ○ | ○ |
| A-108 | ○ | ○ | ○ |
| A-109 | ○ | ○ | ○ |

Examples A-110 to A-115

In Examples A-110 to A-115, the PEN films prepared in Examples A-1, A-28, A-29, A-48, A-60 and A-81 were used as a cover material for a paper milk pack (capacity: 200 ml) in its opening through which a straw is to be pierced. The conditions for the preparation of the cover material are specified in Table A27, and the results of evaluation are given in Table A28. In Examples A-113 to A-115, an isocyanate AC agent was coated at a coverage of 0.5 g/m on the side of PP or PE, and a polyester adhesive was then coated thereon to form a bonding face. The packaging materials thus prepared had sufficient strength to be used as a cover material, and a straw could be easily pierced through the packaging materials to make a hole (easy piercing). Further, they had excellent combustibility and transparency.

TABLE A25

Conditions for preparation of packaging material

|       | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|-------|----------|-----------|------|---------------------|------|-----|---|----------------|
| A-104 | 0.41 | 15 | The same as A-1  | | | 210 | 4 | Vinyl chloride |
| A-105 | 0.41 | 15 | The same as A-28 | | | 210 | 4 | Vinyl chloride |
| A-106 | 0.41 | 15 | The same as A-29 | | | 210 | 4 | Vinyl chloride |
| A-107 | 0.41 | 30 | The same as A-48 | | | 210 | 4 | Vinyl chloride |
| A-108 | 0.41 | 30 | The same as A-49 | | | 210 | 4 | Vinyl chloride |
| A-109 | 0.41 | 20 | The same as A-50 | | | 210 | 4 | Vinyl chloride |

TABLE A26

TABLE A27

Conditions for preparation of cover material

|       | Intrinsic viscosity of PEN | Thickness [μm] | Stretching temp. [°C.] | Stretch ratio Longitudinal | Stretch ratio Transverse | Heat setting Temp. [°C.] | Heat setting Time [s] | Vacuum forming |
|-------|----------|-----------|------|---------------------|------|-----|---|----------------|
| A-110 | 0.41 | 15 | The same as A-1  | | | 210 | 4 | Vinyl chloride |
| A-111 | 0.41 | 15 | The same as A-28 | | | 210 | 4 | Vinyl chloride |
| A-112 | 0.41 | 15 | The same as A-29 | | | 210 | 4 | Vinyl |

TABLE A27-continued

Conditions for preparation of cover material

| | Intrinsic viscosity of PEN | Thickness [μm] | Stretching temp. [°C.] | Stretch ratio Longitudinal Transverse | Heat setting Temp. [°C.] | Time [s] | Vacuum forming |
|---|---|---|---|---|---|---|---|
| A-113 | 0.41 | 30 | | The same as A-48 | 210 | 4 | Vinyl chloride |
| A-114 | 0.41 | 31 | | The same as A-60 | 210 | 4 | Vinyl chloride |
| A-115 | 0.41 | 37 | | The same as A-81 | 210 | 4 | Vinyl chloride |

TABLE A28

Results of evaluation of cover material

| | Easy piecing | Combustibility | Transparency |
|---|---|---|---|
| A-110 | ○ | ○ | ○ |
| A-111 | ○ | ○ | ○ |
| A-112 | ○ | ○ | ○ |
| A-113 | ○ | ○ | ○ |
| A-114 | ○ | ○ | ○ |
| A-115 | ○ | ○ | ○ |

Examples A-116 to A-118

In Examples A-116 to A-118, the procedure of Examples A-65, A-75 and A-83 was repeated, except that an isocyanate AC agent was coated at a coverage of 0.5 g/m on the PP, PE or COC surface of the PEN films and a polyester adhesive was coated thereon to form a bonding face. The conditions for the preparation of the packaging materials for a press-through pack are specified in Table A29, and the results of evaluation of the packaging materials for a press-through pack are given in Table A30. The packaging materials for a press-through pack had excellent press-through property, combustibility, and transparency.

TABLE A29

Conditions for preparation of packaging material for PTP

| | Intrinsic viscosity of PEN | Thickness [μm] | Stretching temp. [°C.] | Stretch ratio Longitudinal Transverse | Heat setting Temp. [°C.] | Time [s] | Vacuum forming |
|---|---|---|---|---|---|---|---|
| A-116 | 0.41 | 37 | | The same as A-65 | 210 | 4 | Vinyl chloride |
| A-117 | 0.41 | 20 | | The same as A-75 | 210 | 4 | Vinyl chloride |
| A-118 | 0.41 | 37 | | The same as A-83 | 210 | 4 | Vinyl chloride |

TABLE A30

Results of evaluation of packaging material for press-through pack

| | Press-through property | Combustibility | Transparency | film Strength [kgf] | Elongation [mm] |
|---|---|---|---|---|---|
| A-116 | ○ | ○ | ○ | 1.4 | 3 |
| A-117 | ○ | ○ | ○ | 1.3 | 2 |
| A-118 | ○ | ○ | ○ | 1.4 | 3 |

EXAMPLE A'

Further, the process for producing a PEN film having stretch ratios of 3 to 6 times and 1 to 1.8 times respectively in substantially mutually perpendicularly directions and PTP's (press-through packs) according to the present invention will now be described in more detail with reference to the following examples. The properties in each example were measured in the same manner as in Example A.

Example A'-1

A polyethylene-2,6-naphthalate polymer having an intrinsic viscosity of 0.41 with 0.1% by weight of kaolin having an average particle diameter of 0.3 μm being added thereto was prepared by polymerization. The polymer was dried at 140° C. for 10 hr and melt-extruded at 290° C. by means of a T-die extruder having a barrel diameter of 30ø to prepare an unstretched film (width: 220 mm, thickness: 80 μm). The unstretched film was stretched 4.8 times at a stretching temperature of 135° C. in the longitudinal direction, then stretched 1.1 times in the transverse direction and heat-set at 210° C. for 30 sec to prepare a 15 μm-thick stretched polyethylene-2,6-naphthalate film.

The stretched polyethylene-2,6-naphthalate film was subjected to corona discharge treatment, and PES-330SK, which is a polyester thermoplastic adhesive manufactured by Toa Gosei Chemical Industry Co., Ltd., was coated thereon. This film was used to heat-seal, at 140° C. for 1 sec, a vacuum-formed product (a blister) of vinyl chloride into which a capsule had been packed, thereby preparing a PTP. The results of evaluation of the packaging material for a press-through pack are given in Table A'2. The packaging material for a press-through pack had excellent press-through property, combustibility, and transparency.

Examples A'-2 to A'-4 and Reference Example AR'-1

The procedure of Example A'-1 was repeated, except that the intrinsic viscosity of the polyethylene-2,6-naphthalate polymer was varied. The conditions for the preparation of the packaging materials for a press-through pack are specified in Table A'1, and the results of evaluation of the packaging materials for a press-through pack are given in Table A'2.

Examples A'-5 to A'-7 and Reference Example AR'-2

The procedure of Example A'-1 was repeated, except that the thickness of the stretched polyethylene-2,6-naphthalate film was varied. The conditions for the preparation of the packaging materials for a press-through pack are specified in Table A'1, and the results of evaluation of the packaging materials for a press-through pack are given in Table A'2.

Examples A'-8 and A'-9

The procedure of Example A'-1 was repeated, except that the stretching temperature of the stretched polyethylene-2,6-naphthalate film was varied. The conditions for the preparation of the packaging materials for a press-through pack are specified in Table A'1, and the results of evaluation of the packaging materials for a press-through pack are given in Table A'2.

Examples A'-10 to A'-13 and Reference Examples AR'-3 and AR'-4

The procedure of Example A'-1 was repeated, except that the stretch ratio (longitudinal or transverse direction) of the stretched polyethylene-2,6-naphthalate film was varied. The conditions for the preparation of the packaging materials for a press-through pack are specified in Table A'1, and the results of evaluation of the packaging materials for a press-through pack are given in Table A'2.

Examples A'-14 to A'-17 and Reference Examples AR'-5 and AR'-6

The procedure of Example A'-1 was repeated, except that the conditions (temperature or time) for heat setting the stretched polyethylene-2,6-naphthalate film were varied. In Reference Example AR'-5, the heat setting was not carried out at all. The conditions for the preparation of the packaging materials for a press-through pack are specified in Table A'1, and the results of evaluation of the packaging materials for a press-through pack are given in Table A'2.

Example A'-18 to A'-20 and Comparative Examples AC'-1 to AC'-4

The procedure of Example A'-1 was repeated, except that the material for the vacuum-formed product of the resin or the material for the cover in the packaging material for a press-through pack was varied. The stretching conditions for polypropylene (PP) and polyethylene terephthalate (PET) are those suitable for respective materials. The conditions for the preparation of the packaging materials for a press-through pack are specified in Table A'1, and the results of evaluation of the packaging materials for a press-through pack are given in Table A'2.

According to the results of evaluation given in Table A'2, when the stretched polyethylene-2,6-naphthalate film had an intrinsic viscosity of not less than 0.60 (Reference Example AR'-1), a thickness of not less than 150 μm (Reference Example AR'-2) and a stretch ratio in the transverse direction of not less than 1.8 times (Reference Examples AR'-3 and AR'-4) and was heat-set for not more than 1 sec (Reference Example AR'-5) and heat-set at a temperature of 170° C. or below (Reference Example AR'-6), the press-through property was so poor that it was difficult to take out the contents from the press-through pack.

When the cover material of the packaging for a press-through pack comprised paper (Comparative Example AC'-1), the packaging material had poor gas barrier property and transparency. When the cover material comprised an aluminum foil, the combustibility and the transparency were poor. Further, when the cover material comprised polyethylene terephthalate (Comparative Example AC'-3) or polypropylene (Comparative Example AC'-4), the press-through property was so poor that it was difficult to take out the contents from the press-through pack.

TABLE A'1

| | Conditions for preparation of packaging material for press-through pack | | | | | | | |
|---|---|---|---|---|---|---|---|---|
| | Intrinsic viscosity η of PEN as cover material | Thickness | Stretching temp. | Stretch ratio | | Heat setting | | Vacuum forming |
| | | | | Longitudinal | Transverse | Temp. | Time | |
| A'-1 | 0.41 | 15μ | 135° C. | 4.8 | 1.1 | 210° C. | 30 sec | Vinyl chloride |
| A'-2 | 0.31 | 15μ | 135° C. | 4.8 | 1.1 | 210° C. | 30 sec | Vinyl chloride |
| A'-3 | 0.47 | 15μ | 135° C. | 4.8 | 1.1 | 210° C. | 30 sec | Vinyl chloride |
| A'-4 | 0.58 | 15μ | 135° C. | 4.8 | 1.1 | 210° C. | 30 sec | Vinyl chloride |
| A'-5 | 0.41 | 10μ | 135° C. | 4.8 | 1.1 | 210° C. | 30 sec | Vinyl chloride |
| A'-6 | 0.41 | 30μ | 135° C. | 4.8 | 1.1 | 210° C. | 30 sec | Vinyl chloride |
| A'-7 | 0.41 | 45μ | 135° C. | 4.8 | 1.1 | 210° C. | 30 sec | Vinyl chloride |

TABLE A'1-continued

Conditions for preparation of packaging material for press-through pack

| | Intrinsic viscosity η of PEN as cover material | Thickness | Stretching temp. | Stretch ratio Longitudinal | Stretch ratio Transverse | Heat setting Temp. | Heat setting Time | Vacuum forming |
|---|---|---|---|---|---|---|---|---|
| A'-8 | 0.41 | 15μ | 140° C. | 4.8 | 1.1 | 210° C. | 30 sec | Vinyl chloride |
| A'-9 | 0.41 | 15μ | 160° C. | 4.8 | 1.1 | 210° C. | 30 sec | Vinyl chloride |
| A'-10 | 0.41 | 15μ | 135° C. | 3.6 | 1.0 | 210° C. | 30 sec | Vinyl chloride |
| A'-11 | 0.41 | 15μ | 135° C. | 5.3 | 1.1 | 210° C. | 30 sec | Vinyl chloride |
| A'-12 | 0.41 | 15μ | 135° C. | 4.8 | 1.0 | 210° C. | 30 sec | Vinyl chloride |
| A'-13 | 0.41 | 15μ | 135° C. | 4.8 | 1.5 | 210° C. | 30 sec | Vinyl chloride |
| A'-14 | 0.41 | 15μ | 135° C. | 4.8 | 1.1 | 180° C. | 30 sec | Vinyl chloride |
| A'-15 | 0.41 | 15μ | 135° C. | 4.8 | 1.1 | 240° C. | 30 sec | Vinyl chloride |
| A'-16 | 0.41 | 15μ | 140° C. | 4.8 | 1.1 | 210° C. | 5 sec | Vinyl chloride |
| A'-17 | 0.41 | 15μ | 135° C. | 4.8 | 1.1 | 210° C. | 30 min | Vinyl chloride |
| A'-18 | 0.41 | 15μ | 135° C. | 4.8 | 1.1 | 210° C. | 30 sec | PEN |
| A'-19 | 0.41 | 15μ | 135° C. | 4.8 | 1.1 | 210° C. | 30 sec | PP |
| A'-20 | 0.41 | 15μ | 135° C. | 4.8 | 1.1 | 210° C. | 30 sec | PET |
| AR'-1 | 0.62 | 15μ | 135° C. | 4.8 | 1.1 | 210° C. | 30 sec | Vinyl chloride |
| AR'-2 | 0.41 | 200μ | 135° C. | 4.8 | 1.1 | 210° C. | 30 sec | Vinyl chloride |
| AR'-3 | 0.41 | 15μ | 135° C. | 3.5 | 1.9 | 210° C. | 30 sec | Vinyl chloride |
| AR'-4 | 0.41 | 15μ | 135° C. | 4.8 | 1.1 | — | — | Vinyl chloride |
| AR'-5 | 0.41 | 15μ | 135° C. | 4.8 | 1.1 | 160° C. | 30 sec | Vinyl chloride |
| AC'-1 | Paper | 15μ | — | — | — | — | — | Vinyl chloride |
| AC'-2 | Aluminum foil | 20μ | — | — | — | — | — | Vinyl chloride |
| AC'-3 | PET | 15μ | 100° C. | 4.8 | 1.0 | 180° C. | 30 sec | Vinyl chloride |
| AC'-4 | PP | 15μ | 150° C. | 5.2 | 1.0 | 170° C. | 30 sec | Vinyl chloride |

TABLE A'2

Results of evaluation of packaging material for press-through pack

| | Press-through property[1] | Combus- tibility[2] | Gas (oxygen) perme- ability (cc/m² · 24 hr · atm) | Trans- parency[3] | Press-through of film Strength [kgf] | Press-through of film Elonga- tion [mm] |
|---|---|---|---|---|---|---|
| A'-1 | ○ | ○ | 36.9 | ○ | 1.3 | 2 |
| A'-2 | ○ | ○ | 40.1 | ○ | 1.2 | 2 |
| A'-3 | ○ | ○ | 38.2 | ○ | 1.3 | 2 |
| A'-4 | ○ | ○ | 37.5 | ○ | 1.6 | 2 |
| A'-5 | ○ | ○ | 55.4 | ○ | 1.1 | 2 |
| A'-6 | ○ | ○ | 35.4 | ○ | 1.5 | 2 |
| A'-7 | ○ | ○ | 37.8 | ○ | 1.7 | 3 |
| A'-8 | ○ | ○ | 37.5 | ○ | 1.5 | 2 |
| A'-9 | ○ | ○ | 42.8 | ○ | 1.5 | 2 |
| A'-10 | ○ | ○ | 43.8 | ○ | 2.0 | 3 |
| A'-11 | ○ | ○ | 34.8 | ○ | 1.3 | 2 |
| A'-12 | ○ | ○ | 38.7 | ○ | 1.3 | 1 |
| A'-13 | ○ | ○ | 40.4 | ○ | 1.9 | 3 |
| A'-14 | ○ | ○ | 41.3 | ○ | 1.3 | 2 |
| A'-15 | ○ | ○ | 37.8 | ○ | 1.3 | 2 |
| A'-16 | ○ | ○ | 40.8 | ○ | 1.3 | 2 |
| A'-17 | ○ | ○ | 39.2 | ○ | 1.2 | 1 |
| A'-18 | ○ | ○ | 32.4 | ○ | 1.3 | 2 |
| A'-19 | ○ | ○ | 60.3 | ○ | 1.3 | 2 |
| A'-20 | ○ | ○ | 50.8 | ○ | 1.3 | 2 |
| AR'-1 | X | ○ | 40.3 | ○ | 2.2 | 15 |
| AR'-2 | X | ○ | 2.9 | ○ | 8.0 | 27 |
| AR'-3 | X | ○ | 61.3 | ○ | 2.9 | 30 |
| AR'-4 | X | ○ | 36.8 | ○ | 3.2 | 34 |
| AR'-5 | X | ○ | 44.3 | ○ | 1.4 | 38 |
| AR'-6 | X | ○ | 45.2 | ○ | 1.4 | 22 |
| AC'-1 | ○ | ○ | Not less than 10000 | X | 1.9 | 2 |
| AC'-2 | ○ | X | 40.2 | X | 1.5 | 2 |
| AC'-3 | X | ○ | 57.0 | ○ | 4.2 | 20 |
| AC'-4 | X | ○ | 820.3 | Δ | 3.7 | 20 |

[1] Press-through property
○ : easy to take out capsule, X: difficult to take out capsule
[2] Combustibility
○ : no residue, Δ: partially remained unburnt, X: entirely remained unburnt
[3] Transparency
○ : transparent, Δ: semitransparent, X: opaque Examples A'-21 to A'-23

The procedure of Example A'-1 was repeated, except that in the molding of the unstretched film, polypropylene (PP) or polyethylene (PE) was co-extruded to prepare an unstretched film. The unstretched film was treated in the same manner as in Example A'-1, and the PP or PE layer was removed to prepare a stretched polyethylene-2,6-naphthalate film.

Thereafter, evaluation was carried out in the same manner as in Example A'-1. The constructions before the removal of the olefin layer are given in Table A'3, the conditions for the preparation of packaging materials for PTP, using stretched PEN films with the olefin layer being removed, are specified in Table A'4, and the results of evaluation of the packaging materials for PTP are given in Table A'5.

As a result, the packaging materials for a press-through pack had excellent press-through property, combustibility, gas permeability, and transparency.

TABLE A'3

Construction before removing olefin layer

| | Construction<br>Value within ( ): film thickness [μm] |
|---|---|
| A'-21 | PEN(15)/PP(10) |
| A'-22 | PEN(15)/PE(10) |
| A'-23 | PEN(20)/PE(10) |

TABLE A'4

Conditions for preparation of packaging material for PTP, using stretched PEN film with olefin layer being removed

| | Intrinsic viscosity | Thickness | Stretching temp. | Stretch ratio | Heat setting | Vacuum forming |
|---|---|---|---|---|---|---|
| A'-21 | 0.41 | 15μ | 135° C. | The same as A'-1 | | Vinyl chloride |
| A'-22 | 0.41 | 15μ | 135° C. | The same as A'-1 | | Vinyl chloride |
| A'-23 | 0.41 | 20μ | 135° C. | The same as A'-1 | | Vinyl chloride |

TABLE A'5

Results of evaluation of packaging material for PTP

| | Press-through property | Combustibility | Gas permeability | Transparency | Press-through of film Strength [kgf] | Elongation [mm] |
|---|---|---|---|---|---|---|
| A'-21 | ○ | ○ | 36.9 | ○ | 1.3 | 2 |
| A'-22 | ○ | ○ | 36.9 | ○ | 1.3 | 2 |
| A'-23 | ○ | ○ | 36.9 | ○ | 1.3 | 2 |

Examples A'-24 to A'-30

The procedure of Example A'-1 was repeated, except that a water-vapor barrier resin was laminated to the stretched polyethylene-2,6-naphthalate film and vinyl chloride to be vacuum-formed was coated with vinylidene chloride. The lamination was carried out by extrusion coating (EC, extrusion coating) for Examples A'-24 and A'-25, co-extrusion for Examples A'-26 to A'-28, coating for Example A'-29, and vapor deposition for Example A'-30. The constructions and the water vapor permeability of the stretched PEN films with a water vapor barrier resin being laminated thereto are given in Table A'6. The conditions for the preparation of PTP's using the above packaging materials are specified in Table A'7, and the results of evaluation of the packaging materials for PTP are given in Table A'8. The PTP's prepared in Examples A'-24 and A'-25 and the PTP prepared in Example A'-1 were allowed to stand in an atmosphere kept at 25° C. and 90%RH for 15 days. As a result, no moisture absorption was observed for the contents of the PTP's using the packaging materials prepared in A'-24 and A'-25, whereas moisture absorption was observed for the contents of the PTP using the packaging material prepared in Example A'-1. When the PTP's prepared in Examples A'-26 to A'-30 were allowed to stand in an atmosphere kept at 25° C. and 90%RH for 30 days, the contents did not absorb any moisture.

TABLE A'6

Construction and water vapor permeability of stretched PEN film with water vapor barrier resin being laminated thereto

| | Construction<br>(value within ( ):<br>film thickness [μm]) | Water vapor permeability** [g/m² · 24 hr] | Laminating method |
|---|---|---|---|
| A'-24 | PEN(15)/AD(2)/PE(12) | 30 | EC |
| A'-25 | PEN(15)/AD(2)/PP(12) | 20 | EC |
| A'-26 | PEN(15)/AD(2)/PE(12) | 9 | Co-extrusion |
| A'-27 | PEN(15)/AD(2)/PP(12) | 9 | Co-extrusion |
| A'-28 | PEN(10)/AD(2)/COC(10)/<br>AD(2)/PEN(10) | 15 | Co-extrusion |
| A'-29 | PEN(15)/PVDC(5) | 5 | Coat |
| A'-30 | PEN(15)/SiO$_x$(200A*) | Not more than 0.5 | Vapor deposition |

*angstrom
**according to JIS K7129

TABLE A'-7

Conditions for preparation of packaging material for PTP

| | Intrinsic viscosity | Thickness | Stretching temp. | Stretch ratio | Heat setting | Vacuum forming |
|---|---|---|---|---|---|---|
| A'-24 | 0.41 | 29μ | 135° C. | The same as A'-1 | | Vinyl chloride |
| A'-25 | 0.41 | 29μ | 135° C. | The same as A'-1 | | Vinyl chloride |
| A'-26 | 0.41 | 29μ | 135° C. | The same as A'-1 | | Vinyl chloride |
| A'-27 | 0.41 | 29μ | 135° C. | The same as A'-1 | | Vinyl chloride |
| A'-28 | 0.41 | 34μ | 135° C. | The same as A'-1 | | Vinyl chloride |
| A'-29 | 0.41 | 20μ | 135° C. | The same as A'-1 | | Vinyl chloride |
| A'-30 | 0.41 | 15μ | 135° C. | The same as A'-1 | | Vinyl chloride |

TABLE '8

Results of evaluation of packaging material for PTP

| | Press-through property | Combustibility | Gas permeability | Transparency | Press-through of film Strength [kgf] | Elongation [mm] |
|---|---|---|---|---|---|---|
| A'-24 | ○ | ○ | 36.9 | ○ | 1.4 | 3 |
| A'-25 | ○ | ○ | 36.9 | ○ | 1.4 | 3 |
| A'-26 | ○ | ○ | 36.9 | ○ | 1.4 | 3 |
| A'-27 | ○ | ○ | 36.9 | ○ | 1.4 | 3 |
| A'-28 | ○ | ○ | 28.2 | ○ | 1.5 | 4 |
| A'-29 | ○ | ○ | 10.0 | ○ | 1.3 | 3 |
| A'-30 | ○ | ○ | Not more than 0.5 | ○ | 1.3 | 2 |

Examples A'-31 to A'-35

The procedure of Example A'-1 was repeated, except that an oxygen barrier resin was laminated to the stretched polyethylene-2,6-naphthalate film, vinyl chloride to be vacuum-formed was coated with vinylidene chloride and the contents of the pack were solid fats and oils. The lamination was carried out by co-extrusion. In Example A'-34 and A'-35, the PTP packaging in Examples A'-29 and A'-30 was used, and the contents were solid fats and oils. The adhesive layer comprised a modified polyester adhesive resin for the co-extrusion. The constructions and the gas permeability of the stretched PEN films with an oxygen barrier resin being laminated thereto are given in Table A'9. The conditions for the preparation of the packaging materials for PTP are specified in Table A'10, and the results of evaluation of the packaging materials for PTP are given in Table A'11. The PTP's prepared in Examples A'-31 to A'-35 and the PTP prepared in Example A'-1 were allowed to stand in an atmosphere kept at 25° C. and 50%RH for 30 days. As a result, it was found that the contents of the PTP's using the packaging materials prepared in Examples A'-31 to A'-35 were not oxidized, whereas the contents of the PTP using the packaging material prepared in Example A'-1 were oxidized.

TABLE 1'9

Construction of stretched PEN film with gas barrier resin being laminated thereto

| | Construction (value within ( ): film thickness [μm]) | Laminating method |
|---|---|---|
| A'-31 | PEN(15)/AD(2)/PVA(12) | Co-extrusion |
| A'-32 | PEN(15)/AD(2)/EVOH(12) | Co-extrusion |
| A'-33 | PEN(15)/AD(2)/EVOH(5)/AD(2)/PEN(10) | Co-extrusion |
| A'-34 | PEN(15)/PVDC(5) | Coating |
| A'-35 | PEN(15)/SiO$_x$(200A*) | Vapor deposition |

*angstrom

TABLE A'10

Conditions for preparation of packaging material for PTP

| | Intrinsic viscosity | Thickness | Stretching | Stretch ratio | Heat setting | Vacuum forming |
|---|---|---|---|---|---|---|
| A'-31 | 0.41 | 29μ | 135° C. | | The same as A'-1 | Vinyl chloride |
| A'-32 | 0.41 | 29μ | 135° C. | | The same as A'-1 | Vinyl chloride |
| A'-33 | 0.41 | 29μ | 135° C. | | The same as A'-1 | Vinyl chloride |
| A'-34 | 0.41 | 20μ | 135° C. | | The same as A'-1 | Vinyl chloride |
| A'-35 | 0.41 | 15μ | 135° C. | | The same as A'-1 | Vinyl chloride |

TABLE A'11

Results of evaluation of packaging material for PTP

| | Press-through property | Combustibility | Gas permeability | Transparency | Press-through of film Strength [kgf] | Press-through of film Elongation [mm] |
|---|---|---|---|---|---|---|
| A'-31 | ○ | ○ | 4 | ○ | 1.4 | 3 |
| A'-32 | ○ | ○ | 4 | ○ | 1.5 | 4 |
| A'-33 | ○ | ○ | 10 | ○ | 1.5 | 3 |
| A'-34 | ○ | ○ | 5 | ○ | 1.3 | 3 |
| A'-35 | ○ | ○ | Not more than 0.5 | ○ | 1.3 | 2 |

Examples A'-36 and A'-37

The procedure of Example A'-1 was repeated, except that a water-vapor barrier resin and an oxygen barrier resin were laminated to the stretched polyethylene-2,6-naphthalate film, vinyl chloride to be vacuum-formed was coated with vinylidene chloride and the contents were a hygroscopic chemical. The adhesive layer comprised a modified polyester adhesive resin for the co-extrusion. The constructions and the water vapor permeability of the stretched PEN films with a water-vapor barrier resin and an oxygen barrier resin being laminated thereto are given in Table A'12. The conditions for the preparation of the packaging materials for PTP are specified in Table A'13, and the results of evaluation of the packaging materials for PTP are given in Table A'14. The PTP's using the packaging materials prepared in Examples A'-36 and A'-37 and the PTP using the packaging material prepared in Example A'-1 were allowed to stand in an atmosphere kept at 25° C. and 90%RH for 30 days. As a result, it was found that neither moisture absorption nor oxidation occurred for the contents of the PTP's using the packaging materials prepared in Examples A'-36 and A'-37, whereas moisture absorption and oxidation occurred for the contents of the PTP using the packaging material prepared in Example A'-1.

TABLE A'12

Construction of stretched PEN film with water vapor barrier resin and oxygen barrier resin being laminated thereto

| | Construction Value within ( ): film thickness [μm] | Water vapor permeability** [g/m$^2$ · 24 hr] | Laminating method |
|---|---|---|---|
| A'-36 | PEN(15)/AD(2)/EVOH(5)/AD(2)/PE(12) | 30 | Co-extrusion |
| A'-37 | PEN(15)/AD(2)/PVA(12)/AD(2)/PE(12) | 30 | Co-extrusion |

**according to JIS K7129

TABLE A'13

Conditions for preparation of packaging material for PTP

| | Intrinsic viscosity | Thickness | Stretching | Stretch ratio | Heat setting | Vacuum forming |
|---|---|---|---|---|---|---|
| A'-36 | 0.41 | 36μ | 135° C. | | The same as A'-1 | Vinyl chloride |
| A'-37 | 0.41 | 43μ | 135° C. | | The same as A#-1 | Vinyl chloride |

TABLE A'14

Results of evaluation of packaging material for PTP

| | Press-through property | Combustibility | Gas permeability | Transparency | Press-through of film Strength [kgf] | Press-through of film Elongation [mm] |
|---|---|---|---|---|---|---|
| A'-36 | ○ | ○ | 9 | ○ | 1.4 | 4 |
| A'-37 | ○ | ○ | 9 | ○ | 1.4 | 4 |

Examples A'-38 to A'-40

In Examples A'-38 to A'-40, Examples A'-1 was repeated, except that the thickness of the stretched polyethylene-2,6- naphthalate film was varied, a protective layer of PE was laminated and the contents were a cell (ø16×33 mm). The lamination was carried out by EC or co-extrusion. The constructions of the stretched PEN films with a protective layer being laminated thereto are given in Table A'15. The conditions for the preparation of the packaging materials for PTP are specified in Table A'16, and the results of evaluation of the packaging materials for PTP are given in Table A'17. The packaging materials for a press-through pack had excellent press-through property, combustibility, gas permeability, and transparency.

TABLE A'15

Construction of stretched PEN film with protective layer being laminated thereto

| | Construction Value within ( ): film thickness [μm] | Laminating method |
| --- | --- | --- |
| A'-38 | PEN(10)/AD(2)/PE(10) | Co-extrusion |
| A'-39 | PEN(10)/AD(2)/PE(20) | EC |
| A'-40 | PEN(10)/AD(2)/PE(50) | EC |

TABLE A'16

Conditions for preparation of packaging material for PTP

| | Intrinsic viscosity | Thickness | Stretching | Stretch ratio | Heat setting | Vacuum forming |
| --- | --- | --- | --- | --- | --- | --- |
| A'-38 | 0.41 | 22μ | 135° C. | The same as A'-1 | | Vinyl chloride |
| A'-39 | 0.41 | 32μ | 135° C. | The same as A'-1 | | Vinyl chloride |
| A'-40 | 0.41 | 62μ | 135° C. | The same as A'-1 | | Vinyl chloride |

TABLE A'17

Results of evaluation of packaging material for PTP

| | Press-through property | Combustibility | Gas permeability | Transparency | Press-through of film Strength [kgf] | Elongation [mm] |
| --- | --- | --- | --- | --- | --- | --- |
| A'-38 | ◯ | ◯ | 55 | ◯ | 1.2 | 3 |
| A'-39 | ◯ | ◯ | 55 | ◯ | 1.4 | 3 |
| A'-40 | ◯ | ◯ | 55 | ◯ | 1.4 | 5 |

Examples A'-41 to A'-43

The procedure of Examples A'-1 was repeated, except that the thickness of the stretched polyethylene-2,6-naphthalate film was varied, a water-vapor barrier resin and/or an oxygen barrier resin were laminated to the film, a protective layer was further laminated, vinyl chloride to be vacuum-formed was coated with vinylidene chloride and the contents were a hygroscopic chemical. The adhesive layer comprised a polyester AC agent for EC and a modified polyester adhesive resin for co-extrusion. The constructions of the water-vapor permeability of the stretched PEN films with a water-vapor barrier resin and/or an oxygen barrier resin and a protective layer being laminated thereto are given in Table A'18. The conditions for the preparation of the packaging materials for PTP are specified in Table A'19, and the results of evaluation of the packaging materials for PTP are given in Table A'20. The PTP's using the packaging materials prepared in Examples A'-41 to A'-43 and the PTP using the packaging material prepared in Example A'-1 were allowed to stand in an atmosphere kept at 25° C. and 90%RH for 30 days. As a result, no moisture absorption was observed for the contents of the PTP's using the packaging materials prepared in Examples A'-41 and A'-43, whereas moisture absorption was observed for the contents of PTP using the packing material prepared in Examples A'-1. The PTP's using the packaging materials prepared in Examples A'-41 to A'-43 and the PTP using the packaging material prepared in Example A'-1 were allowed to stand in an atmosphere kept at 25° C. and 50%RH for 30 days. As a result, it was found that no oxidation occurred for the contents of the PTP's using the packaging materials prepared in Examples A'-42 and A'-43, whereas oxidation occurred for the contents of the PTP using the packing material prepared in Examples A'-1.

TABLE A'18

Construction of stretched PEN film with water vapor barrier resin or oxygen barrier resin or both water vapor barrier resin and oxygen barrier resin and protective layer being laminated thereto

| | Construction Value within ( ): film thickness [μm] | Water vapor permeability** [g/m² · 24 hr] | Laminating method |
| --- | --- | --- | --- |
| A'-41 | PEN(7)/AD(2)/COC(10)/AD(2)/PE(12) | 10 | Co-extrusion |
| A'-42 | PEN(7)/AD(2)/EVOH(5)/AD(2)/PE(12) | 20 | Co-extrusion |
| A'-43 | PEN(7)/AD(2)/PVA(10)/AD(2)/COC(10)/AD(2)/PE(12) | 10 | Co-extrusion |

**according to JIS K7129

TABLE A'19

Conditions for preparation of packaging material for PTP

| | Intrinsic viscosity | Thickness | Stretching | Stretch ratio | Heat setting | Vacuum forming |
| --- | --- | --- | --- | --- | --- | --- |
| A'-41 | 0.41 | 33μ | 135° C. | The same as A'-1 | | Vinyl chloride |
| A'-42 | 0.41 | 28μ | 135° C. | The same as A'-1 | | Vinyl chloride |
| A'-43 | 0.41 | 45μ | 135° C. | The same as A'-1 | | Vinyl chloride |

TABLE A'20

Results of evaluation of packaging material for PTP

| | Press-through property | Combustibility | Gas permeability | Transparency | Press-through of film Strength [kgf] | Elongation [mm] |
| --- | --- | --- | --- | --- | --- | --- |
| A'-41 | ◯ | ◯ | 75 | ◯ | 1.4 | 4 |
| A'-42 | ◯ | ◯ | 10 | ◯ | 1.4 | 4 |
| A'-43 | ◯ | ◯ | 5 | ◯ | 1.4 | 4 |

Examples A'-44 to A'-46 and Reference Example AR'-8

The procedure of Examples A'-1 was repeated, except that the thickness of the stretched polyethylene-2,6-naphthalate film was varied and the contents were a working cutter (length: 150 mm). The conditions for the preparation of the packaging materials for PTP are specified in Table A'21, and the results of evaluation of the packaging materials for PTP are given in Table A'22. In Reference Example AR'-8, it was difficult to take out the contents from the press-through pack.

TABLE A'21

Conditions for preparation of packaging material for PTP

| | Intrinsic viscosity | Thickness | Stretching | Stretch ratio | Heat setting | Vacuum forming |
|---|---|---|---|---|---|---|
| A'-44 | 0.41 | 20μ | 135° C. | | The same as A'-1 | Vinyl chloride |
| A'-45 | 0.41 | 45μ | 135° C. | | The same as A'-1 | Vinyl chloride |
| A'-46 | 0.41 | 150μ | 135° C. | | The same as A'-1 | Vinyl chloride |
| A'-47 | 0.41 | 200μ | 135° C. | | The same as A'-1 | Vinyl chloride |

TABLE A'22

Results of evaluation of packaging material for PTP

| | Press-through property | Gas Combustibility | Gas permeability | Transparency | Press-through of film Strength [kgf] | Elongation [mm] |
|---|---|---|---|---|---|---|
| A'-44 | ○ | ○ | 28 | ○ | 1.4 | 2 |
| A'-45 | ○ | ○ | 12 | ○ | 1.7 | 3 |
| A'-46 | ○ | ○ | 4 | ○ | 4.4 | 7 |
| AR'-8 | X | ○ | 3 | ○ | 8.0 | 27 |

EXAMPLE B

The easy-open PEN film according to the second invention will now be described in more detail with reference to the following examples.

In the following examples, the properties were measured as follows. The properties other than those described below were measured in the same manner as in Example A.
Thermal analysis:
The melting point was measured at a temperature rise rate of 10° C./min by means of 910 model DSC manufactured by Du Pont (E.I.) de Nemours & Co.
Molecular weight distribution (dispersion: Mw/Mn):

The polymer was dissolved at a reflux temperature of hexafluoroisopropanol, and the molecular weight distribution (dispersion: Mw/Mn) was measured by GPC (gel permeation chromatography).
Easy-open property:
The easy-open property was evaluated by tearing the film with both hands. The results of evaluation are given in comparison with those of paper (thickness: 0.3 mm) because paper has a good open property.

Example B-1

2440 parts of dimethyl-2,6-naphthalate and 1241.4 parts of ethylene glycol were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate and 0.48 part of kaolin particles having an average particle diameter of 0.3 μm were added thereto at the time when the theoretical amount of methanol was distilled off. Thereafter, the reaction product (transesterification intermediate) was delivered to a vat.

Then, the transesterification intermediate thus obtained was transferred to a polymerization vessel and melted at 220° C. in a nitrogen atmosphere. Thereafter, over a period of about 60 min, the internal temperature was raised to 295° C., and the system was evacuated to a high vacuum of 0.8 mmHg. In this state, the reaction was allowed to proceed for an additional 24 min, and the resultant polymer was delivered in a strand form with the aid of nitrogen gas pressure, washed with water and cut to prepare a PEN resin chip having an intrinsic viscosity of 0.31 dl/g. The melting point of the PEN resin chip was 266.3° C.

Example B-2 to B-6

PEN resin chips with varied intrinsic viscosities were prepared in the same manner as in Example B-1, except that the transesterification intermediate prepared in Example B-1 was transferred to a polymerization vessel and the polycondensation reaction time was varied.

The results are given in Table B1.

TABLE B1

Results of polymerization for preparation of PEN (Examples B-1 to B-6, Comparative Examples BC-1 to BC-2)

| | Examples | | | | | | Comparative Examples | |
|---|---|---|---|---|---|---|---|---|
| | 1 | 2 | 3 | 4 | 5 | 6 | 1 | 2 |
| Polycondensation | | | | | | | | |
| Reaction time (min) | 24 | 32 | 40 | 46 | 62 | 88 | 23 | 65 |
| Intrinsic viscosity (dl/g) | 0.31 | 0.39 | 0.45 | 0.51 | 0.61 | 0.69 | 0.30 | 0.64 |
| Melting point | 266.31 | 266.11 | 265.87 | 265.71 | 265.53 | 265.47 | 265.88 | 265.60 |

TABLE B1-continued

Results of polymerization for preparation of PEN (Examples B-1 to B-6, Comparative Examples BC-1 to BC-2)

|  | Examples | | | | | | Comparative Examples | |
|---|---|---|---|---|---|---|---|---|
|  | 1 | 2 | 3 | 4 | 5 | 6 | 1 | 2 |
| (°C.) | | | | | | | | |

Examples B-7 to B-14

The PEN resin chip having an intrinsic viscosity of 0.31 dl/g prepared in Example B-1 and the PEN resin chips respectively having intrinsic viscosities of 0.51, 0.61, and 0.69 dl/g prepared in Examples B-4 to B-6 were dried at 160° C. for 10 hr and melt-extruded with varied blending ratios to prepare unstretched films having varied thicknesses. The films were stretched at a stretching temperature of 130° C. by 5 times in the longitudinal direction and by 1.1 times in the transverse direction and heat-set at 210° C. for 30 sec to prepare stretched PEN films having thicknesses of 15 μm, 30 μm and 50 μm.

The films thus obtained were evaluated, and the results are given in Table B2.

The molecular weight distribution (dispersion) of the PEN film prepared in Example B-13 was measured as a representative example, and the results are shown in FIG. 1.

Examples B-15 to B-27

Various stretched PEN films respectively having thicknesses of 15 μm, 30 μm and 50 μm were prepared in the same manner as in Examples B-7 to B-14, except that the PEN resin chip having an intrinsic viscosity of 0.39 dl/g prepared in Example B-2 was used. The resultant films were evaluated, and the results are given in Table B3.

TABLE B2

Properties of films prepared from PEN's prepared in Example B-1 and Examples B-4 to B-6 (Examples B-7 to B-14)

| Ex. | PEN component A | | PEN component B | | Film thickness (μm) | $IV^{1)}$ of film | Dispersion[3] | Opening[4] property | Gas (oxygen) permeability[5] |
|---|---|---|---|---|---|---|---|---|---|
|  | $IV^{1)}$ | Amount[2] | $IV^{1)}$ | Amount[2] | | | | | |
| 7 | 0.31 | 15 | 0.51 | 85 | 15 | 0.46 | 3.38 | ○ | 39.56 |
|  | " | " | " | " | 30 | " | " | ○ | 19.81 |
|  | " | " | " | " | 50 | " | " | ○ | 11.80 |
| 8 | 0.31 | 30 | 0.51 | 70 | 15 | 0.43 | 3.71 | ○ | 39.58 |
|  | " | " | " | " | 30 | " | " | ○ | 19.80 |
|  | " | " | " | " | 50 | " | " | ○ | 11.85 |
| 9 | 0.31 | 15 | 0.61 | 85 | 15 | 0.54 | 3.55 | ○ | 39.31 |
|  | " | " | " | " | 30 | " | " | ○ | 19.55 |
|  | " | " | " | " | 50 | " | " | ○ | 11.51 |
| 10 | 0.31 | 30 | 0.61 | 70 | 15 | 0.50 | 3.81 | ○ | 39.41 |
|  | " | " | " | " | 30 | " | " | ○ | 19.58 |
|  | " | " | " | " | 50 | " | " | ○ | 11.67 |
| 11 | 0.31 | 50 | 0.61 | 60 | 15 | 0.44 | 4.05 | ○ | 39.58 |
|  | " | " | " | " | 30 | " | " | ○ | 19.80 |
|  | " | " | " | " | 50 | " | " | ○ | 11.85 |
| 12 | 0.31 | 30 | 0.69 | 70 | 15 | 0.55 | 4.12 | ○ | 39.31 |
|  | " | " | " | " | 30 | " | " | ○ | 19.58 |
|  | " | " | " | " | 50 | " | " | ○ | 11.59 |
| 13 | 0.31 | 50 | 0.69 | 50 | 15 | 0.48 | 4.51 | ○ | 39.33 |
|  | " | " | " | " | 30 | " | " | ○ | 19.55 |
|  | " | " | " | " | 50 | " | " | ○ | 11.61 |
| 14 | 0.31 | 70 | 0.69 | 30 | 15 | 0.40 | 3.79 | ○ | 39.62 |
|  | " | " | " | " | 30 | " | " | ○ | 19.89 |
|  | " | " | " | " | 50 | " | " | ○ | 11.93 |

Note:
[1] Intrinsic viscosity (dl/g)
[2] Amount of the component incorporated at the time of molding of film (wt. %)
[3] Dispersion = Mw/Mn,
Mw: weight average molecular weight,
Mn: number average molecular weight
[4] ○ : comparable to paper, Δ: slightly inferior to paper, X: inferior to paper
[5] Gas (oxygen) permeability (ml/m² · 24 hr · atm)

TABLE B3

Properties of films prepared from PEN's prepared in Example B-2
and Examples B-4 to B-6 (Examples B-15 to B-28)

| Ex. | PEN component A IV[1] | Amount[2] | PEN component B IV[1] | Amount[2] | Film thickness (μm) | IV[1] of film | Dispersion[3] | Opening[4] property | Gas (oxygen) permeability[5] |
|---|---|---|---|---|---|---|---|---|---|
| 15 | 0.39 | 15 | 0.51 | 85 | 15 | 0.47 | 3.27 | ○ | 39.41 |
|  | " | " | " | " | 30 | " | " | ○ | 19.71 |
|  | " | " | " | " | 50 | " | " | ○ | 11.65 |
| 16 | 0.39 | 30 | 0.51 | 70 | 15 | 0.45 | 3.40 | ○ | 39.55 |
|  | " | " | " | " | 30 | " | " | ○ | 19.64 |
|  | " | " | " | " | 50 | " | " | ○ | 11.71 |
| 17 | 0.39 | 50 | 0.51 | 50 | 15 | 0.43 | 3.59 | ○ | 39.58 |
|  | " | " | " | " | 30 | " | " | ○ | 19.88 |
|  | " | " | " | " | 50 | " | " | ○ | 11.79 |
| 18 | 0.39 | 70 | 0.51 | 30 | 15 | 0.40 | 3.39 | ○ | 39.51 |
|  | " | " | " | " | 30 | " | " | ○ | 19.79 |
|  | " | " | " | " | 50 | " | " | ○ | 11.81 |
| 19 | 0.39 | 15 | 0.61 | 85 | 15 | 0.55 | 3.41 | ○ | 39.21 |
|  | " | " | " | " | 30 | " | " | ○ | 19.48 |
|  | " | " | " | " | 50 | " | " | ○ | 11.52 |
| 20 | 0.39 | 30 | 0.61 | 70 | 15 | 0.52 | 3.69 | ○ | 39.41 |
|  | " | " | " | " | 30 | " | " | ○ | 19.68 |
|  | " | " | " | " | 50 | " | " | ○ | 11.58 |
| 21 | 0.39 | 50 | 0.61 | 50 | 15 | 0.48 | 3.91 | ○ | 39.42 |
|  | " | " | " | " | 30 | " | " | ○ | 19.70 |
|  | " | " | " | " | 50 | " | " | ○ | 11.72 |
| 22 | 0.39 | 70 | 0.61 | 30 | 15 | 0.43 | 3.62 | ○ | 39.59 |
|  | " | " | " | " | 30 | " | " | ○ | 19.80 |
|  | " | " | " | " | 50 | " | " | ○ | 11.85 |
| 23 | 0.39 | 85 | 0.61 | 15 | 15 | 0.40 | 3.55 | ○ | 39.50 |
|  | " | " | " | " | 30 | " | " | ○ | 19.81 |
|  | " | " | " | " | 50 | " | " | ○ | 11.77 |
| 24 | 0.39 | 30 | 0.69 | 70 | 15 | 0.58 | 3.84 | ○ | 39.18 |
|  | " | " | " | " | 30 | " | " | ○ | 19.52 |
|  | " | " | " | " | 50 | " | " | ○ | 11.48 |
| 25 | 0.39 | 50 | 0.69 | 50 | 15 | 0.52 | 4.16 | ○ | 39.41 |
|  | " | " | " | " | 30 | " | " | ○ | 19.70 |
|  | " | " | " | " | 50 | " | " | ○ | 11.58 |
| 26 | 0.39 | 70 | 0.69 | 30 | 15 | 0.46 | 3.72 | ○ | 39.50 |
|  | " | " | " | " | 30 | " | " | ○ | 19.78 |
|  | " | " | " | " | 50 | " | " | ○ | 11.71 |
| 27 | 0.38 | 85 | 0.69 | 15 | 15 | 0.41 | 3.39 | ○ | 39.59 |
|  | " | " | " | " | 30 | " | " | ○ | 19.91 |
|  | " | " | " | " | 50 | " | " | ○ | 11.88 |

Note:
[1] Intrinsic viscosity (dl/g)
[2] Amount of the component incorporated at the time of molding of film (wt. %)
[3] Dispersion = Mw/Mn,
Mw: weight average molecular weight,
Mn: number average molecular weight
[4] ○ : comparable to paper, Δ: slightly inferior to paper, X: inferior to paper
[5] Gas (oxygen) permeability (ml/m$^2$ · 24 hr · atm)

Examples B-28 to B-41

Various stretched PEN films respectively having thicknesses of 15 μm, 30 μm, and 50 μm were prepared in the same manner as in Examples B-7 to B-14, except that the PEN resin chip having an intrinsic viscosity of 0.45 dl/g prepared in Example B-3 was used. The resultant films were evaluated, and the results are given in Table B4.

TABLE B4

Properties of films prepared from PEN's prepared in Example B-3
and Examples B-4 to B-6 (Examples B-28 to B-41)

| Ex. | PEN component A IV[1] | Amount[2] | PEN component B IV[1] | Amount[2] | Film thickness (μm) | IV[1] of film | Dispersion[3] | Opening[4] property | Gas (oxygen) permeability[5] |
|---|---|---|---|---|---|---|---|---|---|
| 28 | 0.45 | 15 | 0.51 | 85 | 15 | 0.48 | 3.18 | ○ | 39.29 |

TABLE B4-continued

Properties of films prepared from PEN's prepared in Example B-3 and Examples B-4 to B-6 (Examples B-28 to B-41)

| Ex. | PEN component A IV[1] | Amount[2] | PEN component B IV[1] | Amount[2] | Film thickness (μm) | IV[1] of film | Dispersion[3] | Opening[4] property | Gas (oxygen) permeability[5] |
|---|---|---|---|---|---|---|---|---|---|
|  | " | " | " | " | 30 | " | " | ○ | 19.52 |
|  | " | " | " | " | 50 | " | " | ○ | 11.55 |
| 29 | 0.45 | 30 | 0.51 | 70 | 15 | 0.47 | 3.30 | ○ | 39.25 |
|  | " | " | " | " | 30 | " | " | ○ | 19.57 |
|  | " | " | " | " | 50 | " | " | ○ | 11.52 |
| 30 | 0.45 | 50 | 0.51 | 50 | 15 | 0.46 | 3.47 | ○ | 39.40 |
|  | " | " | " | " | 30 | " | " | ○ | 19.67 |
|  | " | " | " | " | 50 | " | " | ○ | 11.71 |
| 31 | 0.45 | 70 | 0.51 | 30 | 15 | 0.44 | 3.331 | ○ | 39.34 |
|  | " | " | " | " | 30 | " | " | ○ | 19.57 |
|  | " | " | " | " | 50 | " | " | ○ | 11.60 |
| 32 | 0.45 | 85 | 0.51 | 15 | 15 | 0.43 | 3.15 | ○ | 39.55 |
|  | " | " | " | " | 30 | " | " | ○ | 19.69 |
|  | " | " | " | " | 50 | " | " | ○ | 11.71 |
| 33 | 0.45 | 15 | 0.61 | 85 | 15 | 0.56 | 3.32 | ○ | 39.21 |
|  | " | " | " | " | 30 | " | " | ○ | 19.53 |
|  | " | " | " | " | 50 | " | " | ○ | 11.49 |
| 34 | 0.45 | 30 | 0.61 | 70 | 15 | 0.54 | 3.51 | ○ | 39.25 |
|  | " | " | " | " | 30 | " | " | ○ | 19.51 |
|  | " | " | " | " | 50 | " | " | ○ | 11.55 |
| 35 | 0.45 | 50 | 0.61 | 50 | 15 | 0.51 | 3.72 | ○ | 39.38 |
|  | " | " | " | " | 30 | " | " | ○ | 19.59 |
|  | " | " | " | " | 50 | " | " | ○ | 11.65 |
| 36 | 0.45 | 70 | 0.61 | 30 | 15 | 0.47 | 3.48 | ○ | 39.44 |
|  | " | " | " | " | 30 | " | " | ○ | 19.65 |
|  | " | " | " | " | 50 | " | " | ○ | 11.71 |
| 37 | 0.45 | 85 | 0.61 | 15 | 15 | 0.45 | 3.35 | ○ | 39.44 |
|  | " | " | " | " | 30 | " | " | ○ | 19.58 |
|  | " | " | " | " | 50 | " | " | ○ | 11.60 |
| 38 | 0.45 | 30 | 0.69 | 70 | 15 | 0.59 | 3.61 | ○ | 39.21 |
|  | " | " | " | " | 30 | " | " | ○ | 19.58 |
|  | " | " | " | " | 50 | " | " | ○ | 11.47 |
| 39 | 0.45 | 50 | 0.69 | 5o | 15 | 0.55 | 3.82 | ○ | 39.26 |
|  | " | " | " | " | 30 | *" | " | ○ | 19.53 |
|  | " | " | " | " | 50 | " | " | ○ | 11.51 |
| 40 | 0.45 | 70 | 0.69 | 30 | 15 | 0.50 | 3.59 | ○ | 39.39 |
|  | " | " | " | " | 30 | " | " | ○ | 19.71 |
|  | " | " | " | " | 50 | " | " | ○ | 11.68 |
| 41 | 0.51 | 5 | 0.69 | 95 | 15 | 0.46 | 3.31 | ○ | 39.34 |
|  | " | " | " | " | 30 | " | " | ○ | 16.69 |
|  | " | " | " | " | 50 | " | " | ○ | 11.65 |

Note:
[1] Intrinsic viscosity (dl/g)
[2] Amount of the component incorporated at the time of molding of film (wt. %)
[3] Dispersion = Mw/Mn,
Mw: weight average molecular weight,
Mn: number average molecular weight
[4] ○ : comparable to paper, Δ: slightly inferior to paper, X: inferior to paper
[5] Gas (oxygen) permeability (ml/m² · 24 hr · atm)

Example B-42

Stretched PEN films respectively having thicknesses of 15 μm, 30 μm and 50 μm were prepared in the same manner as in Examples B-7 to B-14, except that the PEN resin chip having an intrinsic viscosity of 0.39 dl/g prepared in Example B-2 and the PEN resin chip having an intrinsic viscosity of 0.51 dl/g prepared in Example B-4 were used in a weight ratio of 5:95. The resultant films were evaluated, and the results are given in Table B5.

TABLE B5

Properties of film (Examples B-42 and B-43 and Reference Examples BR-1 and BR-2)

|  | Film | Open- | Gas |

| | PEN component A | | PEN component B | | thickness (μm) | IV[1] of film | Dispersion[3] | ing[4] property | (oxygen) permeability[5] |
|---|---|---|---|---|---|---|---|---|---|
| | IV[1] | Amount[2] | IV[1] | Amount[2] | | | | | |
| Ex. | | | | | | | | | |
| 42 | 0.31 | 95 | 0.51 | 5 | 15 | 0.31 | 2.88 | ○ | 39.41 |
| | " | " | " | " | 30 | " | " | ○ | 19.71 |
| | " | " | " | " | 50 | " | " | ○ | 11.69 |
| 43 | 0.51 | 5 | 0.69 | 95 | 15 | 0.68 | 2.91 | ○ | 39.56 |
| | " | " | " | " | 30 | " | " | ○ | 19.78 |
| | " | " | " | " | 50 | " | " | A | 11.85 |
| Ref. | | | | | | | | | |
| 1 | 0.51 | 2 | 0.69 | 98 | 15 | 0.69 | 2.95 | X | 39.21 |
| | " | " | " | " | 30 | " | " | X | 19.53 |
| | " | " | " | " | 50 | " | " | X | 11.49 |
| 2 | 0.31 | 98 | 0.51 | 2 | 15 | 0.30 | 2.86 | Immeasurable[6] | |
| | " | " | " | " | 30 | " | " | " | |
| | " | " | " | " | 50 | " | " | " | |

Note:
[1] Intrinsic viscosity (dl/g)
[2] Amount of the component incorporated at the time of molding of film (wt. %)
[3] Dispersion = Mw/Mn,
Mw: weight average molecular weight,
Mn: number average molecular weight
[4] ○ : comparable to paper, Δ: slightly inferior to paper, X: inferior to paper
[5] Gas (oxygen) permeability (ml/m$^2$ · 24 hr · atm)
[6] No film having a homogeneous thickness was provided due to low melt viscosity

Example B-43

Stretched PEN films respectively having thicknesses of 15 μm, 30 μm, and 50 μm were prepared in the same manner as in Examples B-7 to B-14, except that the PEN resin chip having an intrinsic viscosity of 0.45 dl/g prepared in Example B-3 and the PEN resin chip having an intrinsic viscosity of 0.69 dl/g prepared in Example B-6 were used in a weight ratio of 95:5. The resultant films were evaluated, and the results are given in Table B5.

Reference Example BR-1

Stretched PEN films respectively having thicknesses of 15 μm, 30 μm, and 50 μm were prepared in the same manner as in Examples B-7 to B-14, except that the PEN resin chip having an intrinsic viscosity of 0.51 dl/g prepared in Example B-4 and the PEN resin chip having an intrinsic viscosity of 0.69 dl/g prepared in Example B-6 were used in a weight ratio of 2:98. The resultant films were evaluated, and the results are given in Table B5.

Reference Example BR-2

Stretched PEN films respectively having thicknesses of 15 μm, 30 μm and 50 μm were prepared in the same manner as in Examples B-7 to B-14, except that the PEN resin chip having an intrinsic viscosity of 0.31 dl/g prepared in Example B-1 and the PEN resin chip having an intrinsic viscosity of 0.51 dl/g prepared in Example B-4 were used in a weight ratio of 98:2. The resultant films were evaluated, and the results are given in Table B5.

Comparative Examples BC-1 and BC-2

PEN resin chips respectively having intrinsic viscosities of 0.30 dl/g and 0.64 dl/g were prepared in the same manner as in Example B-1, except that the transesterification intermediate was transferred to a polymerization vessel and the polycondensation reaction time was varied. The results are given in Table B1.

Various stretched PEN films respectively having thicknesses of 15 μm, 30 μm and 50 μm were prepared in the same manner as in Examples B-7 to B-14, except that the PEN resin chips, having respective intrinsic viscosities of 0.30 dl/g and 0.64 dl/g, prepared in Comparative Examples BC-1 and BC-2 were each used alone.

The resultant films were evaluated, and the results are given in Table B6. Further, the PEN film prepared in Comparative Example BC-3 was subjected to measurement of molecular weight distribution (dispersion), and the results are shown in FIG. 1.

TABLE B6

Properties of film (Comparative Examples BC-1 and BC-2)

| Comp. Ex. | IV[1] of PEN as raw material resin (dl/g) | Film thickness (μm) | IV[1] of film | Dispersion[3] | Opening[4] property | Gas (oxygen) permeability[5] |
|---|---|---|---|---|---|---|
| 1 | 0.30 | 15 | 0.28 | 2.73 | Immeasurable[5] | |
| | " | 30 | " | " | " | |
| | " | 50 | " | " | " | |
| 2 | 0.64 | 15 | 0.62 | 2.74 | X | 39.28 |
| | " | 30 | " | " | X | 19.67 |
| | " | 50 | " | " | X | 11.59 |

Note:
[1] Intrinsic viscosity (dl/g)
[2] Dispersion = Mw/Mn,
Mw: weight average molecular weight,
Mn: number average molecular weight
[3] ○ : comparable to paper, Δ: slightly inferior to paper, X: inferior to paper
[4] Gas (oxygen) permeability (ml/m$^2$ · 24 hr · atm)
[5] No film having a homogeneous thickness was provided due to low melt viscosity

Example B-44

A polyester thermoplastic adhesive was coated by gravure coating at a coverage of 8 g/m$^2$ on a 15 μm-thick film prepared as described in Example B-7. The coated film was then used to heat-seal, at 160° C. for 1 sec, a vacuum-formed product (a blister) of vinyl chloride into which a capsule had been packed, thereby preparing a PTP (press-through pack). The results of evaluation of the packaging material for a press-through pack are given in Table B7. The packaging material for a press-through pack had excellent press-through property, combustibility and transparency.

Examples B-45 and B-46

The procedure of Example B-44 was repeated, except that 15 μm-thick films prepared as described in Examples B-35 and B-43 were used. The conditions for the preparation of the packaging materials for a press-through pack are specified in Table B7, and the results of evaluation of the packaging materials for a press-through pack are given in Table B8.

Examples B-47 to B-50

The procedure of Example B-44 was repeated, except that the material for a vacuum-formed product of the resin in the packaging material for a press-through pack was varied. The conditions for the preparation of the packaging materials for a press-through pack are specified in Table B7, and the results of evaluation of the packaging materials for a press-through pack are given in Table B8.

were 1.5 to 2.5 times. The conditions for the preparation of the packaging materials for a press-through pack are specified in Table B7, and the results of evaluation of the packaging materials for a press-through pack are given in Table B8.

Comparative Examples BR-3 to BR-6

The procedure of Example B-44 was repeated, except that the cover material for the packaging material for a press-through pack was varied. The stretching conditions for PP and PET were those suitable for the respective materials. The conditions for the preparation of the packaging materials for a press-through pack are specified in Table B7, and the results of evaluation of the packaging materials for a press-through pack are given in Table B8.

TABLE B7

| | | Conditions for preparation of packaging material for PTP | | | | | | |
|---|---|---|---|---|---|---|---|---|
| | | Thickness [μm] | Stretching temp. [°C.] | Stretch ratio Longitudinal | Stretch ratio Transverse | Heat Stretch Temp. [°C.] | setting Time [s] | Vacuum forming |
| B-44 | | 15 | 130 | 5 | 1.1 | 210 | 30 | Vinyl chloride |
| B-45 | | 15 | 130 | 5 | 1.1 | 210 | 30 | Vinyl chloride |
| B-46 | | 15 | 130 | 5 | 1.1 | 210 | 30 | Vinyl chloride |
| B-47 | | 15 | 130 | 5 | 1.1 | 210 | 30 | PEN |
| B-48 | | 15 | 130 | 5 | 1.1 | 210 | 30 | PP |
| B-49 | | 15 | 130 | 5 | 1.1 | 210 | 30 | PET |
| B-50 | | 15 | 130 | 5 | 1.1 | 210 | 30 | COC |
| B-51 | | 15 | — | — | — | 210 | 30 | Vinyl chloride |
| B-52 | | 15 | 130 | 1.0 | 1.5 | 210 | 30 | Vinyl chloride |
| B-53 | | 15 | 130 | 1.5 | 2.5 | 210 | 30 | Vinyl chloride |
| B-54 | | 15 | 130 | 2.5 | 2.5 | 210 | 30 | Vinyl chloride |
| BR-3 | Glassine paper | 15 | — | — | — | — | — | Vinyl chloride |
| BR-4 | Aluminum foil | 20 | — | — | — | — | — | Vinyl chloride |
| BR-5 | PET | 15 | — | — | — | 190 | 10 | Vinyl chloride |
| BR-6 | PP | 15 | — | — | — | 170 | 10 | Vinyl chloride |

Examples B-51

The procedure of Example B-1 was repeated, except that in Example B-44, an inflation extruder having a width of ⌀50 mm was used as the extruder with the die temperature being 290° C. and no stretching treatment was carried out. The conditions for the preparation of the packaging material for a press-through pack are specified in Table B7, and the results of evaluation of the packaging material for a press-through pack are given in Table B8.

Examples B-52 to B-54

The procedure of Example B-51 was repeated, except that the blow ratio and the stretch ratio in the take-up direction

TABLE B8

| | Results of evaluation of paakaging material for press-through pack | | | | |
|---|---|---|---|---|---|
| | Press-through property | Combustibility | Transparency | Press-through of film Strength [kgf] | Elongation [mm] |
| B-44 | ○ | ○ | ○ | 1.3 | 2 |
| B-45 | ○ | ○ | ○ | 1.3 | 2 |
| B-46 | ○ | ○ | ○ | 1.3 | 2 |

TABLE B8-continued

Results of evaluation of paakaging material for press-through pack

| | Press-through property[1] | Combus-tibility[2] | Trans-parency[3] | Press-through of film Strength [kgf] | Press-through of film Elonga-tion [mm] |
|---|---|---|---|---|---|
| B-47 | ○ | ○ | ○ | 1.3 | 2 |
| B-48 | ○ | ○ | ○ | 1.3 | 2 |
| B-49 | ○ | ○ | ○ | 1.3 | 2 |
| B-50 | ○ | ○ | ○ | 1.3 | 2 |
| B-51 | ○ | ○ | ○ | 1.3 | 2 |
| B-52 | ○ | ○ | ○ | 1.3 | 2 |
| B-53 | ○ | ○ | ○ | 1.3 | 2 |
| B-54 | ○ | ○ | ○ | 1.3 | 2 |
| BR-1 | ○ | ○ | X | 1.9 | 2 |
| BR-2 | ○ | X | X | 1.5 | 2 |
| BR-3 | X | ○ | ○ | 4.2 | 21 |
| BR-4 | X | ○ | ○ | 3.7 | 20 |

[1] Press-through property
○: easy to take out capsule, X: difficult to take out capsule
[2] Combustibility
○: no residue, X: entirely remained unburnt
[3] Transparency
○: transparent, X: opaque

Examples B-55 to B-57

Unstretched films were prepared by molding in the same manner as in Example B-44, except that in the molding of the PEN film, polypropylene (PP) or polyethylene (PE), or nylon (Ny) was co-extruded. Packaging materials for PTP were prepared in the same manner as in Example B-44, except that the above unstretched films were used. Thereafter, the PP or PE or Ny layer was removed, and the packaging materials were then evaluated in the same manner as in Example B-44.

The constructions of the packaging materials before the removal of the PP or PE or Ny layer are shown in Table B9, the conditions for the preparation of the packaging materials for PTP are specified in Table B10, and the results of evaluation of the packaging materials for PTP after the removal of the PP or PE or Ny layer are given in Table B11.

Examples B-58 to B-60

Unstretched films were prepared by molding in the same manner as in Example B-51, except that in the molding of the PEN film, polypropylene (PP) or polyethylene (PE) or nylon (Ny) was co-extruded. Packaging materials for PTP were prepared in the same manner as in Example B-51, except that the above unstretched films were used. Thereafter, the PP or PE or Ny layer was removed, and the packaging materials were then evaluated in the same manner as in Example B-51.

The constructions of the packaging materials before the removal of the PP or PE or Ny layer are shown in Table B9, the conditions for the preparation of the packaging materials for PTP are specified in B10, and the results of evaluation of the packaging materials for PTP after the removal of the PP or PE or Ny layer are given in Table B5.

TABLE B9

Construction before removing olefin layer and film forming method

| | Construction | Film formation |
|---|---|---|
| B-55 | PEN(15)/PP(15) | T-die co-extrusion |
| B-56 | PEN(15)/PE(15) | T-die co-extrusion |
| B-57 | PEN(15)/Ny(15) | T-die co-extrusion |
| B-58 | PEN(15)/PP(15) | Inflation co-extrusion |
| B-59 | PEN(15)/PE(15) | Inflation co-extrusion |
| B-60 | PEN(15)/Ny(15) | Inflation co-extrusion |

TABLE B10

Conditions for preparation of packaging material for PTP

| | Thick-ness [μm] | Stretch-ing temp. [°C.] | Stretch ratio Lon-gitu-dinal | Stretch ratio Trans-verse | Heat setting Temp. [°C.] | Heat setting Time [s] | Vacuum forming |
|---|---|---|---|---|---|---|---|
| B-55 | 15 | The same as B-44 | | | 210 | 30 | Vinyl chloride |
| B-56 | 15 | The same as B-44 | | | 210 | 30 | Vinyl chloride |
| B-57 | 15 | The same as B-44 | | | 210 | 30 | Vinyl chloride |
| B-58 | 15 | The same as B-51 | | | 210 | 30 | Vinyl chloride |
| B-59 | 15 | The same as B-51 | | | 210 | 30 | Vinyl chloride |
| B-60 | 15 | The same as B-51 | | | 210 | 30 | Vinyl chloride |

TABLE B11

Results of evaluation of packaging material for press-through pack

| | Press-through property | Combus-tibility | Trans-parency | Press-through of film Strength [kgf] | Press-through of film Elonga-tion [mm] |
|---|---|---|---|---|---|
| B-55 | ○ | ○ | ○ | 1.3 | 2 |
| B-56 | ○ | ○ | ○ | 1.3 | 2 |
| B-57 | ○ | ○ | ○ | 1.3 | 2 |
| B-58 | ○ | ○ | ○ | 1.3 | 2 |
| B-59 | ○ | ○ | ○ | 1.3 | 2 |
| B-60 | ○ | ○ | ○ | 1.3 | 2 |

Examples B-61 to B-72

In Examples B-61 to B-72, the procedure of Example B-44 or Example B-51 was repeated, except that a water-vapor barrier resin was laminated to the polyethylene-2,6-naphthalate film and vinyl chloride (PVC) to be vacuum-formed was coated with vinylidene chloride (PVDC). The lamination was carried out by extrusion coating (EC, heat lamination) for Examples B-61 to B-63, T-die co-extrusion for Examples B-64 to B-66, inflation co-extrusion for Examples B-67 to B-69, coating for Example B-70, and vapor deposition for Examples B-71 and B-72. The constructions and the water vapor permeability of the PEN films with water vapor barrier resins being laminated thereto are given in Table B12. The conditions for the preparation of the packaging materials for PTP are specified in Table B13, and the results of evaluation of the packaging materials for PTP are given in Table B14. The PTP's using the packaging materials prepared in Examples B-61 to B-72 and the PTP using the packaging material prepared in Example B-44 were allowed to stand in an atmosphere kept at 25° C. and 90%RH for 30 days. As a result, no moisture absorption was observed for the PTP's using the packaging materials prepared in Examples B-61 to B-72, whereas moisture absorption was observed for the PTP using the packaging material prepared in Example B-44.

TABLE B12

Construction of PEN film with water vapor barrier resin being laminated thereto and water vapor permeability

| | Construction | Water vapor permeability | Laminating method |
|---|---|---|---|
| B-61 | PEN(15)/AD(2)/PE(13) | 30 | EC |
| B-62 | PEN(15)/AD(2)/PP(13) | 20 | EC |
| B-63 | PEN(15)/AD(2)/COC(13) | 12 | EC |
| B-64 | PEN(15)/AD(2)/PE(13) | 30 | T-die co-extrusion |
| B-65 | PEN(15)/AD(2)/PP(13) | 20 | T-die co-extrusion |
| B-66 | PEN(15)/AD(2)/COC(13) | 12 | T-die co-extrusion |
| B-67 | PEN(15)/AD(2)/PE(13) | 30 | Inflation co-extrusion |
| B-68 | PEN(15)/AD(2)/PP(13) | 20 | Inflation co-extrusion |
| B-69 | PEN(15)/AD(2)/COC(13) | 12 | Inflation co-extrusion |
| B-70 | PEN(15)/PVDC(5) | 5 | Coating |
| B-71 | PEN(15)/SiO$_x$(200A) | Not more than 0.5 | Vapor deposition |
| B-72 | PEN(15)/Al$_2$O$_3$(1500A) | 3 | Vapor deposition |

Water vapor permeability [g/m$^2$ ·24 hr]

TABLE B13

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| B-61 | 30 | The same as B-44 | | | 210 | 30 | Vinyl chloride |
| B-62 | 30 | The same as B-44 | | | 210 | 30 | Vinyl chloride |
| B-63 | 30 | The same as B-44 | | | 210 | 30 | Vinyl chloride |
| B-64 | 30 | The same as B-44 | | | 210 | 30 | Vinyl chloride |
| B-65 | 30 | The same as B-44 | | | 210 | 30 | Vinyl chloride |
| B-66 | 30 | The same as B-44 | | | 210 | 30 | Vinyl chloride |
| B-67 | 30 | The same as B-51 | | | 210 | 30 | Vinyl chloride |
| B-68 | 30 | The same as B-51 | | | 210 | 30 | Vinyl chloride |
| B-69 | 30 | The same as B-51 | | | 210 | 30 | Vinyl chloride |
| B-70 | 20 | The same as B-51 | | | 210 | 30 | Vinyl chloride |
| B-71 | 15 | The same as B-51 | | | 210 | 30 | Vinyl chloride |
| B-72 | 15 | The same as B-51 | | | 210 | 30 | Vinyl chloride |

TABLE B14

Results of evaluation of packaging material for press-through pack

| | Press-through property | Combustibility | Transparency | Press-through of film Strength [kgf] | Press-through of film Elongation [mm] |
|---|---|---|---|---|---|
| B-61 | ○ | ○ | ○ | 1.4 | 3 |
| B-62 | ○ | ○ | ○ | 1.4 | 3 |
| B-63 | ○ | ○ | ○ | 1.4 | 3 |
| B-64 | ○ | ○ | ○ | 1.4 | 3 |
| B-65 | ○ | ○ | ○ | 1.4 | 3 |
| B-66 | ○ | ○ | ○ | 1.4 | 3 |
| B-67 | ○ | ○ | ○ | 1.4 | 3 |
| B-68 | ○ | ○ | ○ | 1.4 | 3 |
| B-69 | ○ | ○ | ○ | 1.4 | 3 |
| B-70 | ○ | ○ | ○ | 1.3 | 3 |
| B-71 | ○ | ○ | ○ | 1.3 | 2 |
| B-72 | ○ | ○ | ○ | 1.3 | 2 |

Example B-73 to B-79

In Example B-73 to B-79, the procedure of Example B-44 or Example B-51 was repeated, except that an oxygen barrier resin was laminated to the polyethylene-2,6-naphthalate film, vinyl chloride (PVC) to be vacuum-formed was coated with vinylidene chloride (PVDC), and the contents of the pack were solid fats and oils. The lamination was carried out by T-die co-extrusion for Examples B-73 and B-74, inflation co-extrusion for Examples B-75 and B-76, coating for Example B-77, and vapor deposition for Examples B-78 and B-79. The constructions and the oxygen permeability of the PEN films with oxygen barrier resins being laminated thereto are given in Table B15. The conditions for the preparation of the packaging materials for PTP are specified in Table B16, and the results of evaluation of the packaging materials for PTP are given in Table B17. The PTP's using the packaging materials prepared in Examples B-73 to B-79 and the PTP using the packaging material prepared in Example B-44 were allowed to stand in an atmosphere kept at 25° C. and 50%RH for 30 days. As a result, it was found that the contents of the PTP's using the packaging materials prepared in Examples B-73 to B-79 were not oxidized, whereas the contents of the PTP using the packaging material prepared in Example B-44 were oxidized.

TABLE B15

Construction and oxygen permeability of PEN film with oxygen barrier resin being laminated thereto

| | Construction | Oxygen permeability [g/m$^2$ · 24 hr] | Laminating method |
|---|---|---|---|
| B-73 | PEN(15)/AD(2)/PVA(13) | 4 | T-die co-extrusion |
| B-74 | PEN(10)/AD(2)/EVOH(5)/AD(2)/PEN(10) | 10 | T-die co-extrusion |
| B-75 | PEN(15)/AD(2)/PVA(13) | 4 | Inflation co-extrusion |
| B-76 | PEN(10)/AD(2)/EVOH(5)/AD(2)/PEN(10) | 10 | Inflation co-extrusion |
| B-77 | PEN(15)/PVDC(5) | 5 | Coating |
| B-78 | PEN(15)/SiO$_x$(200A) | Not more than 0.5 | Vapor deposition |
| B-79 | PEN(15)/Al$_2$O$_3$(1500A) | 3 | Vapor deposition |

TABLE B16

Conditions for preparation of packaging material for PTP

| | Thickness [μm] | Stretching temp. [°C.] | Stretch ratio Longi-tudinal | Stretch ratio Trans-verse | Heat setting Temp. [°C.] | Heat setting Time [s] | Vacuum forming |
|---|---|---|---|---|---|---|---|
| B-73 | 30 | | The same as B-44 | | 210 | 4 | Vinyl chloride |
| B-74 | 29 | | The same as B-44 | | 210 | 4 | Vinyl chloride |
| B-75 | 30 | | The same as B-51 | | 210 | 4 | Vinyl chloride |
| B-76 | 29 | | The same as B-51 | | 210 | 4 | Vinyl chloride |
| B-77 | 20 | | The same as B-51 | | 210 | 4 | Vinyl chloride |
| B-78 | 15 | | The same as B-51 | | 210 | 4 | Vinyl chloride |
| B-79 | 15 | | The same as B-51 | | 210 | 4 | Vinyl chloride |

TABLE B17

Results of evaluation of packaging material for press-through pack

| | Press-through property | Combus-tibility | Transparency | Press-through of film Strength [kgf] | Press-through of film Elongation [mm] |
|---|---|---|---|---|---|
| B-73 | ○ | ○ | ○ | 1.4 | 3 |
| B-74 | ○ | ○ | ○ | 1.5 | 3 |
| B-75 | ○ | ○ | ○ | 1.4 | 3 |
| B-76 | ○ | ○ | ○ | 1.5 | 3 |
| B-77 | ○ | ○ | ○ | 1.3 | 3 |
| B-78 | ○ | ○ | ○ | 1.3 | 2 |
| B-79 | ○ | ○ | ○ | 1.3 | 2 |

Examples B-80 to B-85

In Examples B-80 to B-85, the procedure of Example B-44 or Example B-51 was repeated, except that a water-vapor barrier resin and an oxygen barrier resin were laminated to the polyethylene-2,6-naphthalate film and vinyl chloride (PVC) to be vacuum-formed was coated with vinylidene chloride (PVDC). The lamination was carried out by T-die co-extrusion for Examples B-80 to B-82 and inflation co-extrusion for Examples B-83 and B-85. The constructions, the water vapor permeability, and the oxygen permeability of the PEN films with water-vapor barrier resins and oxygen barrier resins being laminated thereto are given in Table B18. The conditions for the preparation of the packaging materials for PTP are specified in Table B19, and the results of evaluation of the packaging materials for PTP are given in Table B20. The PTP's using the packaging materials prepared in Examples B-80 to B-85 and the PTP using the packaging material prepared in Example B-44 were allowed to stand in an atmosphere kept at 25° C. and 90%RH for 30 days. As a result, it was found that no moisture absorption occurred for the contents of the PTP's using the packaging materials prepared in Examples B-80 to B-85, whereas moisture absorption occurred for the contents of the PTP using the packaging material prepared in Example B-44.

TABLE B18

Construction, water vapor permeability and oxygen permeability of PEN film with water vapor barrier layer and oxygen barrier resin being laminated thereto

| | Construction | Water vapor permeability [g/m² · 24 hr] | Oxygen permeability [g/m² · 24 hr] | Laminating method |
|---|---|---|---|---|
| B-80 | PEN(10)/AD(2)/EVOH(5)/AD(2)/PE(10) | 35 | 10 | T-die co-extrusion |
| B-81 | PEN(10)/AD(2)/EVOH(5)/AD(2)/COC(5) | 7 | 10 | Inflation co-extrusion |
| B-82 | PEN(10)/AD(2)/PVA(10)/AD(2)/PP(10) | 15 | 5 | Inflation co-extrusion |
| B-83 | PEN(10)/AD(2)/EVOH(5)/AD(2)/PE(10) | 35 | 10 | Inflation co-extrusion |
| B-84 | PEN(10)/AD(2)/EVOH(5)/AD(2)/COC(5) | 7 | 10 | Inflation co-extrusion |
| B-85 | PEN(10)/AD(2)/PVA(10)/AD(2)/PP(10) | 15 | 5 | Inflation co-extrusion |

TABLE B19

Conditions for preparation of packaging material for PTP

| | Thickness [μm] | Stretching temp. [°C.] | Stretch ratio Longi-tudinal | Stretch ratio Trans-verse | Heat setting Temp. [°C.] | Heat setting Time [s] | Vacuum forming |
|---|---|---|---|---|---|---|---|
| B-80 | 31 | | The same as B-44 | | 210 | 30 | Vinyl chloride |
| B-81 | 24 | | The same as B-44 | | 210 | 30 | Vinyl chloride |
| B-82 | 34 | | The same as B-44 | | 210 | 30 | Vinyl chloride |
| B-83 | 31 | | The same as B-28 | | 210 | 30 | Vinyl chloride |
| B-84 | 24 | | The same as B-28 | | 210 | 30 | Vinyl chloride |

TABLE B19-continued

Conditions for preparation of packaging material for PTP

| | Thickness [μm] | Stretching temp. [°C.] | Stretch ratio Longi-tudinal | Trans-verse | Heat setting Temp. [°C.] | Time [s] | Vacuum forming |
|---|---|---|---|---|---|---|---|
| B-85 | 34 | | The same as B-28 | | 210 | 30 | Vinyl chloride |

TABLE B20

Results of evaluation of packaging material for press-through pack

| | Press-through property | Combus-tibility | Transparency | Press-through of film Strength [kgf] | Elongation [mm] |
|---|---|---|---|---|---|
| B-80 | ○ | ○ | ○ | 1.4 | 4 |
| B-81 | ○ | ○ | ○ | 1.4 | 2 |
| B-82 | ○ | ○ | ○ | 1.5 | 3 |
| B-83 | ○ | ○ | ○ | 1.4 | 4 |
| B-84 | ○ | ○ | ○ | 1.4 | 2 |
| B-85 | ○ | ○ | ○ | 1.5 | 3 |

Examples B-86 to B-103

In Examples B-86 to B-103, the procedure of Example B-44 or Example B-51 was repeated, except that a reinforcing layer comprising a synthetic resin was laminated to the polyethylene-2,6-naphthalate film prepared in Example B-44 or Example B-51. The lamination was carried out by EC for Examples B-86 to B-91, T-die co-extrusion for Examples B-92 to B-97, and inflation co-extrusion for Examples B-98 to B-103. The constructions of the PEN films with reinforcing layers being laminated thereto are given in Table B21. The conditions for the preparation of the packaging materials for PTP are specified in Table B22, and the results of evaluation of the packaging materials for PTP are given in Table B23.

TABLE B21

Construction of PEN film with reinforcing layer laminated thereto

| | Construction | Laminating method |
|---|---|---|
| B-86 | PEN(8)/AD(2)/PE(10) | EC |
| B-87 | PEN(15)/AD(2)/PE(20) | EC |
| B-88 | PEN(8)/AD(2)/PP(10) | EC |
| B-89 | PEN(15)/AD(2)/PP(20) | EC |
| B-90 | PEN(8)/AD(2)/COC(10) | EC |
| B-91 | PEN(15)/AD(2)/COC(20) | EC |
| B-92 | PEN(8)/AD(2)/PE(10) | T-die co-extrusion |
| B-93 | PEN(15)/AD(2)/PE(20) | T-die co-extrusion |
| B-94 | PEN(8)/AD(2)/PP(10) | T-die co-extrusion |
| B-95 | PEN(15)/AD(2)/PP(20) | T-die co-extrusion |
| B-96 | PEN(8)/AD(2)/COC(10) | T-die co-extrusion |
| B-97 | PEN(15)/AD(2)/COC(20) | T-die co-extrusion |
| B-98 | PEN(8)/AD(2)/PE(10) | Inflation co-extrusion |
| B-99 | PEN(15)/AD(2)/PE(20) | Inflation co-extrusion |
| B-100 | PEN(8)/AD(2)/PP(10) | Inflation co-extrusion |
| B-101 | PEN(15)/AD(2)/PP(20) | Inflation co-extrusion |
| B-102 | PEN(8)/AD(2)/COC(10) | Inflation co-extrusion |
| B-103 | PEN(15)/AD(2)/COC(20) | Inflation co-extrusion |

TABLE B22

Conditions for preparation of packaging material for PTP

| | Thickness [μm] | Stretching temp. [°C.] | Stretch ratio Longi-tudinal | Trans-verse | Heat setting Temp. [°C.] | Time [s] | Vacuum forming |
|---|---|---|---|---|---|---|---|
| B-86 | 20 | | — | — | 210 | 4 | Vinyl chloride |
| B-87 | 37 | | — | — | 210 | 4 | Vinyl chloride |
| B-88 | 20 | | — | — | 210 | 4 | Vinyl chloride |
| B-89 | 37 | | — | — | 210 | 4 | Vinyl chloride |
| B-90 | 20 | | — | — | 210 | 4 | Vinyl chloride |
| B-91 | 37 | | — | — | 210 | 4 | Vinyl chloride |
| B-92 | 20 | | The same as B-1 | | 219 | 4 | Vinyl chloride |
| B-93 | 37 | | The same as B-1 | | 210 | 4 | Vinyl chloride |
| B-94 | 20 | | The same as B-1 | | 210 | 4 | Vinyl chloride |
| B-95 | 37 | | The same as B-1 | | 210 | 4 | Vinyl chloride |
| B-96 | 20 | | The same as B-1 | | 210 | 4 | Vinyl chloride |
| B-97 | 37 | | The same as B-1 | | 210 | 4 | Vinyl chloride |
| B-98 | 20 | | The same as B-28 | | 210 | 4 | Vinyl chloride |
| B-99 | 37 | | The same as B-28 | | 210 | 4 | Vinyl chloride |
| B-100 | 20 | | The same as B-28 | | 210 | 4 | Vinyl chloride |
| B-101 | 37 | | The same as B-28 | | 210 | 4 | Vinyl chloride |
| B-102 | 20 | | The same as B-28 | | 210 | 4 | Vinyl chloride |
| B-103 | 37 | | The same as B-28 | | 210 | 4 | Vinyl chloride |

TABLE B23

Results of evaluation of packaging material for press-through pack

| | Press-through property | Combus-tibility | Transparency | Press-through of film Strength [kgf] | Elongation [mm] |
|---|---|---|---|---|---|
| B-86 | ○ | ○ | ○ | 1.2 | 3 |
| B-87 | ○ | ○ | ○ | 1.4 | 3 |
| B-88 | ○ | ○ | ○ | 1.3 | 3 |
| B-89 | ○ | ○ | ○ | 1.4 | 3 |
| B-90 | ○ | ○ | ○ | 1.3 | 2 |
| B-91 | ○ | ○ | ○ | 1.4 | 2 |
| B-92 | ○ | ○ | ○ | 1.2 | 3 |
| B-93 | ○ | ○ | ○ | 1.4 | 3 |
| B-94 | ○ | ○ | ○ | 1.3 | 3 |
| B-95 | ○ | ○ | ○ | 1.4 | 3 |
| B-96 | ○ | ○ | ○ | 1.3 | 2 |
| B-97 | ○ | ○ | ○ | 1.4 | 2 |
| B-98 | ○ | ○ | ○ | 1.2 | 3 |
| B-99 | ○ | ○ | ○ | 1.4 | 3 |
| B-100 | ○ | ○ | ○ | 1.3 | 3 |
| B-101 | ○ | ○ | ○ | 1.4 | 3 |
| B-102 | ○ | ○ | ○ | 1.3 | 2 |
| B-103 | ○ | ○ | ○ | 1.4 | 2 |

Examples B-104 to B-111

In Examples B-104 to B-111, the procedure of Example B-44 or Example B-51 was repeated, except that a water-vapor barrier resin and/or an oxygen barrier resin were laminated to the polyethylene-2,6-naphthalate film, a reinforcing layer was laminated thereto, vinyl chloride (PVC) to be vacuum-formed was coated with vinylidene chloride (PVDC) and the contents were a hygroscopic chemical. The lamination was carried out by T-die co-extrusion for Examples B-104 to B-107 and inflation co-extrusion extrusion for Examples B-108 and B-111. The constructions, the water vapor permeability and the oxygen permeability of PEN films with a water vapor barrier resin and/or an oxygen barrier resin and a reinforcing layer being laminated thereto are given in Table B24. The conditions for the preparation of the packaging materials for PTP are specified in Table B25, and the results of evaluation of the packaging materials for PTP are given in Table B26. The PTP's using the packaging materials prepared in Examples B-104 to B-111 and the PTP using the packaging material prepared in Example B-44 were allowed to stand in an atmosphere kept at 25° C. and 90%RH for 30 days. As a result, it was found that no moisture absorption occurred for the contents of the PTP's using the packaging materials prepared in Examples B-104 to B-111, whereas moisture absorption occurred for the contents of the PTP using the packaging material prepared in Example B-44.

TABLE B24

Construction of PEN film with water vapor barrier layer or oxygen barrier layer or both vapor barrier layer and oxygen barrier layer and reinforcing layer laminated thereto

| | Construction | Water vapor permeability [g/m² · 24 hr] | Oxygen permeability [g/m² · 24 hr] | Laminating method |
|---|---|---|---|---|
| B-104 | PEN(10)/AD(2)/ EVOH(5)/AD(2)/ PE(15) | 22 | 10 | T-die co-extrusion |
| B-105 | PEN(10)/AD(2)/ EVOH(5)/AD(2)/ PP(15) | 15 | 10 | T-die co-extrusion |
| B-106 | PEN(10)/AD(2)/ PVA(10)/AD(2)/ COC(10)/AD(2)/ PP(10) | 10 | 5 | T-die co-extrusion |
| B-107 | PEN(10)/AD(2)/ PVA(10)/AD(2)/ COC(10)/AD(2)/ Ny(10) | 10 | 5 | T-die co-extrusion |
| B-108 | PEN(10)/AD(2)/ EVOH(5)/AD(2)/ PE(15) | 22 | 10 | Inflation co-extrusion |
| B-109 | PEN(10)/AD(2)/ EVOH(5)/AD(2)/ PP(15) | 15 | 10 | Inflation co-extrusion |
| B-110 | PEN(10)/AD(2)/ PVA(10)/AD(2)/ COC(10)/AD(2)/ PP(10) | 10 | 5 | Inflation co-extrusion |
| B-111 | PEN(10)/AD(2)/ PVA(10)/AD(2)/ COC(10)/AD(2)/ Ny(10) | 10 | 5 | Inflation co-extrusion |

TABLE B25

Conditions for preparation of packaging material for PTP

| | Thickness [μm] | Stretching temp. [°C.] | Stretch ratio Longi-tudinal | Trans-verse | Heat setting Temp. [°C.] | Time [s] | Vacuum forming |
|---|---|---|---|---|---|---|---|
| B-104 | 34 | | The same as B-44 | | 210 | 30 | Vinyl chloride |
| B-105 | 34 | | The same as B-44 | | 210 | 30 | Vinyl chloride |
| B-106 | 46 | | The same as B-44 | | 210 | 30 | Vinyl chloride |
| B-107 | 46 | | The same as B-44 | | 210 | 30 | Vinyl chloride |
| B-108 | 34 | | The same as B-51 | | 210 | 30 | Vinyl chloride |
| B-109 | 34 | | The same as B-51 | | 210 | 30 | Vinyl chloride |
| B-110 | 46 | | The same as B-51 | | 210 | 30 | Vinyl chloride |
| B-111 | 46 | | The same as B-51 | | 210 | 30 | Vinyl chloride |

TABLE B26

Results of evaluation of packaging material for press-through pack

| | Press-through property | Combustibility | Transparency | Press-through of film Strength [kgf] | Elongation [mm] |
|---|---|---|---|---|---|
| B-104 | ○ | ○ | ○ | 1.4 | 4 |
| B-105 | ○ | ○ | ○ | 1.5 | 3 |
| B-106 | ○ | ○ | ○ | 1.5 | 4 |
| B-107 | ○ | ○ | ○ | 1.6 | 4 |
| B-108 | ○ | ○ | ○ | 1.4 | 4 |
| B-109 | ○ | ○ | ○ | 1.5 | 3 |
| B-110 | ○ | ○ | ○ | 1.5 | 4 |
| B-111 | ○ | ○ | ○ | 1.6 | 4 |

Example B-112 to B-117

In Example B-112 to B-117, the procedure of Examples B-44, B-99, B-101, and B-103 was repeated, except that the film thickness was varied, the contents were a working cutter (length: 150 mm) and a vacuum-formed product for a working cutter was used. The conditions for the preparation of the packaging materials for PTP are specified in Table B27, and the results of evaluation of the packaging materials for PTP are given in Table B28.

TABLE B27

Conditions for preparation of packaging material for PTP

| | Thickness [μm] | Stretching temp. [°C.] | Stretch ratio Longi-tudinal | Trans-verse | Heat setting Temp. [°C.] | Time [s] | Vacuum forming |
|---|---|---|---|---|---|---|---|
| B-112 | 20 | The same as B-44 | | | 210 | 30 | Vinyl chloride |
| B-113 | 45 | The same as B-44 | | | 210 | 30 | Vinyl chloride |
| B-114 | 150 | The same as B-44 | | | 210 | 30 | Vinyl chloride |
| B-115 | 37 | The same as B-99 | | | 210 | 30 | Vinyl chloride |
| B-116 | 37 | The same as B-101 | | | 210 | 30 | Vinyl chloride |
| B-117 | 37 | The same as B-103 | | | 210 | 30 | Vinyl chloride |

TABLE B28

Results of evaluation of packaging material for press-through pack

| | Press-through property | Combustibility | Transparency |
|---|---|---|---|
| B-112 | ○ | ○ | ○ |
| B-113 | ○ | ○ | ○ |
| B-114 | ○ | ○ | ○ |
| B-115 | ○ | ○ | ○ |
| B-116 | ○ | ○ | ○ |
| B-117 | ○ | ○ | ○ |

Example B-118 to B-123

In Examples B-118 to B-123, the procedure of Examples B-44, B-51, B-52, B-93, B-101, and B-103 was repeated, except that the contents were a toothbrush for interdentium (approximate dimension: ø8×45 mm) and a vacuum-formed product for a toothbrush for interdentium was used. The conditions for the preparation of the packaging materials for PTP are specified in Table B29, and the results of evaluation of the packaging materials for PTP are given in Table B30.

TABLE B29

Conditions for preparation of packaging material for PTP

| | Thickness [μm] | Stretching temp. [°C.] | Stretch ratio Longi- tudinal | Trans- verse | Heat setting Temp. [°C.] | Time [s] | Vacuum forming |
|---|---|---|---|---|---|---|---|
| B-118 | 15 | | The same as B-44 | | 210 | 30 | Vinyl chloride |
| B-119 | 15 | | The same as B-51 | | 210 | 30 | Vinyl chloride |
| B-120 | 15 | | The same as B-52 | | 210 | 30 | Vinyl chloride |
| B-121 | 37 | | The same as B-93 | | 210 | 30 | Vinyl chloride |
| B-122 | 37 | | The same as B-101 | | 210 | 30 | Vinyl chloride |
| B-123 | 37 | | The same as B-103 | | 210 | 30 | Vinyl chloride |

TABLE B30

Results of evaluation of packaging material for press-through pack

| | Press-through property | Combustibility | Transparency |
|---|---|---|---|
| B-118 | ○ | ○ | ○ |
| B-119 | ○ | ○ | ○ |
| B-120 | ○ | ○ | ○ |
| B-121 | ○ | ○ | ○ |
| B-122 | ○ | ○ | ○ |
| B-123 | ○ | ○ | ○ |

Examples B-124 to B-129

In Examples B-124 to B-129, the PEN films prepared in Examples B-44, B-51, B-52, B-68, B-69, and B-70 were subjected to sealing to form bags having a size of 30×30 mm, and a powdered drug (100 mg) was used as the contents. The conditions for the preparation of the packaging materials are specified in Table B31, and the results of evaluation are given in Table B32. The packaging materials had excellent easy tear property, combustibility, and transparency. The bags using the packaging materials prepared in Examples B-127, B-128, and B-129 were allowed to stand in an atmosphere kept at 25° C. and 90%RH for 30 days. As a result, the contents did not absorb any moisture.

TABLE B31

Conditions for preparation of packaging material

| | Thickness [μm] | Stretching temp. [°C.] | Stretch ratio Longi- tudinal | Trans- verse | Heat setting Temp. [°C.] | Time [s] | Vacuum forming |
|---|---|---|---|---|---|---|---|
| B-124 | 15 | | The same as B-44 | | 210 | 30 | Vinyl chloride |
| B-125 | 15 | | The same as B-51 | | 210 | 30 | Vinyl chloride |
| B-126 | 15 | | The same as B-52 | | 210 | 30 | Vinyl chloride |
| B-127 | 30 | | The same as B-68 | | 210 | 30 | Vinyl chloride |
| B-128 | 30 | | The same as B-69 | | 210 | 30 | Vinyl chloride |
| B-129 | 20 | | The same as B-70 | | 210 | 30 | Vinyl chloride |

TABLE B32

Results of evaluation of packaging material

| | Easy tearing | Combustibility | Transparency |
|---|---|---|---|
| B-124 | ○ | ○ | ○ |
| B-125 | ○ | ○ | ○ |
| B-126 | ○ | ○ | ○ |
| B-127 | ○ | ○ | ○ |
| B-128 | ○ | ○ | ○ |
| B-129 | ○ | ○ | ○ |

Examples B-130 to B-135

In Examples B-130 to B-145, the PEN films prepared in Examples B-44, B-51, B-52, B-68, B-80, and B-101 were used as a cover material for a paper milk pack (capacity: 200 ml) in its opening through which a straw is to be pierced. The conditions for the preparation of the cover material are specified in Table B33, and the results of evaluation are given in Table B34. In Examples B-130 to B-135, an isocyanate AC agent was coated at a coverage of 0.5 g/m on the side of PP or PE, and a thermoplastic adhesive was then coated thereon to form a bonding face. The packaging materials thus prepared had sufficient strength to be used as a cover material, and a straw could be easily pierced through the packaging materials to make a hole (easy piercing). Further, they had excellent combustibility and transparency.

TABLE B33

Conditions for preparation of cover material

| | Stretching | Stretch ratio | | Heat setting | | |
|---|---|---|---|---|---|---|
| | Thickness [μm] | temp. [°C.] | Longi-tudinal | Trans-verse | Temp. [°C.] | Time [s] | Vacuum forming |
| B-130 | 15 | The same as B-44 | | | 210 | 30 | Vinyl chloride |
| B-131 | 15 | The same as B-51 | | | 210 | 30 | Vinyl chloride |
| B-132 | 15 | The same as B-52 | | | 210 | 30 | Vinyl chloride |
| B-133 | 30 | The same as B-68 | | | 210 | 30 | Vinyl chloride |
| B-134 | 31 | The same as B-80 | | | 210 | 30 | Vinyl chloride |
| B-135 | 37 | The same as B-101 | | | 210 | 30 | Vinyl chloride |

TABLE B34

Results of evaluation of cover material

| | Easy piecing | Combustibility | Transparency |
|---|---|---|---|
| B-130 | ○ | ○ | ○ |
| B-131 | ○ | ○ | ○ |
| B-132 | ○ | ○ | ○ |
| B-133 | ○ | ○ | ○ |
| B-134 | ○ | ○ | ○ |
| B-135 | ○ | ○ | ○ |

Examples B-136 to B-138

In Examples B-136 to B-138, the procedure of Examples B-85, B-95, and B-103 was repeated, except that an isocyanate AC agent was coated at a coverage of 0.5 g/m on the PP, PE, or COC surface of the PEN films and a thermoplastic adhesive was coated thereon to form a bonding face. The conditions for the preparation of the packaging materials for a press-through pack are specified in Table B35, and the results of evaluation of the packaging materials for a press-through pack are given in Table B36. The packaging materials for a press-through pack had excellent press-through property, combustibility, and transparency.

TABLE B35

Conditions for preparation of packaging material for PTP

| | Stretching | Stretch ratio | | Heat setting | | |
|---|---|---|---|---|---|---|
| | Thickness [μm] | temp. [°C.] | Longi-tudinal | Trans-verse | Temp. [°C.] | Time [s] | Vacuum forming |
| B-136 | 37 | The same as B-85 | | | 210 | 30 | Vinyl chloride |
| B-137 | 20 | The same as B-95 | | | 210 | 30 | Vinyl chloride |
| B-138 | 37 | The same as B-103 | | | 210 | 30 | Vinyl chloride |

TABLE B36

Results of evaluation of packaging material for press-through pack

| | Press-through property | Combus-tibility | Trans-parency | Press-through of film | |
|---|---|---|---|---|---|
| | | | | Strength [kgf] | Elonga-tion [mm] |
| B-136 | ○ | ○ | ○ | 1.4 | 3 |
| B-137 | ○ | ○ | ○ | 1.3 | 2 |

TABLE B36-continued

Results of evaluation of packaging material for press-through pack

| | Press-through property | Combus-tibility | Trans-parency | Press-through of film | |
|---|---|---|---|---|---|
| | | | | Strength [kgf] | Elonga-tion [mm] |
| B-138 | ○ | ○ | ○ | 1.4 | 3 |

EXAMPLE C

The easy-open PEN film according to the third invention will now be described in more detail with reference to the following examples.

In the following examples, the properties were measured as follows. The properties other than those described below were measured in the same manner as in Example A.

Infrared absorption spectrum:

The infrared absorption spectrum was obtained by using FT/IR-5000 manufactured by Japan Spectroscopic Co., Ltd.

Composition analysis:

A modified PEN was hydrolyzed with potassium hydroxide in ethoxyethanol under reflux. The hydrolysis mixture was neutralized with hydrochloric acid, pyridine as an extraction solvent was added thereto, and the mixture was subjected to solid-liquid separation. The pyridine extract was trimethylsilylated, and the 2,6-naphthalenedicarboxylic acid, ethylene glycol and glycerin contents were determined by gas chromatography.

Example C-1

2440 parts of dimethyl-2,6-naphthalate and 1241.4 parts of ethylene glycol were placed in a reaction vessel provided with a rectifying column. The contents of the reaction vessel were heated and dissolved, and 0.74 part of manganese(II)

acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate and 0.48 part of kaolin particles having an average particle diameter of 0.3 μm were added thereto at the time when the theoretical amount of methanol was distilled off to give a reaction product (transesterification intermediate A).

Separately, 2440 parts of dimethyl-2,6-naphthalate and 184.2 parts of glycerin were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate, and 0.48 part of kaolin particles having an average particle diameter of 0.3 μm were added thereto at the time when the theoretical amount of methanol was distilled off to give a reaction product (transesterification intermediate B).

302 parts of the transesterification intermediate A and 1.8 parts of the transesterification intermediate B thus obtained were transferred to a polymerization vessel and melted at 220° C. in a nitrogen atmosphere. Thereafter, over a period of about 60 min, the internal temperature was raised to 295° C., and the system was evacuated to a high vacuum of 0.8 mmHg. In this state, the polycondensation reaction was allowed to proceed for an additional 43 min, and the resultant polymer was delivered in a strand form with the aid of nitrogen gas pressure, washed with water and cut to prepare a PEN resin chip having an intrinsic viscosity of 0.38 dl/g.

Figure 2:
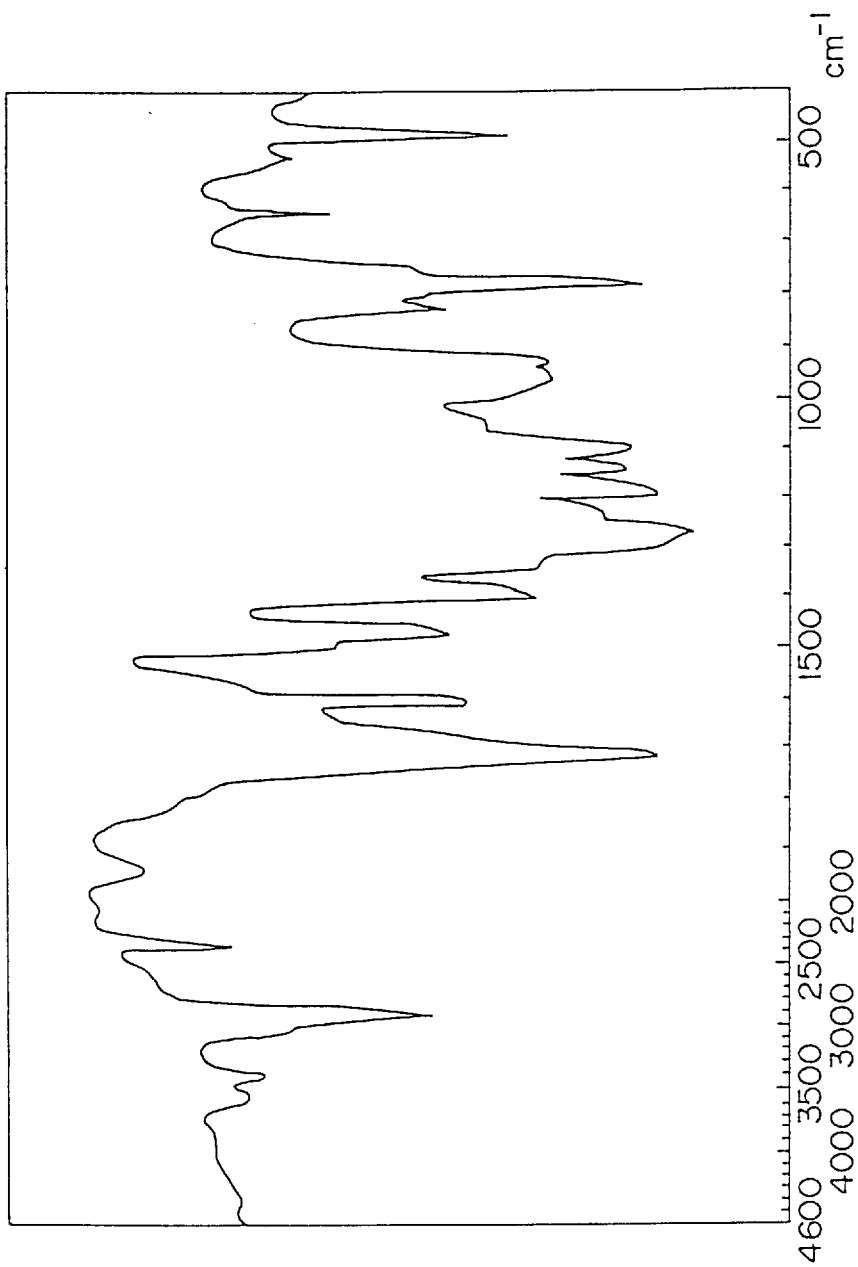
FIG. 2 is a diagram showing an infrared absorption spectrum of a modified PEN prepared in Example C-1.

The results of the polycondensation reactions, the measurements of intrinsic viscosity and melting point, and the composition analysis of the modified PEN resin chips are given in Table C1, and the results of analysis for an infrared absorption spectrum are given in Table C2 and FIG. 2.

TABLE C1

Results of polycondensation reaction

| | Intermediate A[1] (pt. wt.) | Intermediate B[2] (pt. wt.) | Poly-condensation reaction time (min) | Intrinsic viscosity (dl/g) | Melting point (°C.) | Results of analysis of composition (mol. %) | | |
|---|---|---|---|---|---|---|---|---|
| | | | | | | Dicarboxylic acid moiety | Hydroxy compound moiety | |
| | | | | | | | Ethylene glycol | Glycerin |
| | | | | | | 2,6-NDCA[8] | | |
| C-1 | 302.0 | 1.8 | 43 | 0.38 | 263.82 | 100 | 99.4 | 0.6 |
| C-2 | 302.0 | 1.8 | 52 | 0.54 | 263.78 | 100 | 99.4 | 0.6 |
| C-3 | 302.0 | 1.8 | 65 | 0.70 | 263.81 | 100 | 99.4 | 0.6 |
| C-4 | 301.0 | 3.6 | 40 | 0.38 | 260.96 | 100 | 98.8 | 1.2 |
| C-5 | 301.0 | 3.6 | 48 | 0.54 | 260.93 | 100 | 98.8 | 1.2 |
| C-6 | 301.0 | 3.6 | 55 | 0.69 | 258.90 | 100 | 98.8 | 1.2 |
| C-7 | 298.0 | 6.5 | 35 | 0.37 | 258.35 | 100 | 97.9 | 2.1 |
| C-8 | 298.0 | 6.5 | 39 | 0.53 | 258.32 | 100 | 97.9 | 2.1 |
| C-9 | 298.0 | 6.5 | 45 | 0.70 | 258.32 | 100 | 97.9 | 2.1 |
| C-10 | 295.0 | 12.3 | 25 | 0.37 | 255.12 | 100 | 96.0 | 4.0 |
| C-11 | 295.0 | 12.3 | 29 | 0.54 | 255.10 | 100 | 96.0 | 4.0 |
| C-12 | 295.0 | 12.3 | 33 | 0.69 | 255.12 | 100 | 96.0 | 4.0 |
| | | | | | | ND-CA[8] | Terephthalic acid | |
| C-13 | 300.0 | 3.7 | 39 | 0.38 | 240.81 | 90 / 10 | 98.8 | 1.2 |
| C-14 | 300.0 | 3.7 | 49 | 0.54 | 240.90 | 90 / 10 | 98.8 | 1.2 |
| C-15 | 300.0 | 3.7 | 53 | 0.70 | 240.92 | 90 / 10 | 98.8 | 1.2 |
| | | | | | | ND-CA[8] | 2,7-NDCA | |
| C-16 | 301.0 | 3.6 | 42 | 0.39 | 254.32 | 90 / 10 | 98.8 | 1.2 |
| C-17 | 301.0 | 3.6 | 51 | 0.55 | 254.27 | 90 / 10 | 98.8 | 1.2 |
| C-18 | 301.0 | 3.6 | 57 | 0.70 | 254.44 | 90 / 10 | 98.8 | 1.2 |
| | | | | | | NDCA[8] | | |
| C-19 | 300.0 | 3.6 | 37 | 0.38 | 259.38 | 100 | 98.8 | 1.2 |
| C-20 | 300.0 | 3.6 | 39 | 0.54 | 259.91 | 100 | 98.8 | 1.2 |
| C-21 | 300.0 | 3.6 | 47 | 0.69 | 259.35 | 100 | 98.8 | 1.2 |
| | | | | | | 2,6-NDCA[8] | | |
| CR-1 | 302.0 | 1.2 | 52 | 0.68 | 264.78 | 100 | 99.6 | 0.4 |
| CR-2 | 290.0 | 18.5 | 25 | Impossible to take out formed resin due to rapid gelation | | | | |
| CC-1 | 290.0 | 18.5 | 61 | 0.63 | 265.60 | 100 | 99.6 | 0.4 |

Note:
[1] Transesterification intermediate A prepared in C-1

TABLE C1-continued

Results of polycondensation reaction

| Intermediate A[1] (pt. wt.) | Intermediate B[2] (pt. wt.) | Poly-condensation reaction time (min) | Intrinsic viscosity (dl/g) | Melting point (°C.) | Dicarboxylic acid moiety | Hydroxy compound moiety | |
|---|---|---|---|---|---|---|---|
| | | | | | | Ethylene glycol | Glycerin |

[2]Transesterification intermediate B prepared in C-1
[3]Transesterification intermediate C prepared in C-13
[4]Transesterification intermediate D prepared in C-13
[5]Transesterification intermediate E prepared in C-16
[6]Transesterification intermediate F prepared in C-16
[7]Transesterification intermediate G prepared in C-19
[8]2,6-napthalenedicarboxylic acid

Examples C-2 and C-3

Modified PEN resin chips respectively having intrinsic viscosities of 0.54 and 0.70 dl/g were prepared in the same manner as in Example C-1, except that the polycondensation reaction time was varied.

The results of the polycondensation reactions, the measurements of intrinsic viscosity and melting point and the composition analysis of the modified PEN resin chips are given in Table C1, and the results of analysis for an infrared absorption spectrum are given in Table C2.

TABLE C2

Infrared absorption spectrum (Examples C-1 to C-12)

| | |
|---|---|
| Around 1720 cm$^{-1}$ | Stretching vibration of C=O in ester group |
| Around 1470 cm$^{-1}$ | Stretching vibration of C=C in naphthalene ring |
| 1180 cm$^{-1}$ to 1260 cm$^{-1}$ | In-plane deformation vibration of H in naphthalene ring |
| Around 760 cm$^{-1}$ | In-plane deformation vibration of CH$_2$ in methylenechain |

Example C-4

A modified PEN resin chip having an intrinsic viscosity of 0.38 dl/g was prepared in the same manner as in Example C-1, except that 301 parts of the transesterification intermediate A and 3.6 parts of the transesterification intermediate B prepared in Example C-1 were used and the polycondensation reaction time was 40 min.

The results of the polycondensation reaction, the measurements of intrinsic viscosity and melting point and the composition analysis of the modified PEN resin chip are given in Table C1, and the results of analysis for an infrared absorption spectrum are given in Table C2.

Examples C-5 and C-6

Modified PEN resin chips respectively having intrinsic viscosities of 0.54 and 0.69 dl/g were prepared in the same manner as in Example C-4, except that the polycondensation reaction time was varied.

The results of the polycondensation reactions, the measurements of intrinsic viscosity and melting point and the composition analysis of the modified PEN resin chips are given in Table C1, and the results of analysis for an infrared absorption spectrum are given in Table C2.

Example C-7

A modified PEN resin chip having an intrinsic viscosity of 0.37 dl/g was prepared in the same manner as in Example C-1, except that 298 parts of the transesterification intermediate A and 6.5 parts of the transesterification intermediate B prepared in Example C-1 were used and the polycondensation reaction time was 35 min.

The results of the polycondensation reaction, the measurements of intrinsic viscosity and melting point and the composition analysis of the modified PEN resin chip are given in Table C1, and the results of analysis for an infrared absorption spectrum are given in Table C2.

Examples C-8 and C-9

Modified PEN resin chips respectively having intrinsic viscosities of 0.53 and 0.70 dl/g were prepared in the same manner as in Example C-7, except that the polycondensation reaction time was varied.

The results of the polycondensation reactions, the measurements of intrinsic viscosity and melting point and the composition analysis of the modified PEN resin chips are given in Table C1, and the results of analysis for an infrared absorption spectrum are given in Table C2.

Example C-10

A modified PEN resin chip having an intrinsic viscosity of 0.37 dl/g was prepared in the same manner as in Example C-1, except that 295 parts of the transesterification intermediate A and 12.3 parts of the transesterification intermediate B prepared in Example C-1 were used and the polycondensation reaction time was 25 min.

The results of the polycondensation reaction, the measurements of intrinsic viscosity and melting point and the composition analysis of the modified PEN resin chip are given in Table C1, and the results of analysis for an infrared absorption spectrum are given in Table C2.

Examples C-11 and C-12

Modified PEN resin chips respectively having intrinsic viscosities of 0.54 and 0.63 dl/g were prepared in the same manner as in Example C-10, except that the polycondensation reaction time was varied.

The results of the polycondensation reactions, the measurements of intrinsic viscosity and melting point and the composition analysis of the modified PEN resin chips are given in Table C1, and the results of analysis for an infrared absorption spectrum are given in Table C2.

Example C-13

2196 parts of dimethyl-2,6-naphthalate, 194 parts of dimethyl terephthalate, and 1241.4 parts of ethylene glycol were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate, and 0.48 part of kaolin particles having an average particle diameter of 0.3 μm were added thereto at the time when the theoretical amount of methanol was distilled off to give a reaction product (transesterification intermediate C).

Separately, 2196 parts of dimethyl-2,6-naphthalate and 194 parts of dimethyl terephthalate and 184.2 parts of glycerin were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate and 0.48 part of kaolin particles having an average particle diameter of 0.3 μm were added thereto at the time when the theoretical amount of methanol was distilled off to give a reaction product (transesterification intermediate D).

300 parts of the transesterification intermediate C and 3.7 parts of the transesterification intermediate D thus obtained were transferred to a polymerization vessel and melted at 220° C. in a nitrogen atmosphere. Thereafter, over a period of about 60 min, the internal temperature was raised to 295° C., and the system was evacuated to a high vacuum of 0.8 mmHg. In this state, the polycondensation reaction was allowed to proceed for an additional 39 min, and the resultant polymer was delivered in a strand form with the aid of nitrogen gas pressure, washed with water and cut to prepare a modified PEN resin chip having an intrinsic viscosity of 0.44 dl/g.

The results of the polycondensation reactions, the measurements of intrinsic viscosity and melting point and the composition analysis of the modified PEN resin chips are given in Table C1.

Examples C-14 and C-15

Modified PEN resin chips respectively having intrinsic viscosities of 0.54 and 0.63 dl/g were prepared in the same manner as in Example C-13, except that the polycondensation reaction time was varied.

The results of the polycondensation reactions, the measurements of intrinsic viscosity and melting point and the composition analysis of the modified PEN resin chips are given in Table C1.

Example C-16

2196 parts of dimethyl-2,6-naphthalate, 244 parts of dimethyl-2,7-naphthalate, and 1241.4 parts of ethylene glycol were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate and 0.48 part of kaolin particles having an average particle diameter of 0.3 μm were added thereto at the time when the theoretical amount of methanol was distilled off to give a reaction product (transesterification intermediate E).

Separately, 2196 parts of dimethyl-2,6-naphthalate and 244 parts of dimethyl-2,7-naphthalate and 184.2 parts of glycerin were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate and 0.48 part of kaolin particles having an average particle diameter of 0.3 μm were added thereto at the time when the theoretical amount of methanol was distilled off to give a reaction product (transesterification intermediate F).

301 parts of the transesterification intermediate E and 3.6 parts of the transesterification intermediate F thus obtained were transferred to a polymerization vessel and melted at 220° C. in a nitrogen atmosphere. Thereafter, over a period of about 60 min, the internal temperature was raised to 295° C., and the system was evacuated to a high vacuum of 0.8 mmHg. In this state, the polycondensation reaction was allowed to proceed for an additional 42 min, and the resultant polymer was delivered in a strand form with the aid of nitrogen gas pressure, washed with water, and cut to prepare a modified PEN resin chip having an intrinsic viscosity of 0.43 dl/g.

The results of the polycondensation reactions, the measurements of intrinsic viscosity and melting point and the composition analysis of the modified PEN resin chips are given in Table C1.

Examples C-17 and C-18

Modified PEN resin chips respectively having intrinsic viscosities of 0.55 and 0.63 dl/g were prepared in the same manner as in Example C-16, except that the polycondensation reaction time was varied.

The results of the polycondensation reactions, the measurements of intrinsic viscosity and melting point and the composition analysis of the modified PEN resin chips are given in Table C1.

Example C-19

2440 parts of dimethyl-2,6-naphthalate and 1241.4 parts of ethylene glycol were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate, and 0.48 part of kaolin particles having an average particle diameter of 0.3 μm were added thereto at the time when the theoretical amount of methanol was distilled off to give a reaction product (transesterification intermediate A).

Separately, 2440 parts of dimethyl-2,6-naphthalate and 212 parts of 1,2-pentaerythritol were placed in a reaction vessel provided with a rectifying column. The contents of the reaction vessel were heated and dissolved, and 0.74 part of manganese(II) acetate tetrahydrate was added thereto. The mixture was heated and stirred in a nitrogen atmosphere at 190° to 230° C. with methanol formed by transesterification being removed outside the system. 0.58 part of antimony trioxide, 0.42 part of trimethyl phosphate and 0.48 art of kaolin particles having an average particle diameter of 0.3 μm were added thereto at the time when the theoretical amount of methanol was distilled off to give a reaction product (transesterification intermediate G).

300 parts of the transesterification intermediate A and 3.6 parts of the transesterification intermediate G thus obtained were transferred to a polymerization vessel and melted at 220° C. in a nitrogen atmosphere. Thereafter, over a period of about 60 min, the internal temperature was raised to 295° C., and the system was evacuated to a high vacuum of 0.8 mmHg. In this state, the polycondensation reaction was allowed to proceed for an additional 37 min, and the resultant polymer was delivered in a strand form with the aid of nitrogen gas pressure, washed with water and cut to prepare a modified PEN resin chip having an intrinsic viscosity of 0.43 dl/g.

The results of the polycondensation reactions, the measurements of intrinsic viscosity and melting point and the composition analysis of the modified PEN resin chips are given in Table C1.

Examples C-20 and C-21

Modified PEN resin chips respectively having intrinsic viscosities of 0.54 and 0.63 dl/g were prepared in the same manner as in Example C-19, except that the polycondensation reaction time was varied.

The results of the polycondensation reactions, the measurements of intrinsic viscosity and melting point and the composition analysis of the modified PEN resin chips are given in Table C1.

Example C-22

The modified PEN resin chip prepared in Example C-1 was dried by the conventional method and melt-extruded at 290° C. by means of an extruder to prepare unstretched films with varied thicknesses. The unstretched films were stretched at a temperature of 130° C. by 5 times in the longitudinal direction and by 1.1 times in the transverse direction and heat-treated at 210° C. for 30 sec to prepare stretched PEN films having thicknesses of 15 μm, 25 μm, and 75 μm.

The films thus obtained were evaluated, and the results are given in Table C3.

TABLE C3

Results of evaluation of modified PEN film (Examples C-22 to C-33)

| Ex. | IV[1] of resin as raw material | Glycerin moiety content[2] | Film thickness (μm) | Stretch ratio Longitudinal | Stretch ratio Transverse | Heat setting Temp. [°C.] | Heat setting Time [s] | Opening[3] property | Gas (oxygen) permeability[4] |
|---|---|---|---|---|---|---|---|---|---|
| 22 | 0.38 | 0.6 | 15 | 5.0 | 1.1 | 210 | 30 | ○ | 39.5 |
|  | 0.38 | 0.6 | 25 | 5.0 | 1.1 | 210 | 30 | ○ | 23.7 |
|  | 0.38 | 0.6 | 75 | 5.0 | 1.1 | 210 | 30 | ○ | 8.2 |
| 23 | 0.54 | 0.6 | 15 | 5.0 | 1.1 | 210 | 30 | ○ | 39.4 |
|  | 0.54 | 0.6 | 25 | 5.0 | 1.1 | 210 | 30 | ○ | 23.5 |
|  | 0.54 | 0.6 | 75 | 5.0 | 1.1 | 210 | 30 | ○ | 7.8 |
| 24 | 0.70 | 0.6 | 15 | 5.0 | 1.1 | 210 | 30 | ○ | 39.5 |
|  | 0.70 | 0.6 | 25 | 5.0 | 1.1 | 210 | 30 | ○ | 23.6 |
|  | 0.70 | 0.6 | 75 | 5.0 | 1.1 | 210 | 30 | ○ | 7.5 |
| 25 | 0.38 | 1.2 | 15 | 5.0 | 1.1 | 210 | 30 | ○ | 39.4 |
|  | 0.38 | 1.2 | 25 | 5.0 | 1.1 | 210 | 30 | ○ | 23.6 |
|  | 0.38 | 1.2 | 75 | 5.0 | 1.1 | 210 | 30 | ○ | 7.8 |
| 26 | 0.54 | 1.2 | 15 | 5.0 | 1.1 | 210 | 30 | ○ | 39.8 |
|  | 0.54 | 1.2 | 25 | 5.0 | 1.1 | 210 | 30 | ○ | 23.6 |
|  | 0.54 | 1.2 | 75 | 5.0 | 1.1 | 210 | 30 | ○ | 7.8 |
| 27 | 0.69 | 1.2 | 15 | 5.0 | 1.1 | 210 | 30 | ○ | 39.4 |
|  | 0.69 | 1.2 | 25 | 5.0 | 1.1 | 210 | 30 | ○ | 22.9 |
|  | 0.69 | 1.2 | 75 | 5.0 | 1.1 | 210 | 30 | ○ | 7.7 |
| 28 | 0.38 | 2.1 | 15 | 5.0 | 1.1 | 210 | 30 | ○ | 38.6 |
|  | 0.38 | 2.1 | 25 | 5.0 | 1.1 | 210 | 30 | ○ | 23.8 |
|  | 0.38 | 2.1 | 75 | 5.0 | 1.1 | 210 | 30 | ○ | 8.1 |
| 29 | 0.53 | 2.1 | 15 | 5.0 | 1.1 | 210 | 30 | ○ | 39.5 |
|  | 0.53 | 2.1 | 25 | 5.0 | 1.1 | 210 | 30 | ○ | 23.6 |
|  | 0.53 | 2.1 | 75 | 5.0 | 1.1 | 210 | 30 | ○ | 7.7 |
| 30 | 0.70 | 2.1 | 15 | 5.0 | 1.1 | 210 | 30 | ○ | 39.4 |
|  | 0.70 | 2.1 | 25 | 5.0 | 1.1 | 210 | 30 | ○ | 23.5 |
|  | 0.70 | 2.1 | 75 | 5.0 | 1.1 | 210 | 30 | ○ | 7.5 |
| 31 | 0.38 | 4.0 | 15 | 5.0 | 1.1 | 210 | 30 | ○ | 39.6 |
|  | 0.38 | 4.0 | 25 | 5.0 | 1.1 | 210 | 30 | ○ | 24.1 |
|  | 0.38 | 4.0 | 75 | 5.0 | 1.1 | 210 | 30 | ○ | 7.9 |
| 32 | 0.54 | 4.0 | 15 | 5.0 | 1.1 | 210 | 30 | ○ | 39.5 |
|  | 0.54 | 4.0 | 25 | 5.0 | 1.1 | 210 | 30 | ○ | 23.9 |
|  | 0.54 | 4.0 | 75 | 5.0 | 1.1 | 210 | 30 | ○ | 7.9 |
| 33 | 0.69 | 4.0 | 15 | 5.0 | 1.1 | 210 | 30 | ○ | 39.4 |
|  | 0.69 | 4.0 | 25 | 5.0 | 1.1 | 210 | 30 | ○ | 23.7 |
|  | 0.69 | 4.0 | 75 | 5.0 | 1.1 | 210 | 30 | ○ | 7.8 |

Note:
[1] Intrinsic viscosity of resin as raw material used in the formation of film (dl/g)

TABLE C3-continued

Results of evaluation of modified PEN film (Examples C-22 to C-33)

| Ex. | IV[1]) of resin as raw material | Glycerin moiety content[2]) | Film thickness (μm) | Stretch ratio | | Heat setting | | Opening[3]) property | Gas (oxygen) permeability[4]) |
|---|---|---|---|---|---|---|---|---|---|
| | | | | Long-itudinal | Trans-verse | Temp. [°C.] | Time [s] | | |

[2])Glycerin content of hydroxy compound moeity (mol. %)
[3])o: comparable to paper, Δ: slightly inferior to paper, X: inferior to paper
[4])Gas (oxygen) permeability (ml/m² · 24 hr · atm)

Examples C-23 to C-42

Various stretched, modified PEN resin films were prepared in the same manner as in Example C-22, except that the modified PEN resin chips prepared in Examples C-2 to C-22 were used.

The stretched, modified PEN resin films were evaluated, and the results are given in Table C3.

Examples C-43 to C-47

The procedure was repeated, except that the modified PEN resin chip prepared in Example C-8 was used and the stretch ratio and the heat-setting conditions were varied, thereby preparing modified PEN resin films.

The stretched, modified PEN resin films were evaluated, and the results are given in Table C4.

TABLE C4

Results of evaluation of modified PEN films different in stretching and heat setting conditions (Examples C-34 to C-47)

| Ex. | IV[1]) of resin as raw material | Glycerin moiety content[2]) | Film thickness (μm) | Stretch ratio | | Heat setting | | Opening[3]) property | Gas (oxygen) permeability[4]) |
|---|---|---|---|---|---|---|---|---|---|
| | | | | Longitudinal | Transverse | Temp. [°C.] | Time [s] | | |
| 34 | 0.38 | 1.2 | 15 | 5.0 | 1.1 | 210 | 30 | o | 39.7 |
| | 0.38 | 1.2 | 25 | 5.0 | 1.1 | 210 | 30 | o | 24.2 |
| | 0.38 | 1.2 | 75 | 5.0 | 1.1 | 210 | 30 | o | 8.1 |
| 35 | 0.54 | 1.2 | 15 | 5.0 | 1.1 | 210 | 30 | o | 39.7 |
| | 0.54 | 1.2 | 25 | 5.0 | 1.1 | 210 | 30 | o | 24.3 |
| | 0.54 | 1.2 | 75 | 5.0 | 1.1 | 210 | 30 | o | 8.0 |
| 36 | 0.70 | 1.2 | 15 | 5.0 | 1.1 | 210 | 30 | o | 39.6 |
| | 0.70 | 1.2 | 25 | 5.0 | 1.1 | 210 | 30 | o | 23.7 |
| | 0.70 | 1.2 | 75 | 5.0 | 1.1 | 210 | 30 | o | 7.8 |
| 37 | 0.37 | 1.2 | 15 | 5.0 | 1.1 | 210 | 30 | o | 39.7 |
| | 0.37 | 1.2 | 25 | 5.0 | 1.1 | 210 | 30 | o | 24.1 |
| | 0.37 | 1.2 | 75 | 5.0 | 1.1 | 210 | 30 | o | 8.1 |
| 38 | 0.55 | 1.2 | 15 | 5.0 | 1.1 | 210 | 30 | o | 39.7 |
| | 0.55 | 1.2 | 25 | 5.0 | 1.1 | 210 | 30 | o | 24.1 |
| | 0.55 | 1.2 | 75 | 5.0 | 1.1 | 210 | 30 | o | 8.0 |
| 39 | 0.69 | 1.2 | 15 | 5.0 | 1.1 | 210 | 30 | o | 39.7 |
| | 0.69 | 1.2 | 25 | 5.0 | 1.1 | 210 | 30 | o | 23.7 |
| | 0.69 | 1.2 | 75 | 5.0 | 1.1 | 210 | 30 | o | 7.7 |
| 40 | 0.38 | 1.2 | 15 | 5.0 | 1.1 | 210 | 30 | o | 39.7 |
| | 0.38 | 1.2 | 25 | 5.0 | 1.1 | 210 | 30 | o | 23.6 |
| | 0.38 | 1.2 | 75 | 5.0 | 1.1 | 210 | 30 | o | 7.8 |
| 41 | 0.54 | 1.2 | 15 | 5.0 | 1.1 | 210 | 30 | o | 39.3 |
| | 0.54 | 1.2 | 25 | 5.0 | 1.1 | 210 | 30 | o | 23.6 |
| | 0.54 | 1.2 | 75 | 5.0 | 1.1 | 210 | 30 | o | 7.8 |
| 42 | 0.69 | 1.2 | 15 | 5.0 | 1.1 | 210 | 30 | o | 39.4 |
| | 0.69 | 1.2 | 25 | 5.0 | 1.1 | 210 | 30 | o | 22.9 |
| | 0.69 | 1.2 | 75 | 5.0 | 1.1 | 210 | 30 | o | 7.7 |
| 43 | 0.53 | 2.1 | 15 | 3.0 | 1.0 | 210 | 30 | o | 40.0 |
| | 0.53 | 2.1 | 25 | 3.0 | 1.0 | 210 | 30 | o | 24.0 |
| | 0.53 | 2.1 | 75 | 3.0 | 1.1 | 210 | 30 | o | 8.1 |
| 44 | 0.53 | 2.1 | 15 | 1.5 | 1.5 | 210 | 30 | o | 40.0 |
| | 0.53 | 2.1 | 25 | 1.5 | 1.5 | 210 | 30 | o | 24.0 |
| | 0.53 | 2.1 | 75 | 1.5 | 1.5 | 210 | 30 | o | 8.1 |
| 45 | 0.53 | 2.1 | 15 | Stretching not done | | 210 | 30 | o | 40.2 |
| | 0.53 | 2.1 | 25 | 1.5 | 1.5 | 210 | 30 | o | 24.3 |
| | 0.53 | 2.1 | 75 | 1.5 | 1.5 | 210 | 30 | o | 8.3 |
| 46 | 0.53 | 2.1 | 15 | 5.0 | 1.1 | 210 | 30 | o | 39.9 |
| | 0.53 | 2.1 | 25 | 5.0 | 1.1 | 210 | 30 | o | 23.8 |
| | 0.53 | 2.1 | 75 | 5.0 | 1.1 | 210 | 30 | o | 8.1 |
| 47 | 0.53 | 2.1 | 15 | 5.0 | 1.1 | Heat setting not done | | o | 40.3 |
| | 0.53 | 2.1 | 25 | 5.0 | 1.1 | 210 | 30 | o | 24.3 |

TABLE C4-continued

Results of evaluation of modified PEN films different in
stretching and heat setting conditions (Examples C-34 to C-47)

| Ex. | IV[1] of resin as raw material | Glycerin moiety content[2] | Film thickness (μm) | Stretch ratio Longitudinal | Transverse | Heat setting Temp. [°C.] | Time [s] | Opening[3] property | Gas (oxygen) permeability[4] |
|---|---|---|---|---|---|---|---|---|---|
| | 0.53 | 2.1 | 75 | 5.0 | 1.1 | 210 | 30 | ○ | 8.3 |

Note:
[1] Intrinsic viscosity of resin as raw material used in the formation of film (dl/g)
[2] Glycerin content of hydroxy compound moiety (mol. %), except that the value in Ex. Nos. 40 to 42 is the pentaerythritol content (mol. %)
[3] ○: comparable to paper, Δ: slightly inferior to paper, X: inferior to paper
[4] Gas (oxygen) permeability (ml/m² · 24 hr · atm)

Reference Example CR-1

A modified PEN resin chip having an intrinsic viscosity of 0.68 dl/g was prepared in the same manner as in Example C-1, except that 302 parts of the transesterification intermediate A and 1.2 parts of the transesterification intermediate B prepared in Example C-1 were used and the polycondensation reaction time was 52 min.

The results of the polycondensation reaction, the measurements of intrinsic viscosity and melting point and the composition analysis of the modified PEN resin chip are given in Table C1.

Reference Example CR-2

The procedure of Example C-1 was repeated, except that 290 parts of the transesterification intermediate A and 18.5 parts of the transesterification intermediate B prepared in Reference Example CR-1 were used. Gelation occurred when 25 min had elapsed since the polycondensation reaction was initiated, so that the resultant resin could not be taken out.

The results of the polycondensation reaction are given in Table C1.

Reference Example CR-3

A stretched, modified PEN resin film was prepared in the same manner as in Example C-22, except that the modified PEN resin chip prepared in Reference Example CR-1 was used.

The stretched, modified PEN resin film was evaluated, and the results are given in Table C5.

TABLE C5

Results of evaluation of stretched modified PEN film (Reference Example CR-3)

| Ref. Ex. | IV[1] of resin as raw material | Glycerin moiety content[2] | Film thickness (μm) | Stretch ratio Longitudinal | Transverse | Heat setting Temp. [°C.] | Time [s] | Opening[3] property | Gas (oxygen) permeability[4] |
|---|---|---|---|---|---|---|---|---|---|
| 3 | 0.68 | 0.4 | 15 | 5.0 | 1.1 | 210 | 30 | X | 39.4 |
| | 0.68 | 0.4 | 25 | 5.0 | 1.1 | 210 | 30 | X | 22.9 |
| | 0.68 | 0.4 | 75 | 5.0 | 1.1 | 210 | 30 | X | 7.9 |

Note:
[1] Intrinsic viscosity of resin as raw material used in the formation of film (dl/g)
[2] Glycerin content of hydroxy compound moiety (mol. %)
[3] ○: comparable to paper, Δ: slightly inferior to paper, X: inferior to paper
[4] Gas (oxygen) permeability (ml/m² · 24 hr · atm)

TABLE C6

Results of evaluation of stretched modified PEN film (Comparative Example CC-2)

| Comp. Ex. | IV[1] of resin as raw material | Glycerin moiety content[2] | Film thickness (μm) | Stretch ratio Longitudinal | Transverse | Heat setting Temp. [°C.] | Time [s] | Opening[3] property | Gas (oxygen) permeability[4] |
|---|---|---|---|---|---|---|---|---|---|
| 2 | 0.63 | 0 | 15 | 5.0 | 1.1 | 210 | 30 | X | 39.2 |
| | 0.63 | 0 | 25 | 5.0 | 1.1 | 210 | 30 | X | 28.5 |
| | 0.63 | 0 | 75 | 5.0 | 1.1 | 210 | 30 | X | 7.5 |

TABLE C6-continued

Results of evaluation of stretched modified PEN film (Comparative Example CC-2)

| Comp. Ex. | IV[1]) of resin as raw material | Glycerin moiety content[2]) | Film thickness (μm) | Stretch ratio | | Heat setting | | Opening[3]) property | Gas (oxygen) permeability[4]) |
|---|---|---|---|---|---|---|---|---|---|
| | | | | Longitudinal | Transverse | Temp. [°C.] | Time [s] | | |

Note:
[1])Intrinsic viscosity of resin as raw material used in the formation of film (dl/g)
[2])Glycerin content of hydroxy compound moiety (mol. %)
[3])○: comparable to paper, Δ: slightly inferior to paper, X: inferior to paper
[4])Gas (oxygen) permeability (ml/m$^2$ · 24 hr · atm)

Comparative Example CC-1

A PEN resin chip respectively having intrinsic viscosities of 0.54 dl/g and 0.63 dl/g were prepared in the same manner as in Example C-1, except that the transesterification intermediate A was transferred to a polymerization vessel and the polycondensation reaction time was varied. The results of the polycondensation reaction, the measurements of intrinsic viscosity and melting point and the composition analysis of the modified PEN resin chip are given in Table C1.

Comparative Example CC-2

A stretched PEN resin film was prepared in the same manner as in Example C-22, except that the PEN resin chip prepared in Comparative Example CC-1 was used.

The stretched, modified PEN resin film was evaluated, and the results are given in Table C6.

Example C-48

A polyester thermoplastic adhesive was coated by gravure coating at a coverage of 8 g/m$^2$ on a 15 μm-thick film prepared as described in Example C-22. The coated film was then used to heat-seal at 160° C. for 1 sec a vacuum-formed product (a blister) of vinyl chloride into which a medicinal tablet had been packed, thereby preparing a PTP (press-through pack). The results of evaluation of the packaging material for a press-through pack are given in Table C7. The packaging material for a press-through pack had excellent press-through property, combustibility, and transparency.

Examples C-49 to C-52

The procedure of Example C-48 was repeated, except that 15 μm-thick films prepared as described in Examples C-24, C-31, C-33, and C-38 were used. The conditions for the preparation of the packaging materials for a press-through pack are specified in Table C7, and the results of evaluation of the packaging materials for a press-through pack are given in Table C8.

Examples C-53 to C-55

The procedure of Example C-48 was repeated, except that the film thickness was varied. The conditions for the preparation of the packaging materials for a press-through pack are specified in Table C7, and the results of evaluation of the packaging materials for a press-through pack are given in Table C8.

Examples C-56 and C-57

The procedure of Example C-48 was repeated, except that the stretch ratio of the film was varied. The conditions for the preparation of the packaging materials for a press-through pack are specified in Table C7, and the results of evaluation of the packaging materials for a press-through pack are given in Table C8.

Examples C-58 to C-61

The procedure of Example C-48 was repeated, except that the heat-setting conditions were varied. The conditions for the preparation of the packaging materials for a press-through pack are specified in Table C7, and the results of evaluation of the packaging materials for a press-through pack are given in Table C8.

Examples C-62 to C-65

The procedure of Example C-48 was repeated, except that the material for a vacuum-formed product of the resin in the packaging material for a press-through pack was varied. The conditions for the preparation of the packaging materials for a press-through pack are specified in Table C7, and the results of evaluation of the packaging materials for a press-through pack are given in Table C8.

Example C-66

The procedure of Example C-48 was repeated, except that, in Example C-22, an inflation extruder having a width of ø50 mm was used as the extruder with the die temperature being 290° C. and no stretching treatment was carried out. The conditions for the preparation of the packaging material for a press-through pack are specified in Table C7, and the results of evaluation of the packaging material for a press-through pack are given in Table C8.

Examples C-67 to C-71

The procedure of Example C-65 was repeated, except that the blow ratio and the stretch ratio in the take-up direction were 1.5 to 2.5 times. The conditions for the preparation of the packaging materials for a press-through pack are specified in Table C7, and the results of evaluation of the packaging materials for a press-through pack are given in Table C8.

Reference Example CR-4

The procedure of Example C-48 was repeated, except that the 15 μm-thick film prepared in Reference Example CR-2 was used. The conditions for the preparation of the packaging material for a press-through pack are specified in Table C7, and the results of evaluation of the packaging materials for a press-through pack are given in Table C8.

Reference Example CR-5

The procedure of Example C-48 was repeated, except that the film thickness was varied. The conditions for the preparation of the packaging material for a press-through pack are specified in Table C7, and the results of evaluation of the packaging materials for a press-through pack are given in Table C8.

Examples CR-6

The procedure of Example C-48 was repeated, except that in Example C-22 the stretch ratio of the film was varied. The conditions for the preparation of the packaging materials for a press-through pack are specified in Table C7, and the results of evaluation of the packaging materials for a press-through pack are given in Table C8.

Example CR-7

The procedure of Example C-48 was repeated, except that in Example C-22 the heat setting was not carried out. The conditions for the preparation of the packaging material for a press-through pack are specified in Table C7, and the results of evaluation of the packaging materials for a press-through pack are given in Table C8.

Example CR-8

The procedure of Example C-48 was repeated, except that in Example C-22 the heat-setting conditions were varied. The conditions for the preparation of the packaging material for a press-through pack are specified in Table C7, and the results of evaluation of the packaging materials for a press-through pack are given in Table C8.

Comparative Examples CC-3 to CC-6

The procedure of Example C-44 was repeated, except that the cover material for the packaging material for a press-through pack was varied. The stretching conditions for PP and PET were those suitable for the respective materials. The conditions for the preparation of the packaging material for a press-through pack are specified in Table C7, and the results of evaluation of the packaging materials for a press-through pack are given in Table C8.

TABLE C7

Conditions for preparation of packaging material for press-through pack

| | | Stretch-ing temp. [°C.] | Stretch ratio | | Heat setting | | |
|---|---|---|---|---|---|---|---|
| | Thickness [μm] | | Longitudinal | Transverse | Temp. [°C.] | Time [s] | Vacuum forming |
| C-48 | 15 | | The same as C-22 | | 210 | 30 | Vinyl chloride |
| C-49 | 15 | | The same as C-24 | | 210 | 30 | Vinyl chloride |
| C-50 | 15 | | The same as C-31 | | 210 | 30 | Vinyl chloride |
| C-51 | 15 | | The same as C-33 | | 210 | 30 | Vinyl chloride |
| C-52 | 15 | | The same as C-38 | | 210 | 30 | Vinyl chloride |
| C-53 | 10 | | The same as C-48 | | 210 | 30 | Vinyl chloride |
| C-54 | 30 | | The same as C-48 | | 210 | 30 | Vinyl chloride |
| C-55 | 45 | | The same as C-48 | | 210 | 30 | vinyl chloride |
| C-56 | 15 | 130 | 3.8 | 1.0 | 210 | 30 | Vinyl chloride |
| C-57 | 15 | 130 | 5.3 | 1.1 | 210 | 30 | Vinyl chloride |
| C-58 | 15 | | The same as C-48 | | 180 | 30 | Vinyl chloride |
| C-59 | 15 | | The same as C-48 | | 240 | 30 | vinyl chloride |
| C-60 | 15 | | The same as C-48 | | 210 | 5 | Vinyl chloride |
| C-61 | 15 | | The same as C-48 | | 210 | 30 min | Vinyl chloride |
| C-62 | 15 | | The same as C-48 | | 210 | 30 | PEN |
| C-63 | 15 | | The same as C-48 | | 210 | 30 | PET |
| C-64 | 15 | | The same as C-48 | | 210 | 30 | PP |
| C-65 | 15 | | The same as C-48 | | 210 | 30 | COC |
| C-66 | 15 | — | — | — | 210 | 30 | Vinyl chloride |
| C-67 | 15 | 260 | 1.0 | 1.5 | 210 | 30 | Vinyl chloride |
| C-68 | 15 | 260 | 1.0 | 2.5 | 210 | 30 | Vinyl chloride |
| C-69 | 15 | 260 | 1.5 | 1.5 | 210 | 30 | Vinyl chloride |
| C-70 | 15 | 260 | 1.5 | 2.5 | 210 | 30 | Vinyl chloride |
| C-71 | 15 | 260 | 2.5 | 2.5 | 210 | 30 | Vinyl chloride |
| CR-4 | 15 | | The same as CR-2 | | 210 | 30 | Vinyl chloride |
| CR-5 | 200 | | The same as C-22 | | 210 | 30 | Vinyl chloride |
| CR-6 | 15 | 130 | 3.5 | 3.5 | 210 | 30 | Vinyl chloride |
| CR-7 | 15 | | The same as C-22 | | — | — | Vinyl chloride |
| CR-8 | 15 | | The same as C-22 | | 160 | 30 | Vinyl chloride |
| CC-3 | Glassine paper 15 | — | — | | — | — | Vinyl chloride |
| CC-4 | Aluminum foil 20 | — | — | | — | — | Vinyl chloride |
| CC-5 | PET 15 | 100 | 4.8 | 1.0 | 180 | 30 | Vinyl chloride |
| CC-6 | PP 15 | 150 | 5.2 | 1.0 | 170 | 30 | Vinyl chloride |

TABLE C8

Results of evaluation of packaging material for press-through pack

| | Press-through property[1] | Combustibility[2] | Transparency[3] | Press-through of film | |
|---|---|---|---|---|---|
| | | | | Strength [kgf] | Elongation [mm] |
| C-48 | ○ | ○ | ○ | 1.3 | 2 |
| C-49 | ○ | ○ | ○ | 1.3 | 2 |
| C-50 | ○ | ○ | ○ | 1.3 | 2 |
| C-51 | ○ | ○ | ○ | 1.3 | 2 |
| C-52 | ○ | ○ | ○ | 1.3 | 2 |
| C-53 | ○ | ○ | ○ | 1.1 | 2 |
| C-54 | ○ | ○ | ○ | 1.5 | 2 |
| C-55 | ○ | ○ | ○ | 1.7 | 3 |
| C-56 | ○ | ○ | ○ | 1.4 | 2 |
| C-57 | ○ | ○ | ○ | 1.4 | 2 |
| C-58 | ○ | ○ | ○ | 1.3 | 2 |
| C-59 | ○ | ○ | ○ | 1.3 | 2 |
| C-60 | ○ | ○ | ○ | 1.3 | 2 |
| C-61 | ○ | ○ | ○ | 1.3 | 2 |
| C-62 | ○ | ○ | ○ | 1.3 | 2 |
| C-63 | ○ | ○ | ○ | 1.3 | 2 |
| C-64 | ○ | ○ | ○ | 1.3 | 2 |
| C-65 | ○ | ○ | ○ | 1.3 | 2 |
| C-66 | ○ | ○ | ○ | 1.3 | 2 |
| C-67 | ○ | ○ | ○ | 1.3 | 2 |
| C-68 | ○ | ○ | ○ | 1.3 | 2 |
| C-69 | ○ | ○ | ○ | 1.4 | 2 |
| C-70 | ○ | ○ | ○ | 1.4 | 2 |
| C-71 | ○ | ○ | ○ | 1.6 | 3 |
| CR-4 | ○ | ○ | ○ | 2.3 | 17 |
| CR-5 | ○ | ○ | ○ | 7.9 | 27 |
| CR-6 | ○ | ○ | ○ | 3.0 | 33 |
| CR-7 | ○ | ○ | ○ | 1.4 | 40 |
| CR-8 | ○ | ○ | ○ | 1.4 | 23 |
| CC-3 | ○ | ○ | X | 1.9 | 2 |
| CC-4 | ○ | X | X | 1.5 | 2 |
| CC-5 | X | ○ | ○ | 4.2 | 21 |
| CC-6 | X | ○ | ○ | 3.7 | 20 |

[1] Press-through property
○ : easy to take out tablet, X: difficult to take out tablet
[2] Combustibility
○ : no residue, X: entirely remained unburnt
[3] Transparency
○ : transparent, X: opaque

Examples C-72 to C-74

Unstretched films were prepared in the same manner as in Example C-48, except that in the molding of the PEN film, polypropylene (PP) or polyethylene (PE) or nylon (Ny) was co-extruded. Packaging materials for PTP were prepared in the same manner as in Example C-48, except that the above unstretched films were used. Thereafter, the PP or PE or Ny layer was removed, and the packaging materials were then evaluated in the same manner as in Example C-48.

The constructions of the packaging materials before the removal of the PP or PE or Ny layer are shown in Table C9, the conditions for the preparation of the packaging materials for PTP are specified in Table C10, and the results of evaluation of the packaging materials for PTP after the removal of the PP or PE or Ny layer are given in Table C11.

Examples C-75 to C-77

Unstretched films were prepared in the same manner as in Example C-66, except that in the molding of the PEN film, polypropylene (PP) or polyethylene (PE) or nylon (Ny) was co-extruded. Packaging materials for PTP were prepared in the same manner as in Example C-66, except that the above unstretched films were used. Thereafter, the PP or PE or Ny layer was removed, and the packaging materials were then evaluated in the same manner as in Example C-66.

The constructions of the packaging materials before the removal of the PP or PE or Ny layer are shown in Table C9, the conditions for the preparation of the packaging materials for PTP are specified in C10, and the results of evaluation of the packaging materials for PTP after the removal of the PP or PE or Ny layer are given in Table C5.

TABLE C9

Construction before removing olefin layer and film forming method

| | Construction | Film formation |
|---|---|---|
| C-72 | PEN(15)/PP(15) | T-die co-extrusion |
| C-73 | PEN(15)/PE(15) | T-die co-extrusion |
| C-74 | PEN(15)/Ny(15) | T-die co-extrusion |
| C-75 | PEN(15)/PP(15) | Inflation co-extrusion |
| C-76 | PEN(15)/PE(15) | Inflation co-extrusion |
| C-77 | PEN(15)/Ny(15) | Inflation co-extrusion |

TABLE C10

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-72 | 15 | The same as C-48 | | | 210 | 30 | Vinyl chloride |
| C-73 | 15 | The same as C-48 | | | 210 | 30 | Vinyl chloride |
| C-74 | 15 | The same as C-48 | | | 210 | 30 | Vinyl chloride |
| C-75 | 15 | The same as C-66 | | | 210 | 30 | Vinyl chloride |
| C-76 | 15 | The same as C-66 | | | 210 | 30 | Vinyl chloride |
| C-77 | 15 | The same as C-66 | | | 210 | 30 | Vinyl chloride |

TABLE C11

Results of evaluation of packaging material for press-through pack

| | Press-through property | Combustibility | Transparency | Press-through of film | |
|---|---|---|---|---|---|
| | | | | Strength [kgf] | Elongation [mm] |
| C-72 | ○ | ○ | ○ | 1.3 | 2 |
| C-73 | ○ | ○ | ○ | 1.3 | 2 |
| C-74 | ○ | ○ | ○ | 1.3 | 2 |
| C-75 | ○ | ○ | ○ | 1.3 | 2 |
| C-76 | ○ | ○ | ○ | 1.3 | 2 |
| C-77 | ○ | ○ | ○ | 1.3 | 2 |

Examples C-78 to C-89

In Examples C-78 to C-89, the procedure of Example C-48 or Example C-66 was repeated, except that a water-vapor barrier resin was laminated to the polyethylene-2,6-naphthalate film and vinyl chloride (PVC) to be vacuum-formed was coated with vinylidene chloride (PVDC). The lamination was carried out by extrusion coating (EC, heat lamination) for Examples C-78 to C-80, T-die co-extrusion for Examples C-81 to C-83, inflation co-extrusion for Examples C-84 to B-86, coating for Example C-87, and vapor deposition for Examples C-88 and C-89. The constructions and the water vapor permeability of the PEN films with water vapor barrier resins being laminated thereto are given in Table C12. The conditions for the preparation of the packaging materials for PTP are specified in Table C13, and the results of evaluation of the packaging materials for PTP are given in Table C14. The PTP's using the packaging materials prepared in Examples C-78 to C-89 and the PTP using the packaging material prepared in Example C-48 were allowed to stand in an atmosphere kept at 25° C. and 90%RH for 30 days. As a result, it was found that no moisture absorption occurred for the PTP's using the packaging materials prepared in Examples C-78 to C-89, whereas moisture absorption occurred for the PTP using the packaging material prepared in Example C-48.

TABLE C12

Construction of PEN film with water vapor barrier resin being laminated thereto and water vapor permeability

| | Construction | Water vapor permeability [g/m² · 24 hr] | Laminating method |
|---|---|---|---|
| C-78 | PEN(15)/AD(2)/PE(13) | 30 | EC |
| C-79 | PEN(15)/AD(2)/PP(13) | 20 | EC |
| C-80 | PEN(15)/AD(2)/COC(13) | 12 | EC |
| C-81 | PEN(15)/AD(2)/PE(13) | 30 | T-die co-extrusion |
| C-82 | PEN(15)/AD(2)/PP(13) | 20 | T-die co-extrusion |
| C-83 | PEN(15)/AD(2)/COC(13) | 12 | T-die co-extrusion |
| C-84 | PEN(15)/AD(2)/PE(13) | 30 | Inflation co-extrusion |
| C-85 | PEN(15)/AD(2)/PP(13) | 20 | Inflation co-extrusion |
| C-86 | PEN(15)/AD(2)/COC(13) | 12 | Inflation co-extrusion |
| C-87 | PEN(15)/PVDC(5) | 5 | Coating |
| C-88 | PEN(15)/SiO$_x$(200A) | Not more than 0.5 | Vapor deposition |
| C-89 | PEN(15)/A1203(155A) | 3 | Vapor deposition |

TABLE C13

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-78 | 30 | The same as C-48 | | | 210 | 30 | Vinyl chloride |
| C-79 | 30 | The same as C-48 | | | 210 | 30 | Vinyl chloride |
| C-80 | 30 | The same as C-48 | | | 210 | 30 | Vinyl chloride |
| C-81 | 30 | The same as C-48 | | | 210 | 30 | Vinyl chloride |
| C-82 | 30 | The same as C-48 | | | 210 | 30 | Vinyl chloride |
| C-83 | 30 | The same as C-48 | | | 210 | 30 | Vinyl chloride |
| C-84 | 30 | The same as C-66 | | | 210 | 30 | Vinyl chloride |
| C-85 | 30 | The same as C-66 | | | 210 | 30 | Vinyl chloride |
| C-86 | 30 | The same as C-66 | | | 210 | 30 | Vinyl chloride |
| C-87 | 20 | The same as C-66 | | | 210 | 30 | Vinyl chloride |
| C-88 | 15 | The same as C-66 | | | 210 | 30 | Vinyl chloride |
| C-89 | 15 | The same as C-66 | | | 210 | 30 | Vinyl chloride |

TABLE C14

Results of evaluation of packaging material for press-through pack

| | Press-through property | Combustibility | Transparency | Press-through of film Strength [kgf] | Press-through of film Elongation [mm] |
|---|---|---|---|---|---|
| C-78 | ◯ | ◯ | ◯ | 1.4 | 3 |
| C-79 | ◯ | ◯ | ◯ | 1.4 | 3 |
| C-80 | ◯ | ◯ | ◯ | 1.4 | 3 |
| C-81 | ◯ | ◯ | ◯ | 1.4 | 3 |
| C-82 | ◯ | ◯ | ◯ | 1.4 | 3 |
| C-83 | ◯ | ◯ | ◯ | 1.4 | 3 |
| C-84 | ◯ | ◯ | ◯ | 1.4 | 3 |
| C-85 | ◯ | ◯ | ◯ | 1.4 | 3 |
| C-86 | ◯ | ◯ | ◯ | 1.4 | 3 |
| C-87 | ◯ | ◯ | ◯ | 1.3 | 3 |
| C-88 | ◯ | ◯ | ◯ | 1.3 | 2 |
| C-89 | ◯ | ◯ | ◯ | 1.3 | 2 |

Examples C-90 to C-96

In Examples C-90 to C-96, the procedure of Example C-48 or Example C-66 was repeated, except that an oxygen barrier resin was laminated to the polyethylene-2,6-naphthalate film, vinyl chloride (PVC) to be vacuum-formed was coated with vinylidene chloride (PVDC), and the contents of the pack were solid fats and oils. The lamination was carried out by T-die co-extrusion for Examples C-90 and C-91, inflation co-extrusion for Examples C-92 and C-93, coating for Example C-94, and vapor deposition for Examples C-95 and C-96. The constructions and the oxygen permeability of the PEN films with oxygen barrier resins being laminated thereto are given in Table C15. The conditions for the preparation of the packaging materials for PTP are specified in Table C16, and the results of evaluation of the packaging materials for PTP are given in Table C17. The PTP's using the packaging materials prepared in Examples C-90 to C-96 and the PTP using the packaging material prepared in Example C-48 were allowed to stand in an atmosphere kept at 25° C. and 50%RH for 30 days. As a result, it was found that the contents of the PTP's using the packaging materials prepared in Examples C-90 to C-96 were not oxidized, whereas the contents of the PTP using the packaging material prepared in Example C-48 were oxidized.

TABLE C15

Construction and oxygen permeability of PEN film with oxygen barrier resin being laminated thereto

| | Construction | Water vapor permeability [g/m² · 24 hr] | Laminating method |
|---|---|---|---|
| C-90 | PEN(15)/AD(2)/PVA(13) | 4 | T-die co-extrusion |
| C-91 | PEN(10)/AD(2)/EVOH(5)/AD(2)/PEN(10) | 10 | T-die co-extrusion |
| C-92 | PEN(15)/AD(2)/PVA(13) | 4 | Inflation co-extrusion |
| C-93 | PEN(10)/AD(2)/EVOH(5)/AD(2)/PEN(10) | 10 | Inflation co-extrusion |
| C-94 | PEN(15)/PVDC(5) | 5 | Coating |
| C-95 | PEN(15)/SiO$_x$(200A) | Not more than 0.5 | Vapor deposition |
| C-96 | PEN(15)/Al$_2$O$_3$(1500A) | 3 | Vapor deposition |

TABLE C16

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-90 | 30 | The same as C-48 | | | 210 | 4 | Vinyl chloride |
| C-91 | 29 | The same as C-48 | | | 210 | 4 | Vinyl chloride |
| C-92 | 30 | The same as C-66 | | | 210 | 4 | Vinyl chloride |
| C-93 | 29 | The same as C-66 | | | 210 | 4 | Vinyl chloride |
| C-94 | 20 | The same as C-66 | | | 210 | 4 | Vinyl chloride |
| C-95 | 15 | The same as C-66 | | | 210 | 4 | Vinyl chloride |
| C-96 | 15 | The same as C-66 | | | 210 | 4 | Vinyl chloride |

TABLE C17

Results of evaluation of packaging material for press-through pack

| | Press-through property | Combustibility | Transparency | Press-through of film Strength [kgf] | Press-through of film Elongation [mm] |
|---|---|---|---|---|---|
| C-90 | ○ | ○ | ○ | 1.4 | 3 |
| C-91 | ○ | ○ | ○ | 1.5 | 3 |
| C-92 | ○ | ○ | ○ | 1.4 | 3 |
| C-93 | ○ | ○ | ○ | 1.5 | 3 |
| C-94 | ○ | ○ | ○ | 1.3 | 3 |
| C-95 | ○ | ○ | ○ | 1.3 | 2 |
| C-96 | ○ | ○ | ○ | 1.3 | 2 |

Examples C-97 to C-102

In Examples C-97 to C-102, the procedure of Example C-48 or Example C-66 was repeated, except that a water-vapor barrier resin and an oxygen barrier resin were laminated to the polyethylene-2,6-naphthalate film and vinyl chloride (PVC) to be vacuum-formed was coated with vinylidene chloride (PVDC). The lamination was carried out by T-die co-extrusion for Examples C-97 to C-99 and inflation co-extrusion for Examples C-100 and C-102. The constructions, the water vapor permeability and the oxygen permeability of the PEN films with water-vapor barrier resins and oxygen barrier resins being laminated thereto are given in Table C18. The conditions for the preparation of the packaging materials for PTP are specified in Table C19, and the results of evaluation of the packaging materials for PTP are given in Table C20. The PTP's using the packaging materials prepared in Examples C-97 to C-102 and the PTP using the packaging material prepared in Example C-48 were allowed to stand in an atmosphere kept at 25° C. and 90%RH for 30 days. As a result, it was found that no moisture absorption occurred for the contents of the PTP's using the packaging materials prepared in Examples C-97 to C-102, whereas moisture absorption occurred for the contents of the PTP using the packaging material prepared in Example C-48.

TABLE C18

Construction, water vapor permeability and oxygen permeability of PEN film with water vapor barrier layer and oxygen barrier resin being laminated thereto

| | Construction | Water vapor permeability [g/m² · 24 hr] | Oxygen permeability [g/m² · 24 hr] | Laminating method |
|---|---|---|---|---|
| C-97 | PEN(10)/AD(2)/EVOH(5)/AD(2)/PE(10) | 35 | 10 | T-die co-extrusion |
| C-98 | PEN(10)/AD(2)/EVOH(5)/AD(2)/APL(5) | 7 | 10 | T-die co-extrusion |
| C-99 | PEN(10)/AD(2)/PVA(10)/AD(2)/PP(10) | 15 | 5 | T-die co-extrusion |
| C-100 | PEN(10)/AD(2)/EVOH(5)/AD(2)/PE(10) | 35 | 10 | Inflation co-extrusion |
| C-101 | PEN(10)/AD(2)/EVOH(5)/AD(2)/APL(5) | 7 | 10 | Inflation co-extrusion |
| C-102 | PEN(10)/AD(2)/PVA(10)/AD(2)/PP(10) | 15 | 5 | Inflation co-extrusion |

TABLE C19

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-97 | 31 | The same as C-48 | | | 210 | 30 | Vinyl chloride |
| C-98 | 24 | The same as C-48 | | | 210 | 30 | Vinyl chloride |
| C-99 | 34 | The same as C-48 | | | 210 | 30 | Vinyl chloride |
| C-100 | 31 | The same as C-66 | | | 210 | 30 | Vinyl chloride |
| C-101 | 24 | The same as C-66 | | | 210 | 30 | Vinyl chloride |
| C-102 | 34 | The same as C-66 | | | 210 | 30 | Vinyl chloride |

TABLE C20

Results of evaluation of packaging material for press-through pack

| | Press-through property | Combustibility | Transparency | Press-through of film Strength [kgf] | Elongation [mm] |
|---|---|---|---|---|---|
| C-97 | ○ | ○ | ○ | 1.4 | 4 |
| C-98 | ○ | ○ | ○ | 1.4 | 2 |
| C-99 | ○ | ○ | ○ | 1.5 | 3 |
| C-100 | ○ | ○ | ○ | 1.4 | 4 |
| C-101 | ○ | ○ | ○ | 1.4 | 2 |
| C-102 | ○ | ○ | ○ | 1.5 | 3 |

Examples C-103 to C-120

In Examples C-103 to C-120, the procedure of Example C-48 or Example C-66 was repeated, except that a reinforcing layer comprising a synthetic resin was laminated to the polyethylene-2,6-naphthalate film prepared in Example C-48 or Example C-66. The lamination was carried out by EC for Examples C-103 to C-108, T-die co-extrusion for Examples C-105 to C-114, and inflation co-extrusion for Examples C-115 to C-120. The constructions of the PEN films with reinforcing layers being laminated thereto are given in Table C21. The conditions for the preparation of the packaging materials for PTP are specified in Table C22, and the results of evaluation of the packaging materials for PTP are given in Table C23.

TABLE C21

Construction of PEN film with reinforcing layer laminated thereto

| | Construction | Laminating method |
|---|---|---|
| C-103 | PEN(8)/AD(2)/PE(10) | EC |
| C-104 | PEN(15)/AD(2)/PE(20) | EC |
| C-105 | PEN(8)/AD(2)/PP(10) | EC |
| C-106 | PEN(15)/AD(2)/PP(20) | EC |
| C-107 | PEN(8)/AD(2)/COC(10) | EC |
| C-108 | PEN(15)/AD(2)/COC(20) | EC |
| C-109 | PEN(8)/AD(2)/PE(10) | T-die co-extrusion |
| C-110 | PEN(15)/AD(2)/PE(20) | T-die co-extrusion |
| C-111 | PEN(8)/AD(2)/PP(10) | T-die co-extrusion |
| C-112 | PEN(15)/AD(2)/PP(20) | T-die co-extrusion |
| C-113 | PEN(8)/AD(2)/COC(10) | T-die co-extrusion |
| C-114 | PEN(15)/AD(2)/COC(20) | T-die co-extrusion |
| C-115 | PEN(8)/AD(2)/PE(10) | Inflation co-extrusion |
| C-116 | PEN(15)/AD(2)/PE(20) | Inflation co-extrusion |
| C-117 | PEN(8)/AD(2)/PP(10) | Inflation co-extrusion |
| C-118 | PEN(15)/AD(2)/PP(20) | Inflation co-extrusion |
| C-119 | PEN(8)/AD(2)/COC(10) | Inflation co-extrusion |
| C-120 | PEN(15)/AD(2)/COC(20) | Inflation co-extrusion |

TABLE C22

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-103 | 20 | — | — | | 210 | 4 | Vinyl chloride |
| C-104 | 37 | — | — | | 210 | 4 | Vinyl chloride |
| C-105 | 20 | — | — | | 210 | 4 | Vinyl chloride |
| C-106 | 37 | — | — | | 210 | 4 | Vinyl chloride |
| C-107 | 20 | — | — | | 210 | 4 | Vinyl chloride |
| C-108 | 37 | — | — | | 210 | 4 | Vinyl chloride |
| C-109 | 20 | The same as C-48 | | | 210 | 4 | Vinyl chloride |
| C-110 | 37 | The same as C-48 | | | 210 | 4 | Vinyl chloride |
| C-111 | 20 | The same as C-48 | | | 210 | 4 | Vinyl chloride |
| C-112 | 37 | The same as C-48 | | | 210 | 4 | Vinyl chloride |
| C-113 | 20 | The same as C-48 | | | 210 | 4 | Vinyl chloride |
| C-114 | 37 | The same as C-48 | | | 210 | 4 | Vinyl chloride |
| C-115 | 20 | The same as C-66 | | | 210 | 4 | Vinyl chloride |
| C-116 | 37 | The same as C-66 | | | 210 | 4 | Vinyl chloride |
| C-117 | 20 | The same as C-66 | | | 210 | 4 | Vinyl chloride |
| C-118 | 37 | The same as C-66 | | | 210 | 4 | Vinyl chloride |
| C-119 | 20 | The same as C-66 | | | 210 | 4 | Vinyl chloride |
| C-120 | 37 | The same as C-66 | | | 210 | 4 | Vinyl chloride |

TABLE C23

Results of evaluation of packaging material for press-through pack

| | Press-through property | Combustibility | Transparency | Press-through of film Strength [kgf] | Elongation [mm] |
|---|---|---|---|---|---|
| C-103 | ○ | ○ | ○ | 1.2 | 3 |
| C-104 | ○ | ○ | ○ | 1.4 | 3 |
| C-105 | ○ | ○ | ○ | 1.3 | 3 |
| C-106 | ○ | ○ | ○ | 1.4 | 3 |
| C-107 | ○ | ○ | ○ | 1.3 | 2 |
| C-108 | ○ | ○ | ○ | 1.4 | 2 |
| C-109 | ○ | ○ | ○ | 1.2 | 3 |
| C-110 | ○ | ○ | ○ | 1.4 | 3 |
| C-111 | ○ | ○ | ○ | 1.3 | 3 |
| C-112 | ○ | ○ | ○ | 1.4 | 3 |
| C-113 | ○ | ○ | ○ | 1.3 | 2 |
| C-114 | ○ | ○ | ○ | 1.4 | 2 |
| C-115 | ○ | ○ | ○ | 1.2 | 3 |
| C-116 | ○ | ○ | ○ | 1.4 | 3 |
| C-117 | ○ | ○ | ○ | 1.3 | 3 |
| C-118 | ○ | ○ | ○ | 1.4 | 3 |
| C-119 | ○ | ○ | ○ | 1.3 | 2 |
| C-120 | ○ | ○ | ○ | 1.4 | 2 |

Examples C-121 to C-128

In Examples C-121 to C-128, the procedure of Example C-48 or Example C-66 was repeated, except that a water-vapor barrier resin and/or an oxygen barrier resin were laminated to the polyethylene-2,6-naphthalate film, a reinforcing layer was further laminated thereto, vinyl chloride (PVC) to be vacuum-formed was coated with vinylidene chloride (PVDC) and the contents were a hygroscopic chemical. The lamination was carried out by T-die co-extrusion for Examples C-121 to C-124 and inflation co-extrusion for Examples C-125 and C-128. The constructions, the water vapor permeability, and the oxygen permeability of PEN films with a water vapor barrier resin and/or an oxygen barrier resin and a reinforcing layer being laminated thereto are given in Table C24. The conditions for the preparation of the packaging materials for PTP are specified in Table C25, and the results of evaluation of the packaging materials for PTP are given in Table B26. The PTP's using the packaging materials prepared in Examples C-121 to C-128 and the PTP using the packaging material prepared in Example C-48 were allowed to stand in an atmosphere kept at 25° C. and 90%RH for 30 days. As a result, it was found that no moisture absorption occurred for the contents of the PTP's using the packaging materials prepared in Examples C-121 to C-128, whereas moisture absorption occurred for the contents of the PTP using the packaging material prepared in Example C-48.

TABLE C24

Construction of PEN film with water vapor barrier layer or oxygen barrier layer or both vapor barrier layer and oxygen barrier layer and reinforcing layer laminated thereto

| | Construction | Water vapor permeability [g/m² · 24 hr] | Oxygen permeability [g/m² · 24 hr] | Laminating method |
|---|---|---|---|---|
| C-121 | PEN(10)/AD(2)/EVOH(5)/AD(2)/PE(15) | 22 | 10 | T-die co-extrusion |
| C-122 | PEN(10)/AD(2)/EVOH(5)/AD(2)/PP(15) | 15 | 10 | T-die co-extrusion |
| C-123 | PEN(10)/AD(2)/PVA(10)/AD(2)/COC(10)/AD(2)/PP(10) | 10 | 5 | T-die co-extrusion |
| C-124 | PEN(10)/AD(2)/PVA(10)/AD(2)/COC(10)/AD(2)/Ny(10) | 10 | 5 | T-die co-extrusion |
| C-125 | PEN(10)/AD(2)/EVOH(5)/AD(2)/PE(15) | 22 | 10 | Inflation co-extrusion |
| C-126 | PEN(10)/AD(2)/EVOH(5)/AD(2)/PP(15) | 15 | 10 | Inflation co-extrusion |
| C-127 | PEN(10)/AD(2)/PVA(10)/AD(2)/COC(10)/AD(2)/PP(10) | 10 | 5 | Inflation co-extrusion |
| C-128 | PEN(10)/AD(2)/PVA(10)/AD(2)/COC(10)/AD(2)/Ny(10) | 10 | 5 | Inflation co-extrusion |

TABLE C25

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-121 | 34 | The same as C-48 | | | 210 | 30 | Vinyl chloride |
| C-122 | 34 | The same as C-48 | | | 210 | 30 | Vinyl chloride |
| C-123 | 46 | The same as C-48 | | | 210 | 30 | Vinyl chloride |
| C-124 | 46 | The same as C-48 | | | 210 | 30 | Vinyl chloride |
| C-125 | 34 | The same as C-66 | | | 210 | 30 | Vinyl chloride |
| C-126 | 34 | The same as C-66 | | | 210 | 30 | Vinyl chloride |
| C-127 | 46 | The same as C-66 | | | 210 | 30 | Vinyl chloride |
| C-128 | 46 | The same as C-66 | | | 210 | 30 | Vinyl chloride |

TABLE C26

Results of evaluation of packaging material for press-through pack

| | Press-through property | Combustibility | Transparency | Press-through of film Strength [kgf] | Press-through of film Elongation [mm] |
|---|---|---|---|---|---|
| C-121 | ○ | ○ | ○ | 1.4 | 4 |
| C-122 | ○ | ○ | ○ | 1.5 | 3 |
| C-123 | ○ | ○ | ○ | 1.5 | 4 |
| C-124 | ○ | ○ | ○ | 1.6 | 4 |
| C-125 | ○ | ○ | ○ | 1.4 | 4 |
| C-126 | ○ | ○ | ○ | 1.5 | 3 |
| C-127 | ○ | ○ | ○ | 1.5 | 4 |
| C-128 | ○ | ○ | ○ | 1.6 | 4 |

Examples C-129 to C-134

In Examples C-129 to C-134, the procedure of Examples C-48, C-116, C-118, and C-120 was repeated, except that the film thickness was varied, the contents were a working cutter (length: 150 mm) and the vacuum-formed product was one for a working cutter. The conditions for the preparation of the packaging materials for PTP are specified in Table C27, and the results of evaluation of the packaging materials for PTP are given in Table C28.

TABLE C27

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-129 | 20 | The same as C-48 | | | 210 | 30 | Vinyl chloride |
| C-130 | 45 | The same as C-48 | | | 210 | 30 | Vinyl chloride |
| C-131 | 150 | The same as C-48 | | | 210 | 30 | Vinyl |

TABLE C27-continued

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-132 | 37 | The same as C-116 | | | 210 | 30 | Vinyl chloride |
| C-133 | 37 | The same as C-118 | | | 210 | 30 | Vinyl chloride |
| C-134 | 37 | The same as C-120 | | | 210 | 30 | Vinyl chloride |

TABLE C28

Results of evaluation of packaging material for press-through pack

| | Press-through property | Combustibility | Transparency |
|---|---|---|---|
| C-129 | ◯ | ◯ | ◯ |
| C-130 | ◯ | ◯ | ◯ |
| C-131 | ◯ | ◯ | ◯ |
| C-132 | ◯ | ◯ | ◯ |
| C-133 | ◯ | ◯ | ◯ |
| C-134 | ◯ | ◯ | ◯ |

Examples C-135 to C-140

In Examples C-135 to C-140, the procedure of Examples C-48, C-66, C-69, C-110, C-118, and C-120 was repeated, except that the contents were a toothbrush for interdentium (approximate dimension: ø8×45 mm) and a vacuum-formed product for a toothbrush for interdentium was used. The conditions for the preparation of the packaging materials for PTP are specified in Table C29, and the results of evaluation of the packaging materials for PTP are given in Table C30.

TABLE C29

Conditions for preparation of packaging material for PTP

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-135 | 15 | The same as C-48 | | | 210 | 30 | Vinyl chloride |
| C-136 | 15 | The same as C-66 | | | 210 | 30 | Vinyl chloride |
| C-137 | 15 | The same as C-69 | | | 210 | 30 | Vinyl chloride |
| C-138 | 37 | The same as C-110 | | | 210 | 30 | Vinyl chloride |
| C-139 | 37 | The same as C-118 | | | 210 | 30 | Vinyl chloride |
| C-140 | 37 | The same as C-120 | | | 210 | 30 | Vinyl chloride |

TABLE C30

Results of evaluation of packaging material for press-through pack

| | Press-through property | Combustibility | Transparency |
|---|---|---|---|
| C-135 | ◯ | ◯ | ◯ |
| C-136 | ◯ | ◯ | ◯ |
| C-137 | ◯ | ◯ | ◯ |
| C-138 | ◯ | ◯ | |
| C-139 | ◯ | ◯ | ◯ |
| C-140 | ◯ | ◯ | ◯ |

Examples C-141 to C-146

In Examples C-141 to C-146, the PEN films prepared in Examples C-48, C-66, C-69, C-85, C-86, and C-87 were subjected to sealing to form bags having a size of 30×30 mm, and a powdered drug (100 mg) was used as the contents. The conditions for the preparation of the packaging materials are specified in Table C31, and the results of evaluation are given in Table C32. The packaging materials had excellent easy tear property, combustibility and transparency. The packaging materials prepared in Examples C-144, C-145, and C-146 were allowed to stand in an atmosphere kept at 25° C. and 90%RH for 30 days. As a result, the contents did not absorb any moisture.

TABLE C31

Conditions for preparation of packaging material

| | Thickness [μm] | Stretching temp. [°C.] | Stretch ratio Longitudinal | Stretch ratio Transverse | Heat setting Temp. [°C.] | Heat setting Time [s] | Vacuum forming |
|---|---|---|---|---|---|---|---|
| C-141 | 15 | The same as C-48 | | | 210 | 30 | Vinyl chloride |
| C-142 | 15 | The same as C-66 | | | 210 | 30 | Vinyl chloride |
| C-143 | 15 | The same as C-69 | | | 210 | 30 | Vinyl chloride |
| C-144 | 30 | The same as C-85 | | | 210 | 30 | Vinyl chloride |
| C-145 | 30 | The same as C-86 | | | 210 | 30 | Vinyl chloride |
| C-146 | 20 | The same as C-87 | | | 210 | 30 | Vinyl chloride |

TABLE C32

Results of evaluation of packaging material

| | Easy tearing | Combustibility | Transparency |
|---|---|---|---|
| C-141 | ◯ | ◯ | ◯ |
| C-142 | ◯ | ◯ | ◯ |
| C-143 | ◯ | ◯ | ◯ |
| C-144 | ◯ | ◯ | ◯ |
| C-145 | ◯ | ◯ | ◯ |
| C-146 | ◯ | ◯ | ◯ |

Examples C-147 to C-152

In Examples C-147 to C-152, the PEN films prepared in Examples C-48, C-66, C-69, C-85, C-97, and C-118 were used as a cover material for a paper milk pack (capacity: 200 ml) in its opening through which a straw is to be pierced.

The conditions for the preparation of the cover material are specified in Table C33, and the results of evaluation are given in Table C34. In Examples C-147 to C-152, an isocyanate AC agent was coated at a coverage of 0.5 g/m on the side of PP or PE, and a thermoplastic adhesive was then coated thereon to form a bonding face. The packaging materials thus prepared had a strength enough to be used as a cover material, and a straw can be easily pierced through the packaging materials to make a hole (easy piercing). Further, they had excellent combustibility and transparency.

TABLE C33

Conditions for preparation of cover material

| | | Stretching | Stretch ratio | | Heat setting | | |
|---|---|---|---|---|---|---|---|
| | Thickness [μm] | temp. [°C.] | Longitudinal | Transverse | Temp. [°C.] | Time [s] | Vacuum forming |
| C-147 | 15 | The same as C-48 | | | 210 | 30 | Vinyl chloride |
| C-148 | 15 | The same as C-66 | | | 210 | 30 | Vinyl chloride |
| C-149 | 15 | The same as C-69 | | | 210 | 30 | Vinyl chloride |
| C-150 | 30 | The same as C-85 | | | 210 | 30 | Vinyl chloride |
| C-151 | 31 | The same as C-97 | | | 210 | 30 | Vinyl chloride |
| C-152 | 37 | The same as C-118 | | | 210 | 30 | Vinyl chloride |

TABLE C34

Results of evaluation of cover material

| | Easy piecing | Combustibility | Transparency |
|---|---|---|---|
| C-147 | ◯ | ◯ | ◯ |
| C-148 | ◯ | ◯ | ◯ |
| C-149 | ◯ | ◯ | ◯ |
| C-150 | ◯ | ◯ | ◯ |
| C-151 | ◯ | ◯ | ◯ |
| C-152 | ◯ | ◯ | ◯ |

Examples C-153 to C-155

In Examples C-153 to C-155, the procedure of Examples C-102, C-112, and C-120 was repeated, except that an isocyanate AC agent was coated at a coverage of 0.5 g/m on the PP, PE, or COC surface of the PEN films and a thermoplastic adhesive was coated thereon to form a bonding face. The conditions for the preparation of the packaging materials for a press-through pack are specified in Table C35, and the results of evaluation of the packaging materials for a press-through pack are given in Table C36. The packaging materials for a press-through pack had excellent press-through property, combustibility, and transparency.

TABLE C35

Conditions for preparation of packaging material for PTP

| | | Stretching | Stretch ratio | | Heat setting | | |
|---|---|---|---|---|---|---|---|
| | Thickness [μm] | temp. [°C.] | Longitudinal | Transverse | Temp. [°C.] | Time [s] | Vacuum forming |
| C-153 | 37 | The same as C-102 | | | 210 | 30 | Vinyl chloride |
| C-154 | 20 | The same as C-112 | | | 210 | 30 | Vinyl chloride |
| C-156 | 37 | The same as C-120 | | | 210 | 30 | Vinyl chloride |

TABLE C36

Results of evaluation of packaging material for press-through pack

| | Press-through property | Combustibility | Transparency | Press-through of film | |
|---|---|---|---|---|---|
| | | | | Strength [kgf] | Elongation [mm] |
| C-153 | ◯ | ◯ | ◯ | 1.4 | 3 |
| C-154 | ◯ | ◯ | ◯ | 1.3 | 2 |
| C-155 | ◯ | ◯ | ◯ | 1.4 | 3 |

We claim:

1. A multi-layer cover film for a press-through pack comprising:
    a layer of polyethylene-2,6-naphthalate film;
    a water vapor barrier layer and/or an oxygen barrier layer;
    a reinforcing layer of a synthetic resin; and
    a heat-sealed layer or an adhesive layer, said polyethylene-2,6-naphthalate film being prepared by a process comprising the steps of:
        providing an unstretched film comprising polyethylene-2,6-naphthalate having an intrinsic viscosity η in the range of from 0.31 to 0.6,
        stretching the film at 120° to 170° C. in mutually perpendicular directions each with drawing ratios of 1 to 3 times, and
        heat-treating the stretched film at 170° to 270° C. for 1 sec to 30 min to heat-set the film, thereby preparing a stretched film having a final thickness in the range of from 5 to 150 μm.

2. The multi-layer cover film of claim 1 wherein said polyethylene-2,6-naphthalene resin film simultaneously satisfies a press-through strength in the range of from 0.9 to 4.5 kgf and a press-through elongation of not more than 10 μm, the press-through strength and the press-through elongation being defined respectively as the strength required and the elongation caused when a cylindrical stainless steel rod having a diameter of 9 μm and having a curved, mirror-finished end is pressed perpendicularly through the film at a rate of 50 μm/min as the film is held horizontally.

3. The multi-layer cover film according to claim 2, which further comprises a printed layer of a printing ink laminated thereto.

4. A blister pack or press-through pack comprising as a cover material a multi-layer cover film according to claim 1.

5. A cover film for a press-through pack comprising polyethlylene-2,6-naphthalate, said film being prepared by a process comprising the steps of:
    providing an unstretched film comprising polyethylene-2,6-naphthalate having an intrinsic viscosity η in the range of from 0.31 to 0.6,
    stretching the film at 120° to 170° C. in mutually perpendicular directions each with drawing ratios of 1 to 3 times, and
    heat-treating the stretched film at 170° to 270° C. for 1 sec to 30 min to heat-set the film, thereby preparing a stretched film having a final thickness in the range of from 5 to 150 µm.

6. A multi-layer cover film for a press-through pack comprising:

a layer of polyethylene-2,6-naphthalate film;

a water vapor barrier layer and/or an oxygen barrier layer;

a reinforcing layer of a synthetic resin; and a heat-sealed layer or an adhesive layer, said polyethylene-2,6-naphthalate film being prepared by a process comprising the steps of:

providing an unstretched film comprising polyethylene-2,6-naphthalate having an intrinsic viscosity η in the range of from 0.31 to 0.6, stretching the film at 120° to 170° C. in the longitudinal direction at draw ratios of 3 to 6 times and in the transverse direction at draw ratios of 1 to 1.8 times, and heat-treating the stretched film at 170° to 270° C. for 1 sec to 30 min to heat-set the film, thereby preparing a stretched film having a final thickness in the range of from 5 to 150 µm.

7. The multi-layer cover film of claim 6 wherein said polyethylene-2,6-naphthalene resin film simultaneously satisfies a press-through strength in the range of from 0.9 to 4.5 kgf and a respectively as the strength required and the elongation caused when a cylindrical stainless steel rod having a diameter of 9 µm and having a curved, mirror-finished end is pressed perpendicularly through the film at a rate of 50 µm/min as the film is held horizontally.

8. The multi-layer cover film according to claim 6, which further comprises a printed layer of a printing ink laminated thereto.

9. A blister pack or press-through pack comprising as a cover material a multi-layer cover film according to claim 6.

10. A cover film for a press-through pack comprising polyethylene-2,6-naphthalate, said film being prepared by a process comprising the steps of:

providing an unstretched film comprising polyethylene-2,6-naphthalate having an intrinsic viscosity η in the range of from 0.31 to 0.6, stretching the film at 120° to 170° C. in the longitudinal direction at draw ratios of 3 to 6 times and in the transverse direction at draw ratios of 1 to 1.8 times, and heat-treating the stretched film at 170° to 270° C. for 1 sec to 30 min to heat-set the film, thereby preparing a stretched film having a final thickness in the range of from 5 to 150 µm.

* * * * *

UNITED STATES PATENT AND TRADEMARK OFFICE
CERTIFICATE OF CORRECTION

PATENT NO. : 5,858,490
DATED : January 12, 1999
INVENTOR(S) : Shinichiro MORI et al.

It is certified that error appears in the above-indentified patent and that said Letters Patent is hereby corrected as shown below:

On the title page, item [30] Foreign Application Priority Data:, line 3, change "5-328089" to --5-329089--.

Signed and Sealed this

Eleventh Day of May, 1999

Attest:

Attesting Officer

Q. TODD DICKINSON

Acting Commissioner of Patents and Trademarks